(12) United States Patent
Popli

(10) Patent No.: US 10,788,247 B2
(45) Date of Patent: Sep. 29, 2020

(54) CONTROL MECHANISM FOR CLIMATE CONTROL UNIT WITH MULTIPLE STAGES

(71) Applicant: Emerson Climate Technologies, Inc., Sidney, OH (US)

(72) Inventor: Sahil Popli, Silver Spring, MD (US)

(73) Assignee: Emerson Climate Technologies, Inc., Sidney, OH (US)

( * ) Notice: Subject to any disclaimer, the term of this patent is extended or adjusted under 35 U.S.C. 154(b) by 49 days.

(21) Appl. No.: 16/176,331

(22) Filed: Oct. 31, 2018

(65) Prior Publication Data

US 2019/0137156 A1 May 9, 2019

Related U.S. Application Data

(60) Provisional application No. 62/583,279, filed on Nov. 8, 2017.

(51) Int. Cl.
*F25B 49/02* (2006.01)
*F25B 1/10* (2006.01)

(52) U.S. Cl.
CPC .......... *F25B 49/022* (2013.01); *F25B 1/10* (2013.01); *F25B 2400/075* (2013.01); *F25B 2500/26* (2013.01); *F25B 2600/022* (2013.01); *F25B 2600/025* (2013.01); *F25B 2600/0253* (2013.01); *F25B 2600/112* (2013.01); *F25B 2700/2106* (2013.01); *F25B 2700/21151* (2013.01)

(58) Field of Classification Search
CPC .... F25B 1/10; F25B 49/022; F25B 3400/075; F25B 2500/26; F25B 2600/022; F25B 2600/025; F25B 2600/0253; F25B 2700/2106; F25B 2700/21172

See application file for complete search history.

(56) References Cited

U.S. PATENT DOCUMENTS

| 4,487,028 A | 12/1984 | Foye |
| 6,095,427 A * | 8/2000 | Hoium ................. B60H 1/3232 |
| | | 236/49.3 |
| 2003/0155429 A1* | 8/2003 | Sparling ................. F24F 11/30 |
| | | 236/49.3 |
| 2008/0028780 A1 | 2/2008 | Song |
| 2011/0264280 A1 | 10/2011 | Grabinger et al. |
| 2012/0227427 A1 | 9/2012 | Liu et al. |
| 2017/0176075 A1 | 6/2017 | Karkhanis et al. |

OTHER PUBLICATIONS

International Search Report and Written Opinion issued in correlated International Application No. PCT/US2018/059646, dated Feb. 27, 2019.

* cited by examiner

*Primary Examiner* — Marc E Norman
(74) *Attorney, Agent, or Firm* — Harness, Dickey & Pierce, P.L.C.

(57) ABSTRACT

A climate-control system includes a variable-capacity compressor. An outdoor ambient temperature sensor indicates a temperature of the outdoor ambient air. A return air temperature sensor indicates a temperature of the return air in the system. A controller commands a startup compressor stage based on the temperature from the outdoor ambient temperature sensor and commands a running compressor stage based on a time-based slope of the temperature from the return air temperature sensor and the startup compressor stage.

27 Claims, 29 Drawing Sheets

FIG. 8A

| Compression Stage | Circuits | Frequency | OAT (F) |
|---|---|---|---|
| 4 | 1 | 75 | >90 |
| 3 | 1 | 60 | 80 to 90 |
| 2 | 1 | 45 | 70 to 80 |
| 1 | 1 | 35 | <70 |

FIG. 8B

| Compression Stage | Circuits | Frequency | Column A Fan Speed ID RH < 30 And > 40 | Column B Fan Speed ID RH > 50 | Column C Fan Speed ID RH < 40 |
|---|---|---|---|---|---|
| 4 | 1 | 75 | High | Med | High |
| 3 | 1 | 60 | Med | Low or Med-Low | High |
| 2 | 1 | 45 | Low or Med-Low | Low | Med |
| 1 | 1 | 30 | Low | Low | Med |

| Compression Stage | Compressor | Frequency | OAT (F) |
|---|---|---|---|
| 5 | 2 | 60 | >90 |
| 4 | 1 | 75 | 80 to 90 |
| 3 | 1 | 60 | 75 to 80 |
| 2 | 1 | 45 | 70 to 75 |
| 1 | 1 | 35 | <70 |

FIG. 9A

| Compression Stage | Compressor | Frequency | Column A Fan Speed ID RH < 30 And > 40 | Column B Fan Speed ID RH > 50 | Column C Fan Speed ID RH < 40 |
|---|---|---|---|---|---|
| 5 | 2 | 60 | High | Med or Med-High | High |
| 4 | 1 | 75 | Med or Med-High | Med | High |
| 3 | 1 | 60 | Med | Low or Med-Low | High |
| 2 | 1 | 45 | Low or Med-Low | Low | Med |
| 1 | 1 | 30 | Low | Low | Med |

| Compression Stage | Circuits | Frequency | OAT (F) |
|---|---|---|---|
| 5 | 2 | 80 | >90 |
| 4 | 1 | 75 | 80 to 90 |
| 3 | 1 | 60 | 75 to 80 |
| 2 | 1 | 45 | 70 to 75 |
| 1 | 1 | 35 | <70 |

FIG. 10B

| Compression Stage | Circuits | Frequency | Column A Fan Speed ID RH < 50 And > 40 | Column B Fan Speed ID RH > 50 | Column C Fan Speed ID RH < 40 |
|---|---|---|---|---|---|
| 5 | 2 | 80 | High | Med or Med-High | High |
| 4 | 1 | 75 | Med or Med-High | Med | High |
| 3 | 1 | 60 | Med | Low or Med-Low | High |
| 2 | 1 | 45 | Low or Med-Low | Low | Med |
| 1 | 1 | 30 | Low | Low | Med |

FIG. 11A

| Compression Stage | Compressor 1 (Frequency) | Compressor 2 (Frequency) | OAT (F) |
|---|---|---|---|
| 9 | 60 | 60 | >95 |
| 8 | 45 | 60 | 90 to 95 |
| 7 | 35 | 60 | 85 to 90 |
| 6 | 45 | 45 | 80 to 85 |
| 5 | 35 | 45 | 75 to 80 |
| 4 | 35 | 35 | 70 to 75 |
| 3 | 60 | 0 | 65 to 70 |
| 2 | 45 | 0 | 60 to 65 |
| 1 | 35 | 0 | <60 |

FIG. 11B

| Compression Stage | Compressor 1 (Frequency) | Compressor 2 (Frequency) | Column A Fan Speed ID RH < 50 And > 40 | Column B Fan Speed ID RH > 50 | Column C Fan Speed ID RH < 40 |
|---|---|---|---|---|---|
| 9 | 60 | 60 | High | High | High |
| 8 | 45 | 60 | High | Med | High |
| 7 | 35 | 60 | High | Med | High |
| 6 | 45 | 45 | Med | Med | High |
| 5 | 35 | 45 | Med | Med | High |
| 4 | 35 | 35 | Med | Low | High |
| 3 | 60 | 0 | Low | Low | Med |
| 2 | 45 | 0 | Low | Low | Med |
| 1 | 35 | 0 | Low | Low | Med |

FIG. 12A

| Compression Stage | Circ. 1: Compressor 1 (Frequency) | Circ. 2: Compressor 2 (Frequency) | OAT (F) |
|---|---|---|---|
| 9 | 60 | 60 | >95 |
| 8 | 45 | 60 | 90 to 95 |
| 7 | 35 | 60 | 85 to 90 |
| 6 | 45 | 45 | 80 to 85 |
| 5 | 35 | 45 | 75 to 80 |
| 4 | 35 | 35 | 70 to 75 |
| 3 | 60 | 0 | 65 to 70 |
| 2 | 45 | 0 | 60 to 65 |
| 1 | 35 | 0 | <60 |

FIG. 12B

| Compression Stage | Circ. 1 Comp. 1 (Frequency) | Circ. 2 Comp. 2 (Frequency) | Column A Fan Speed (ID RH < 30 And > 40) | Column B Fan Speed (ID RH > 50) | Column C Fan Speed (ID RH < 40) |
|---|---|---|---|---|---|
| 9 | 60 | 60 | High | High | High |
| 8 | 45 | 60 | High | Med | High |
| 7 | 35 | 60 | High | Med | High |
| 6 | 45 | 45 | Med | Med | High |
| 5 | 35 | 45 | Med | Med | High |
| 4 | 35 | 35 | Med | Low | Med |
| 3 | 60 | 0 | Low | Low | Med |
| 2 | 45 | 0 | Low | Low | Med |
| 1 | 35 | 0 | Low | Low | Med |

CONTROL MECHANISM FOR CLIMATE CONTROL UNIT WITH MULTIPLE STAGES

CROSS-REFERENCE TO RELATED APPLICATIONS

This application claims the benefit of U.S. Provisional Application No. 62/583,279, filed on Nov. 8, 2017. The entire disclosure of the above application is incorporated herein by reference.

FIELD

The present disclosure relates to a climate-control system having a compressor with multiple stages and to methods for controlling the climate-control system.

BACKGROUND

This section provides background information related to the present disclosure and is not necessarily prior art.

A climate-control system may include a fluid circuit having a first heat exchanger (e.g., a condenser), a second heat exchanger (e.g., an evaporator), an expansion valve, and at least one compressor circulating a working fluid (e.g., refrigerant or carbon dioxide) between the first and second heat exchangers. Because the compressor(s) may operate at a fixed speed, the compressors may cycle often and the system may not be able to be controlled to match current climate-control system load demands.

SUMMARY

This section provides a general summary of the disclosure, and is not a comprehensive disclosure of its full scope or all of its features.

An example climate-control system includes a variable-capacity compressor. An outdoor ambient temperature sensor indicates a temperature of the outdoor ambient air. A return air temperature sensor indicates a temperature of the return air in the system. A controller commands a startup compressor stage based on the temperature from the outdoor ambient temperature sensor and commands a running compressor stage based on a time-based slope of the temperature from the return air temperature sensor and the startup compressor stage.

The controller of the example climate-control system may increase the startup compressor stage by one stage if the slope of the temperature from the return air temperature sensor is neutral.

The controller of the example climate-control system may increase the startup compressor stage by two stages if the slope of the temperature from the return air temperature sensor is positive.

The controller of the example climate-control system may decrease the startup compressor stage by two stages if the slope of the temperature from the return air temperature sensor is negative.

The example climate-control system may further include a space temperature sensor indicating a temperature of a conditioned space, wherein the controller determines a difference between the temperature of the conditioned space and a space set temperature.

The example climate-control system may further include at least one of a thermostat and a mobile device providing a space set temperature.

The controller of the example climate-control system may maintain the compression stage if the slope of the temperature from the return air temperature sensor is neutral and the difference between the temperature of the conditioned space and the space set temperature is less than a predetermined threshold.

The controller of the example climate-control system may increase the compression stage by one stage if the slope of the temperature from the return air temperature sensor is neutral and the difference between the temperature of the conditioned space and the space set temperature is not less than a predetermined threshold.

The controller of the example climate-control system may decrease the compression stage by two stages if the slope of the temperature from the return air temperature sensor is negative and the difference between the temperature of the conditioned space and the space set temperature is less than a predetermined threshold.

The controller of the example climate-control system may decrease the compression stage by one stage if the slope of the temperature from the return air temperature sensor is negative and the difference between the temperature of the conditioned space and the space set temperature is not less than a predetermined threshold.

The example climate-control system may further include an indoor relative humidity sensor indicating a relative humidity of a conditioned space.

The controller of the example climate-control system may increase the compression stage by two stages if the slope of the temperature from the return air temperature sensor is positive and the indoor relative humidity is less than a predetermined threshold.

The controller of the example climate-control system may increase the compression stage by two stages if the slope of the temperature from the return air temperature sensor is positive and the indoor relative humidity is not less than a predetermined threshold.

The controller of the example climate-control system may maintain the compression stage if the slope of the temperature from the return air temperature sensor is neutral, the difference between the temperature of the conditioned space and the space set temperature is less than a predetermined temperature threshold, and the indoor relative humidity is less than a predetermined humidity threshold.

The controller of the example climate-control system may increase the compression stage by one stage if the slope of the temperature from the return air temperature sensor is neutral, the difference between the temperature of the conditioned space and the space set temperature is less than a predetermined temperature threshold, and the indoor relative humidity is not less than a predetermined humidity threshold.

The controller of the example climate-control system may increase the compression stage by one stage if the slope of the temperature from the return air temperature sensor is neutral, the difference between the temperature of the conditioned space and the space set temperature is not less than a predetermined temperature threshold, and the indoor relative humidity is less than a predetermined humidity threshold.

The controller of the example climate-control system may increase the compression stage by one stage if the slope of the temperature from the return air temperature sensor is neutral, the difference between the temperature of the conditioned space and the space set temperature is not less than a predetermined temperature threshold, and the indoor relative humidity is not less than a predetermined humidity threshold.

The controller of the example climate-control system may decrease the compression stage by two stages if the slope of the temperature from the return air temperature sensor is negative, the difference between the temperature of the conditioned space and the space set temperature is less than a predetermined temperature threshold, and the indoor relative humidity is less than a predetermined humidity threshold.

The controller of the example climate-control system may decrease the compression stage by one stage if the slope of the temperature from the return air temperature sensor is negative, the difference between the temperature of the conditioned space and the space set temperature is less than a predetermined temperature threshold, and the indoor relative humidity is not less than a predetermined humidity threshold.

The controller of the example climate-control system may decrease the compression stage by one stage if the slope of the temperature from the return air temperature sensor is negative, the difference between the temperature of the conditioned space and the space set temperature is not less than a predetermined temperature threshold, and the indoor relative humidity is less than a predetermined humidity threshold.

The controller of the example climate-control system may increase the compression stage by one stage if the slope of the temperature from the return air temperature sensor is negative, the difference between the temperature of the conditioned space and the space set temperature is not less than a predetermined temperature threshold, and the indoor relative humidity is not less than a predetermined humidity threshold.

The example climate-control system may further include an indoor blower fan having a variable-frequency drive, wherein the controller sets a speed of the indoor blower fan according to the running compressor stage.

The example climate-control system may further include a power exhaust fan.

The variable-capacity compressor of the example climate-control system may further include a variable-frequency drive.

The example climate-control system may further include a plurality of compressors that are fixed capacity or variable capacity.

The climate-control system may further include a plurality of compressors having at least one compressor with a variable-frequency drive.

An example method of controlling a climate-control system having at least one variable-capacity compressor, an outdoor ambient temperature sensor, and a return air temperature sensor includes determining, by a controller, an outdoor ambient air temperature from the outdoor ambient air temperature sensor; determining, by the controller, a return air temperature from the return air temperature sensor; commanding, by the controller, a startup compressor stage based on the outdoor ambient temperature; and commanding, by the controller, a running compressor stage based on a slope of the return air temperature and the startup compressor stage.

The example method may further include increasing, by the controller, the startup compressor stage by one stage if the slope of the temperature from the return air temperature sensor is neutral.

The example method may further include increasing, by the controller, the startup compressor stage by two stages if the slope of the temperature from the return air temperature sensor is positive.

The example method may further include decreasing, by the controller, the startup compressor stage by two stages if the slope of the temperature from the return air temperature sensor is negative.

The example method may further include determining, by the controller, a difference between a temperature of a conditioned space and a space set temperature, wherein the temperature of the conditioned space is provided by a space temperature sensor.

The example method may further include determining a space set temperature provided by a thermostat.

The example method may further include determining a space set temperature provided by a mobile device.

The example method may further include maintaining, by the controller, the compression stage if the slope of the temperature from the return air temperature sensor is neutral and the difference between the temperature of the conditioned space and the space set temperature is less than a predetermined threshold.

The example method may further include increasing, by the controller, the compression stage by one stage if the slope of the temperature from the return air temperature sensor is neutral and the difference between the temperature of the conditioned space and the space set temperature is not less than a predetermined threshold.

The example method may further include decreasing, by the controller, the compression stage by two stages if the slope of the temperature from the return air temperature sensor is negative and the difference between the temperature of the conditioned space and the space set temperature is less than a predetermined threshold.

The example method may further include decreasing, by the controller, the compression stage by one stage if the slope of the temperature from the return air temperature sensor is negative and the difference between the temperature of the conditioned space and the space set temperature is not less than a predetermined threshold.

The example method may further include determining, by the controller, a relative humidity of a conditioned space from an indoor relative humidity sensor.

The example method may further include increasing, by the controller, the compression stage by two stages if the slope of the temperature from the return air temperature sensor is positive and the indoor relative humidity is less than a predetermined threshold.

The example method may further include increasing, by the controller, the compression stage by two stages if the slope of the temperature from the return air temperature sensor is positive and the indoor relative humidity is not less than a predetermined threshold.

The example method may further include maintaining, by the controller, the compression stage if the slope of the temperature from the return air temperature sensor is neutral, the difference between the temperature of the conditioned space and the space set temperature is less than a predetermined temperature threshold, and the indoor relative humidity is less than a predetermined humidity threshold.

The example method may further include increasing, by the controller, the compression stage by one stage if the slope of the temperature from the return air temperature sensor is neutral, the difference between the temperature of the conditioned space and the space set temperature is less than a predetermined temperature threshold, and the indoor relative humidity is not less than a predetermined humidity threshold.

The example method may further include increasing, by the controller, the compression stage by one stage if the slope of the temperature from the return air temperature sensor is neutral, the difference between the temperature of the conditioned space and the space set temperature is not less than a predetermined temperature threshold, and the indoor relative humidity is less than a predetermined humidity threshold.

The example method may further include increasing, by the controller, the compression stage by one stage if the slope of the temperature from the return air temperature sensor is neutral, the difference between the temperature of the conditioned space and the space set temperature is not less than a predetermined temperature threshold, and the indoor relative humidity is not less than a predetermined humidity threshold.

The example method may further include decreasing, by the controller, the compression stage by two stages if the slope of the temperature from the return air temperature sensor is negative, the difference between the temperature of the conditioned space and the space set temperature is less than a predetermined temperature threshold, and the indoor relative humidity is less than a predetermined humidity threshold.

The example method may further include decreasing, by the controller, the compression stage by one stage if the slope of the temperature from the return air temperature sensor is negative, the difference between the temperature of the conditioned space and the space set temperature is less than a predetermined temperature threshold, and the indoor relative humidity is not less than a predetermined humidity threshold.

The example method may further include decreasing, by the controller, the compression stage by one stage if the slope of the temperature from the return air temperature sensor is negative, the difference between the temperature of the conditioned space and the space set temperature is not less than a predetermined temperature threshold, and the indoor relative humidity is less than a predetermined humidity threshold.

The example method may further include increasing, by the controller, the compression stage by one stage if the slope of the temperature from the return air temperature sensor is negative, the difference between the temperature of the conditioned space and the space set temperature is not less than a predetermined temperature threshold, and the indoor relative humidity is not less than a predetermined humidity threshold.

The example method may further include setting, by the controller, a speed of an indoor blower fan according to the running compressor stage.

The example method may further include selectively enabling, by the controller, a power exhaust fan.

The variable-capacity compressor of the example method may further include a variable-frequency drive.

Another example method of controlling a climate-control system having a compressor system operable in multiple stages, an outdoor ambient air temperature sensor, and a return air temperature sensor includes determining, by a controller, an outdoor ambient air temperature from the outdoor ambient air temperature sensor; determining, by the controller, a return air temperature from the return air temperature sensor; commanding, by the controller, a startup compressor stage based on the outdoor ambient air temperature; and commanding, by the controller, a running compressor stage based on a slope of the return air temperature and the startup compressor stage.

The compressor system of the example method may further include one compressor operable at multiple capacities.

The compressor system of the example method may further include a compressor having a variable-frequency drive.

The compressor system of the example method may further include a plurality of compressors that are fixed capacity or variable capacity.

The compressor system of the example method may further include a plurality of compressors having at least one compressor with a variable-frequency drive.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 8A-12B are startup tables and run tables for the climate-control systems of FIGS. 2A-2E.

Corresponding reference numerals indicate corresponding parts throughout the several views of the drawings.

DETAILED DESCRIPTION

Figure 1A:
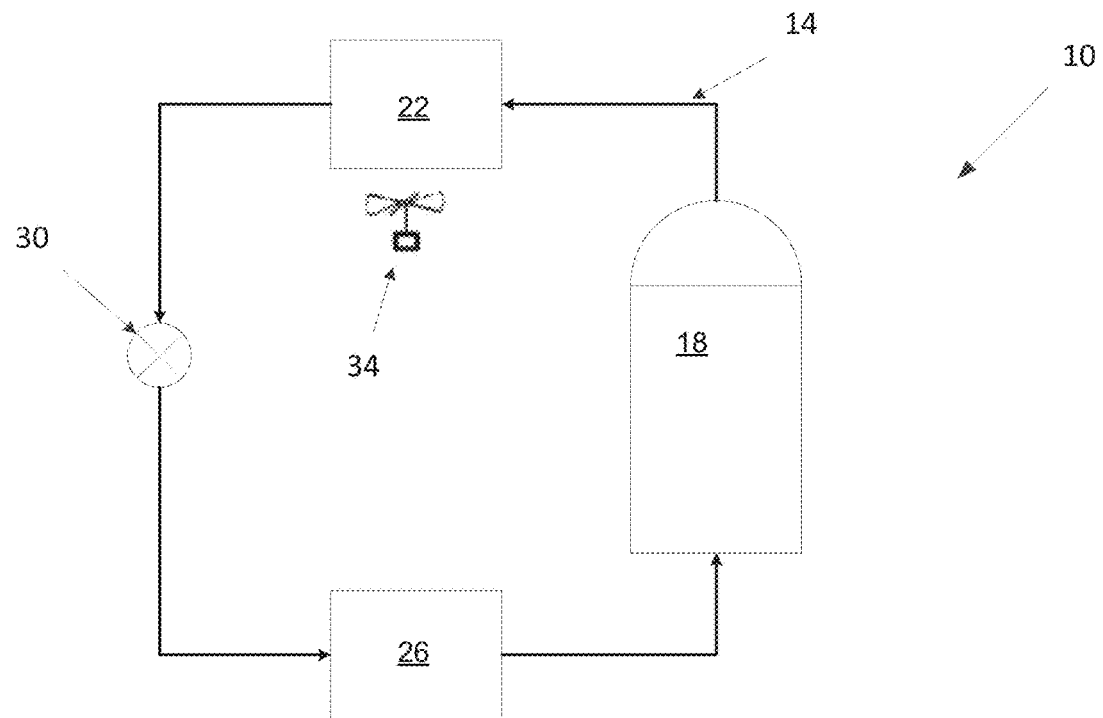
FIGS. 1A-1C illustrate example prior art climate-control systems.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1B:
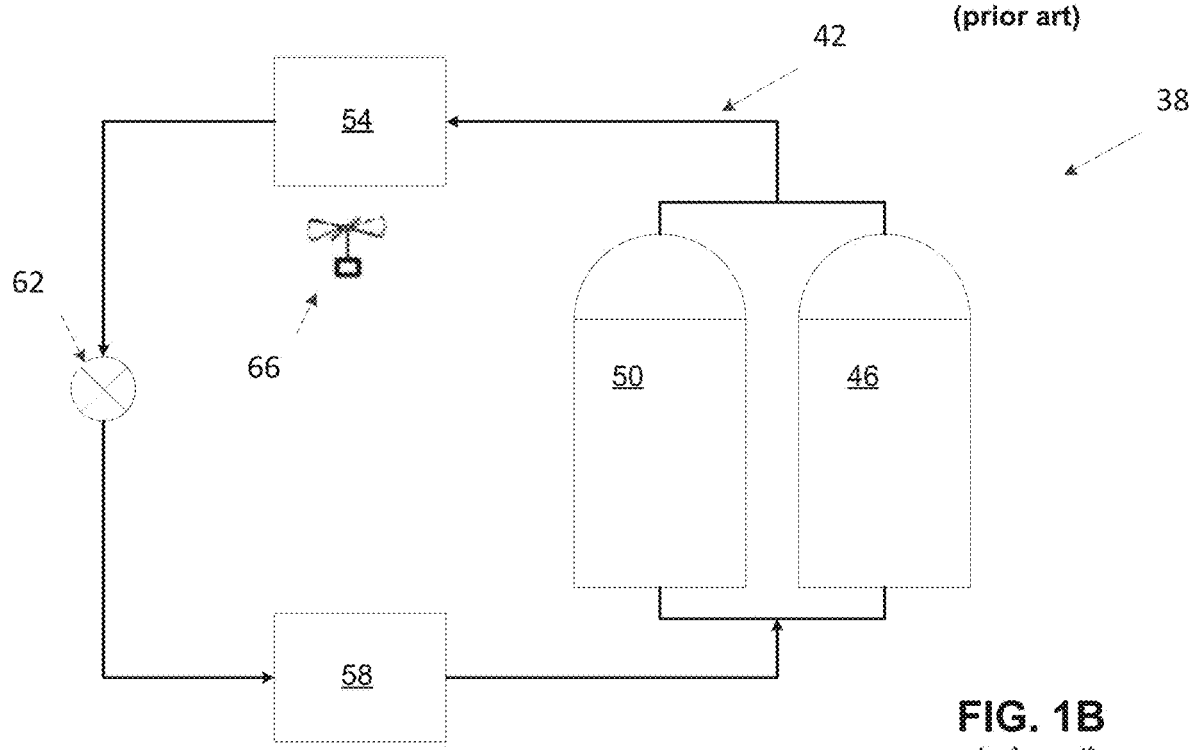
Figure 1C:
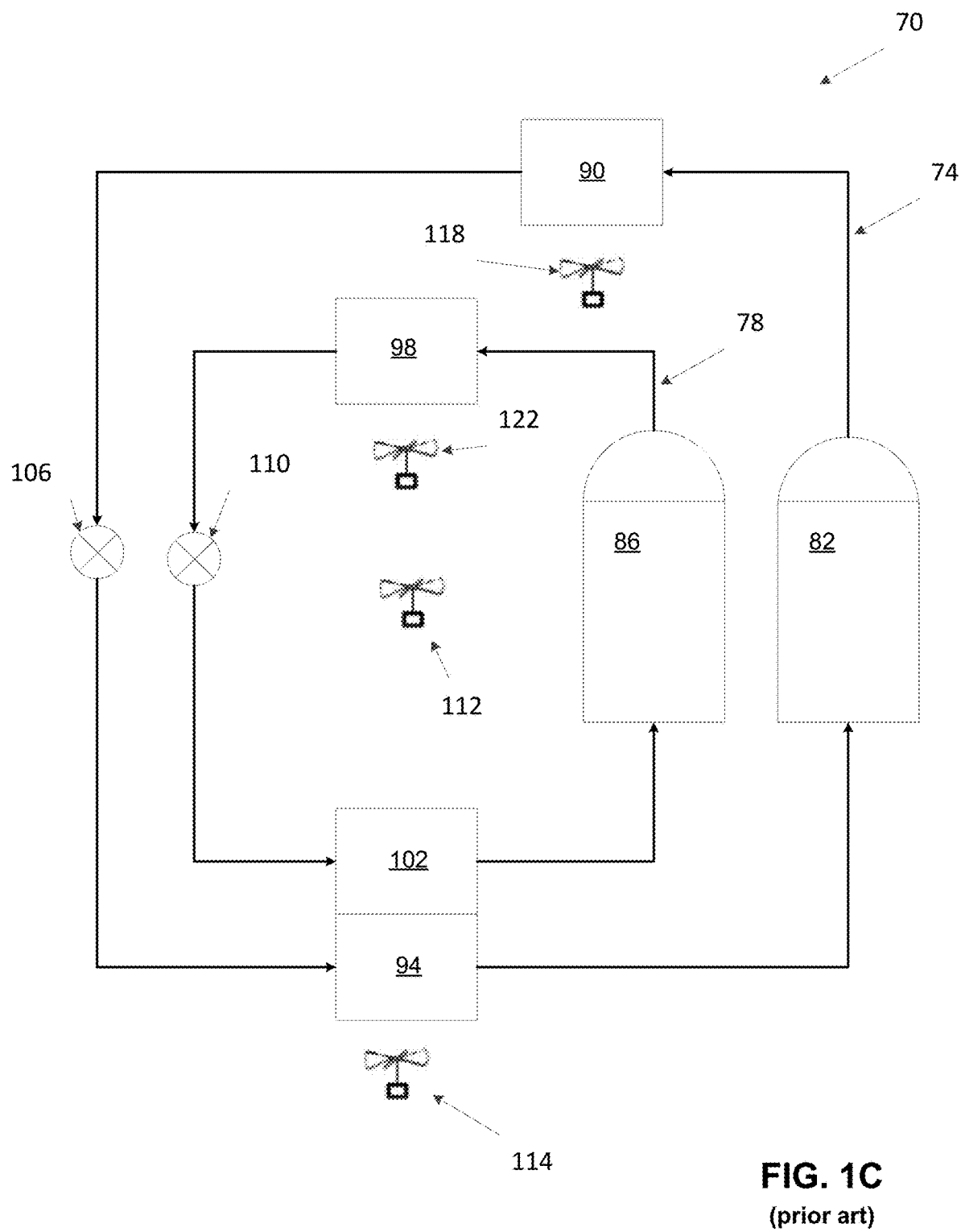

FIGS. 1A-1C illustrate example system configurations for climate-control systems. While FIGS. 1A-1C exhibit examples of configurations discussed herein, it is understood that FIGS. 1A-1C are only examples, and the present disclosure may be applied to any configuration for a climate-control system. For example, the climate-control systems may be roof top units, residential units, commercial units, systems for banquet halls, systems for office buildings, systems for commercial kitchens, etc.

FIG. 1A illustrates a system 10 having a single circuit 14 with a single compressor 18. The compressor 18 may be a fixed-capacity compressor. The circuit 14 may further include heat exchangers 22, 26, an expansion device 30, and a fan 34. In the particular configuration shown in FIG. 1A, the heat exchanger 22 is a condenser and the heat exchanger 26 is an evaporator.

FIG. 1B illustrates a system 38 having a single circuit 42 with two compressors 46, 50 connected in tandem. Compressors 46 and 50 may both be fixed-capacity compressors. The circuit 42 may further include heat exchangers 54, 58, an expansion device 62, and a fan 66. In the particular configuration shown in FIG. 1B, the heat exchanger 54 is a condenser and the heat exchanger 58 is an evaporator.

FIG. 1C illustrates a system 70 having two circuits 74, 78, each having a single compressor 82, 86, two heat exchangers 90, 94 and 98, 102, and an expansion device 106, 110. A power exhaust fan 112 may turn on to prevent pressurization of the conditioned space (the power exhaust fan may be a field retrofit and may or may not be present on all units). The compressors 82, 86 may be fixed-capacity compressors. In the particular configuration, heat exchangers 90 and 98 are condensers and heat exchangers 94 and 102 are evaporators. Heat exchangers 94 and 102 may further be a single slab evaporator having a single fan 114. Each of condensers 90 and 98 may also include a fan 118, 122.

The climate control systems 10, 38, and 70 may have the following basic modes of operation: Cooling Mode, Heating Mode, Ventilation Mode, and Dehumidification Mode. The heating mode may utilize gas or electric heat (for example only, from a heat-pump system, a furnace, or a boiler). The dehumidification mode may utilize both the compressor and indoor fans, along with gas reheat.

In the cooling mode, the systems 10, 38, and 70 may utilize one or multiple cooling stages. The cooling mode can have multiple stages of cooling if two or more compressors are present or a multi stage compressor is present. Thus, in the examples of FIGS. 1A-1C, which include fixed-capacity compressors, FIGS. 1B and 1C may include multiple stages of cooling because multiple fixed-capacity compressors are present. Thus, for example, for system 70, the cooling mode may run compressor circuit 74 for cooling stage 1 and may run compressor circuit 78 for cooling stage 2.

The ventilation mode may utilize the indoor fan. The systems 10, 38, and 70 may attempt to employ free cooling by using an economizer, or outdoor ambient damper (OA damper), when an outside air temperature is below a pre-determined threshold. For example, if the outside air temperature is below 60 degrees, the systems 10, 38, and 70 may utilize an economizer for a first cooling stage and may utilize compressor circuit 1 (or the compressor circuit) for a second cooling stage.

The staging for the systems 10, 38, and 70 may be time based or supply air temperature (SAT) based, which only takes into account the indoor load and ignores outdoor ambient temperature (OAT).

Today, variable-frequency drive (VFD) retrofits for energy efficiency occur on the air side by retrofitting the indoor blower (ID blower) with a VFD. A VFD on an ID blower controls the speed of the motor driving the ID blower. Often, the motor is a three phase motor operating in high speed, medium speed, and low speed. The VFD results in energy saving because, when able, the motor can be set to run at lower speeds, drawing less current. Additionally, the VFD can also eliminate a spike in current at motor start-up by providing a slower start and preventing an inrush of current. This reduces stress on the components of the motor and extends motor life.

For additional energy savings, VFD retrofits may also be added to the fixed compressor to add modulation on the refrigerant side. For example, one or more of the compressors in systems 10, 38, and 70 may be retrofitted with a VFD to increase the capacity modulation capabilities of the compressor and the efficiencies of the systems. The VFD unit is installed in the power supply to the compressor motor. In this way, a traditionally fixed-speed compressor is converted to a multiple stage compressor, thereby allowing for energy efficient operation of the compressor.

Installation of the VFD unit on the compressor(s) results in energy savings because, when able, the compressor can be set to run at lower speeds, drawing less current while maintaining the desired temperature. Additionally, in some cases, the VFD may reduce stress on the components of the compressor, thereby extending compressor life. While it may be most beneficial to retrofit all compressors on a climate control system with a VFD, cost may drive the decision to retrofit a single compressor in a system having multiple compressors.

With reference to FIGS. 2A-2E, climate-control systems having one or more compressors retrofitted with a VFD are illustrated. While one or more compressors retrofitted with a VFD are discussed and illustrated herein, the present disclosure is not limited to compressors retrofitted with a VFD. It is understood that the one or more compressors may be variable capacity compressors or compressors with multiple stages. Variable-capacity compressors may include compressors having variable-frequency drive as well as other types of capacity modulation (e.g., scroll separation, blocked suction, bypass capacity modulation, etc.). Additionally, the climate-control systems may include compressor systems operable in multiple stages. The compressor system could include one compressor operable at multiple capacities or multiple compressors that are fixed capacity or variable capacity. The capacity or stage of the system may be changed with one variable-capacity compressor, or in a multiple-compressor system by selectively operating either one or both of the compressors (where either, both or none of the multiple compressors could be variable-capacity compressors).

Figure 2A:
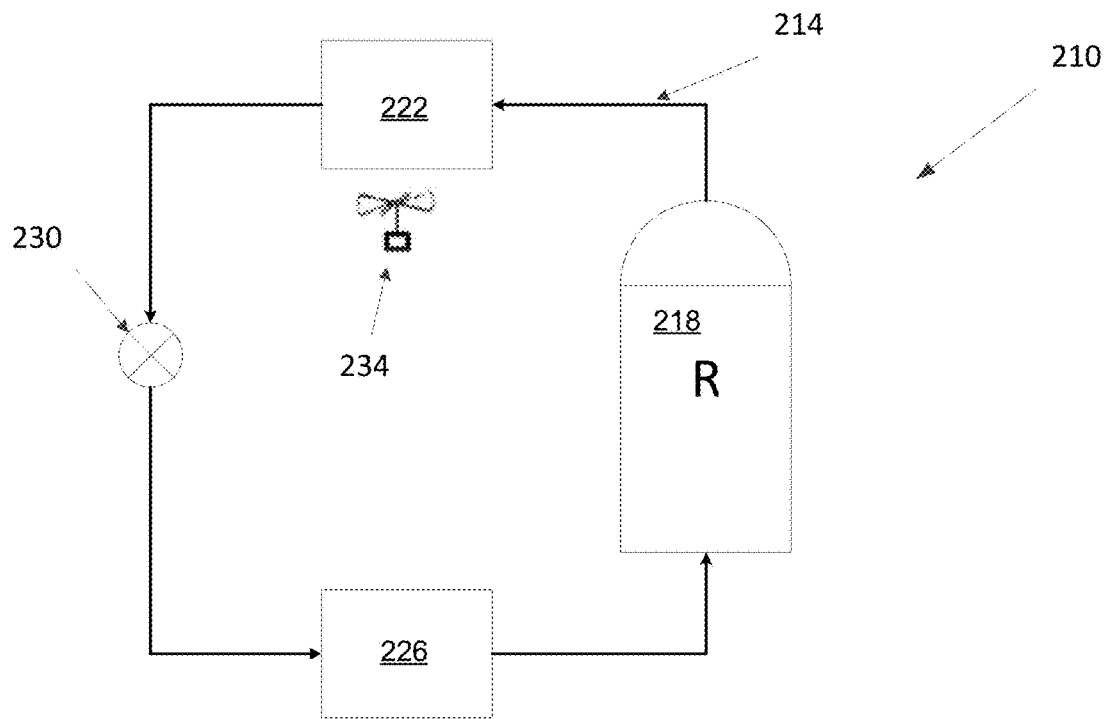
FIGS. 2A-2E illustrate example climate-control systems according to the present disclosure.

Referring to FIG. 2A, system 210 includes a single circuit 214 with a single compressor 218. The compressor 218 may be a fixed-capacity compressor retrofitted with a VFD, denoted by the letter "R". The circuit 214 may further include heat exchangers 222, 226, an expansion device 230, and a fan 234. In the particular configuration shown in FIG. 2A, the heat exchanger 222 is a condenser and the heat exchanger 226 is an evaporator.

Figure 2B:
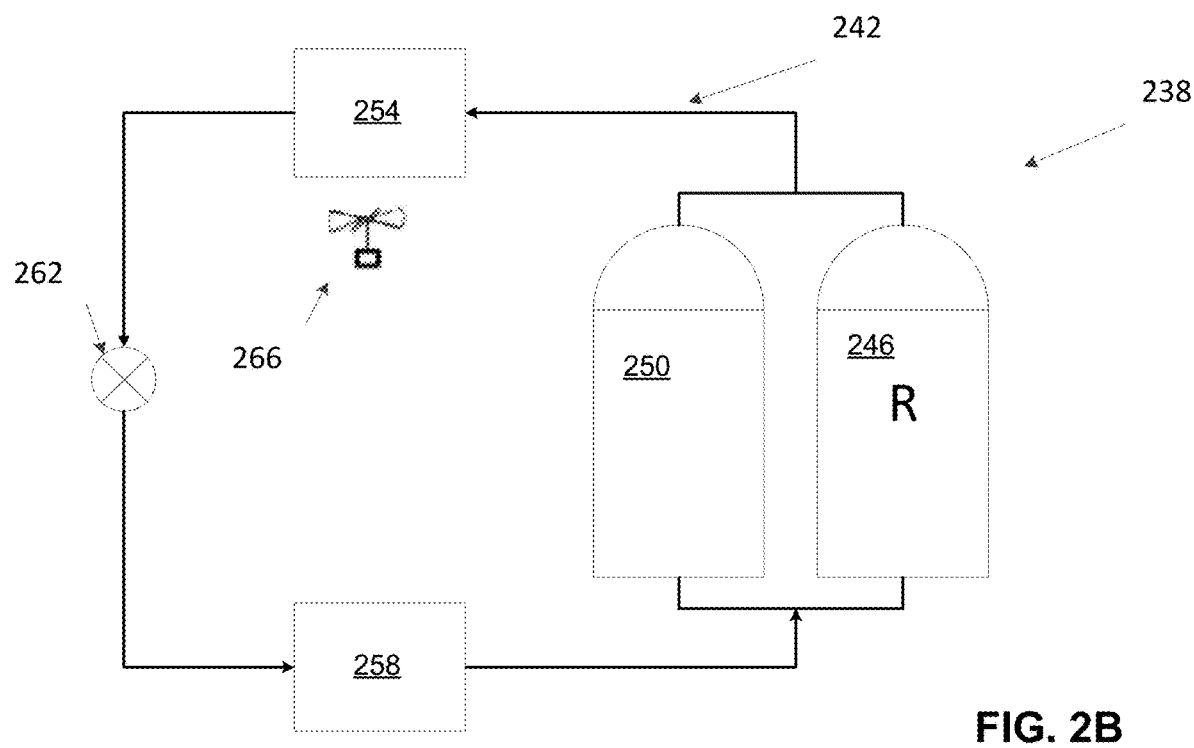

In FIG. 2B, system 238 includes a single circuit 242 with two compressors 246, 250 connected in tandem. Compressors 246 and 250 may both be fixed-capacity compressors; however, compressor 246 may be retrofitted with a VFD, denoted by the letter "R". The circuit 242 may further include heat exchangers 254, 258, an expansion device 262, and a fan 266. In the particular configuration shown in FIG. 2B, the heat exchanger 254 is a condenser and the heat exchanger 258 is an evaporator.

Figure 2C:
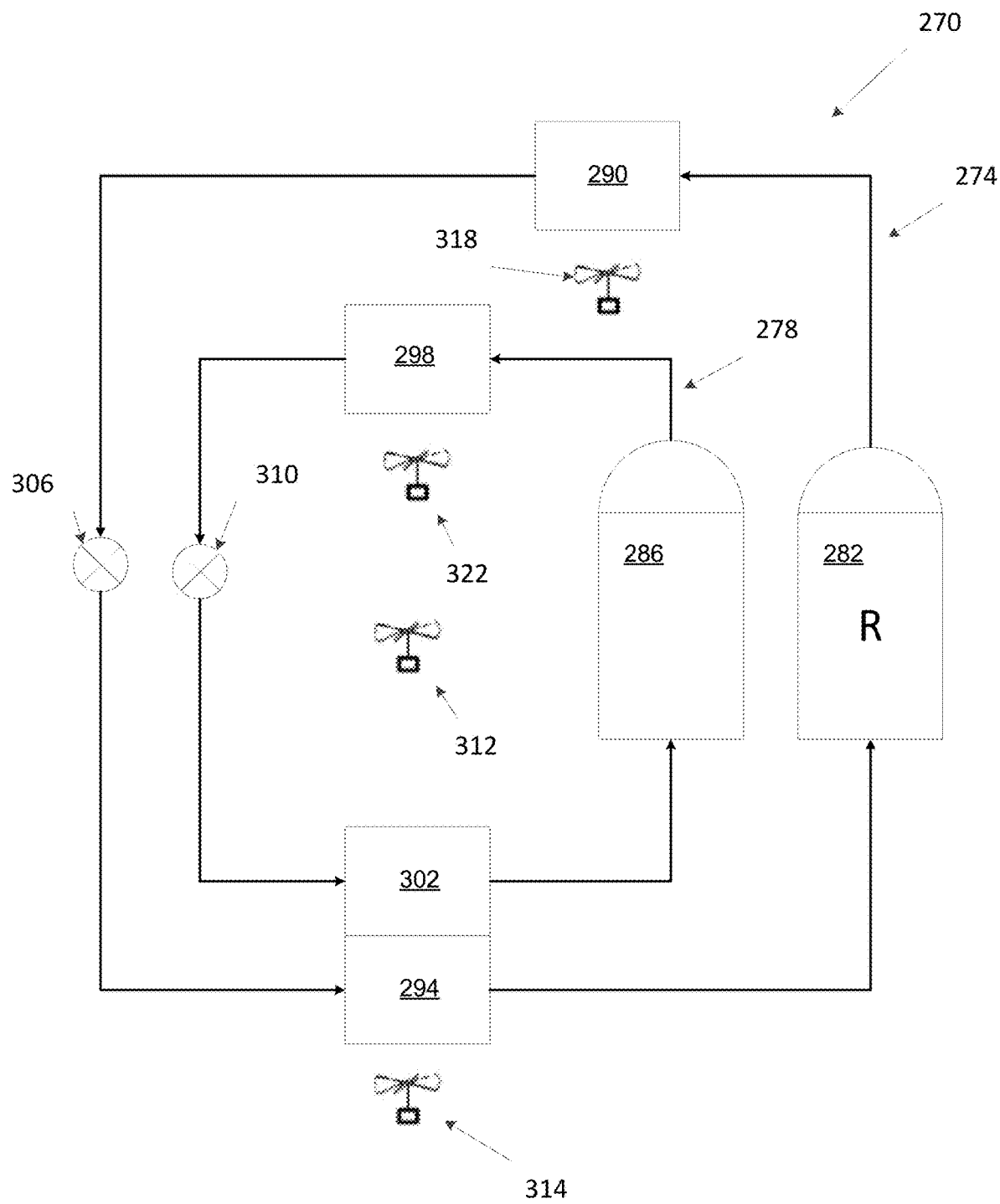

FIG. 2C illustrates a system 270 having two circuits 274, 278, each having a single compressor 282, 286, two heat exchangers 290, 294 and 298, 302, and an expansion device 306, 310. A power exhaust fan 312 may prevent pressurization of the conditioned space (the power exhaust fan 312 may be a field retrofit and may or may not be present on all units). The compressors 282, 286 may be fixed-capacity compressors; however, compressor 282 may be retrofitted with a VFD, denoted by the letter "R". In the particular configuration, heat exchangers 290 and 298 are condensers and heat exchangers 294 and 302 are evaporators. Heat exchangers 294 and 302 may further be a single slab evaporator having a single fan 314. Each of condensers 290 and 298 may also include a fan 318, 322.

Figure 2D:
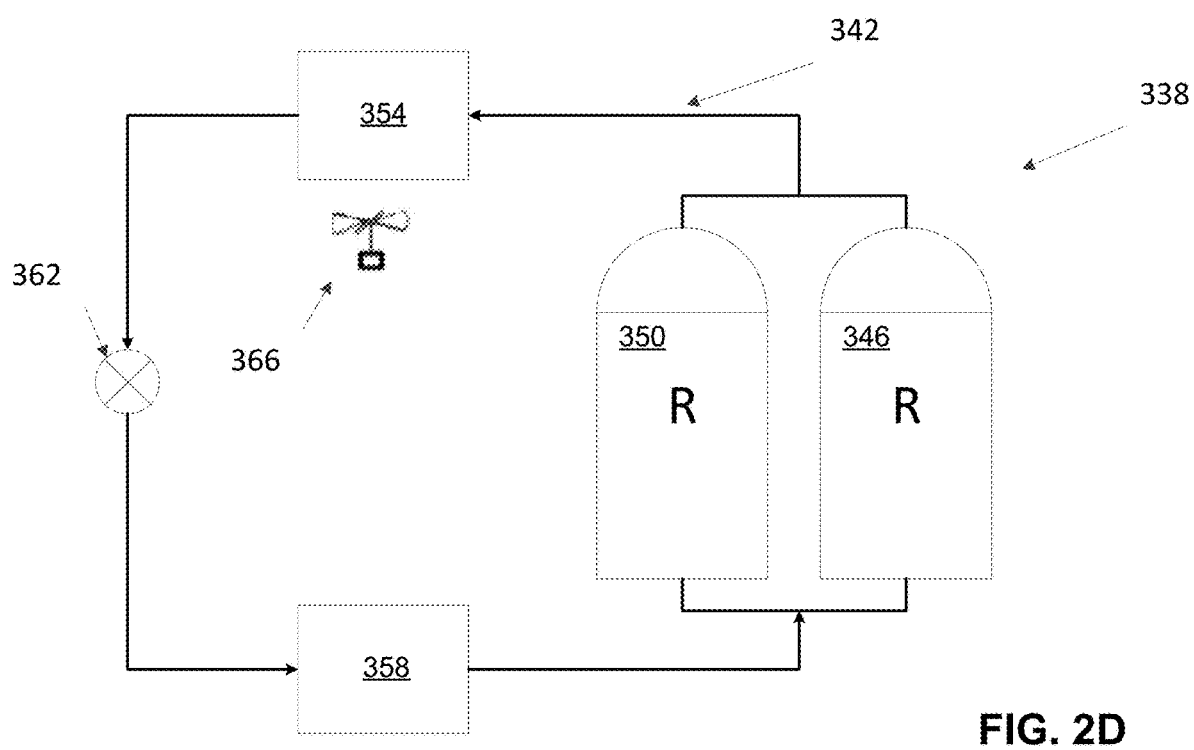

In FIG. 2D, system 338 includes a single circuit 342 with two compressors 346, 350 connected in tandem. Compressors 346 and 350 may both be fixed-capacity compressors, each retrofitted with a VFD, denoted by the letter "R". The circuit 342 may further include heat exchangers 354, 358, an expansion device 362, and a fan 366. In the particular configuration shown in FIG. 2D, the heat exchanger 354 is a condenser and the heat exchanger 358 is an evaporator.

Figure 2E:
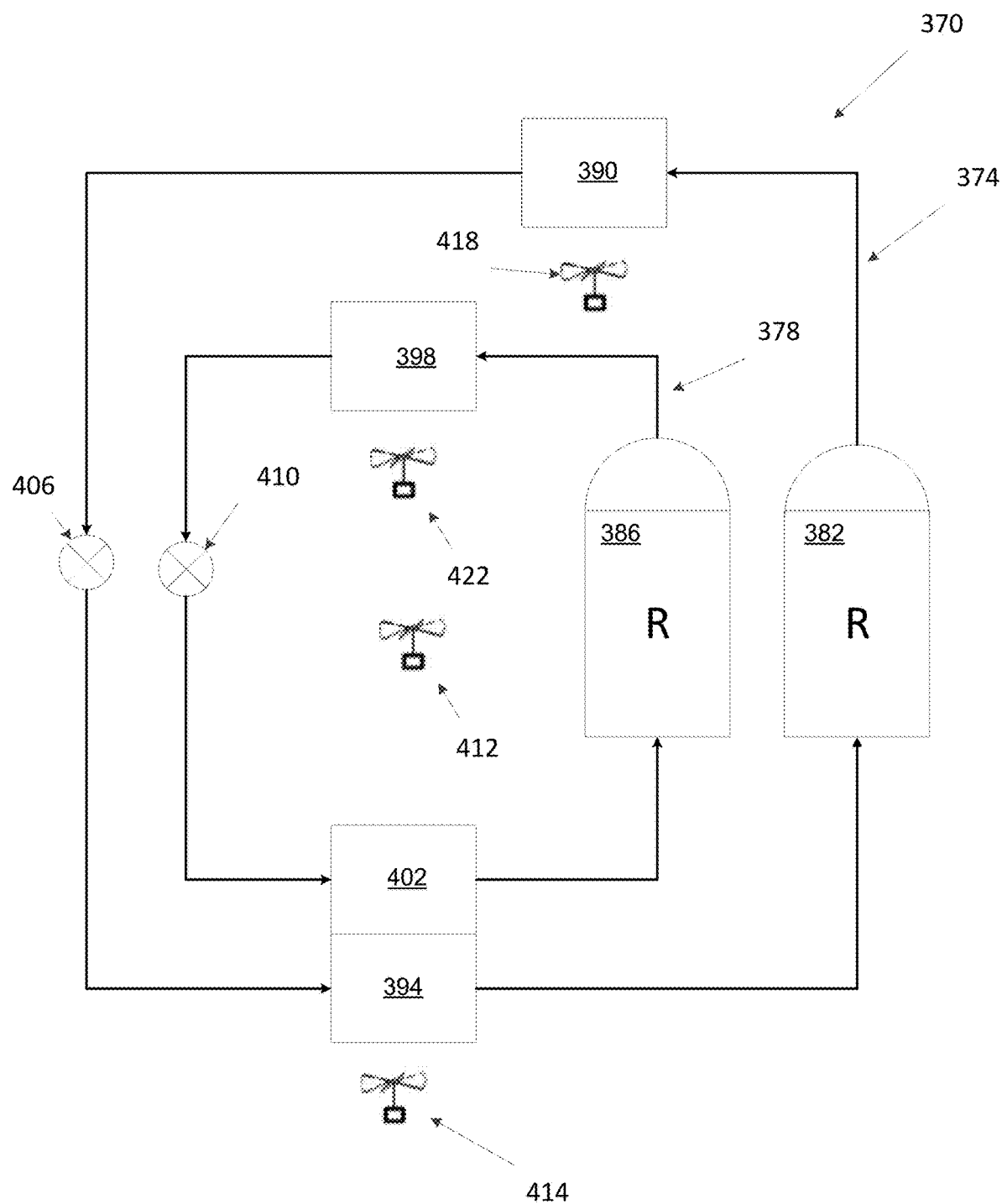

FIG. 2E illustrates a system 370 having two circuits 374, 378, each having a single compressor 382, 386, two heat exchangers 390, 394 and 398, 402, and an expansion device 406, 410. A power exhaust fan 412 may prevent pressurization of the conditioned space (the power exhaust fan 412 may be a field retrofit and may or may not be present on all units). The compressors 382, 386 may be fixed-capacity compressors, each retrofitted with a VFD, denoted by the letter "R". In the particular configuration, heat exchangers 390 and 398 are condensers and heat exchangers 394 and 402 are evaporators. Heat exchangers 394 and 402 may further be a single slab evaporator having a single fan 414. Each of condensers 390 and 398 may also include a fan 418, 422.

The compressors in each of the systems 10, 38, 70, 210, 238, 270, 338, 370 are controlled by a control system implementing a controller. The controller may receive signals from various inputs such as sensors and cooling demands. The cooling demands may come from thermostats (for example, single stage or two stage thermostats), mobile devices, cooling schedules, and the like. In FIGS. 3A-5C block diagrams of the controllers in each system 10, 38, 70, 210, 238, 270, 338, 370 are illustrated.

Figure 3A:
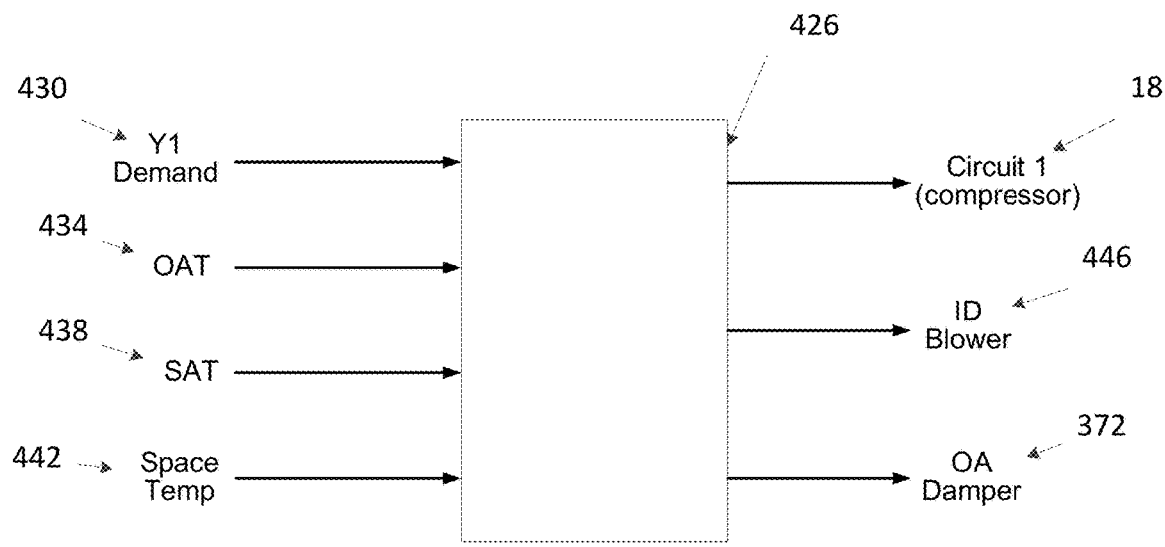
FIGS. 3A-5C are block diagrams for control systems for the climate-control systems of FIGS. 2A-2E.

Now referring to FIG. 3A, a controller 426 for controlling compressor 18 in system 10 is illustrated. Controller 426 may receive inputs from a cooling demand (or Y1 demand) 430, an outdoor air temperature (OAT) sensor 434, a supply air temperature (SAT) sensor 438, and a space temperature sensor 442. As previously stated, the compressor staging may be based on the SAT input from the SAT sensor 438. Thus, the compressor staging only takes into account the indoor load and ignores OAT. The space temperature sensor 442 may be used as a backup sensor for the SAT sensor 438 and may provide an offset for the compressor staging.

An outside air damper (OA damper) 372 may open and close to control a percent of outside air present in the system. The more the OA damper 372 opens, the greater the percent of outdoor air in the system.

The compressor 18 may run at 60 Hz fixed line power. An ID blower 446 may be a fixed-speed blower and may be controlled based on OAT. In some embodiments, the ID blower 446 may include a VFD unit, providing multiple stages of operation for the ID blower 446.

The OAT is utilized for heating and/or cooling lockouts and economizer operation, and the cooling demand is provided from a thermostat. The cooling demand 430 may be a binary signal to the controller 426, and the controller 426 may energize the compressor 18 and ID blower 446 based on the signal for the cooling demand 430.

Figure 3B:
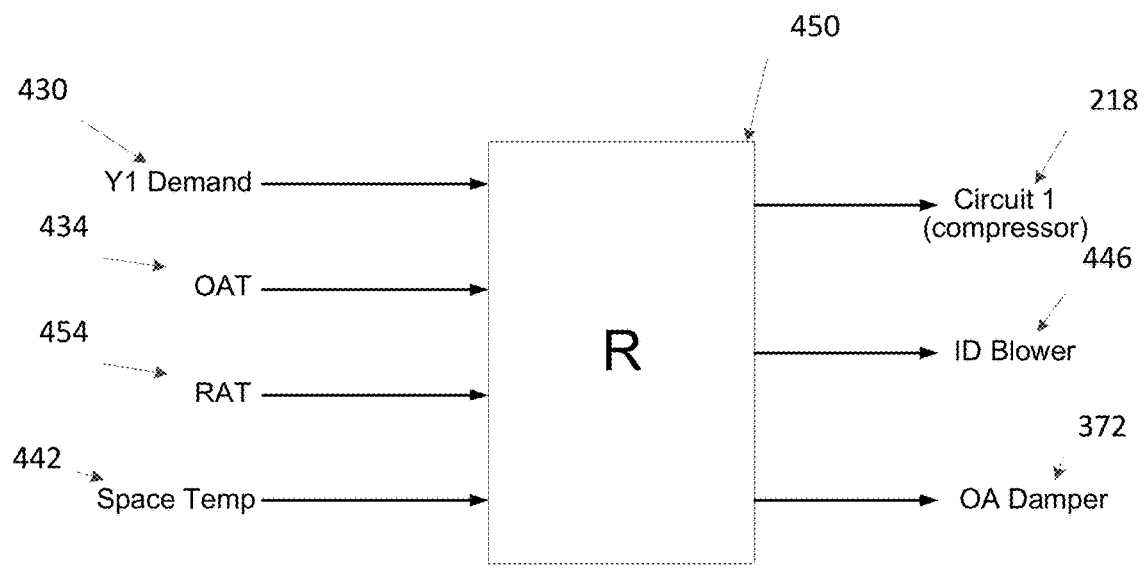

Now referring to FIG. 3B, an example of the retrofitted system 210 of FIG. 2A is illustrated. In the retrofitted system 210, a controller 450 controls the VFD retrofitted compressor 218. As illustrated in FIG. 3B, controller 450 may receive inputs from the cooling demand (or Y1 demand) 430, the outdoor air temperature sensor 434, a return air temperature (RAT) sensor 454, and the space temperature sensor 442. When the compressor 218 is retrofitted with the VFD unit to add multiple compression stages and create system 210, the RAT sensor 454 is added to the system 210 and may be placed generally in the climate-control system ductwork for the return air. The ID blower 446 may be the same ID blower 446 from the non-retrofitted system 10, or, in some embodiments, if the ID blower 446 was a fixed-speed blower, the ID blower 446 may also be retrofitted with a VFD unit, providing multiple fan speeds. Thus, the ID blower 446 may be a two-speed or multi speed blower. The OA damper 372 may be the same OA damper 372 from the non-retrofitted system 10.

A startup stage for the VFD retrofitted compressor 218 may be based on the cooling demand (or Y1 demand) 430 and the OAT from the OAT sensor 434. For example, with reference to FIG. 8A (further described below), the cooling demand 430 may come from a thermostat or an external device and may be a signal to turn the compressor 218 on. The controller 450 may look to a startup table (FIG. 8A, for example) to command a compression stage and frequency for the compressor 218. If the OAT is greater than 90° F., the controller 450 may command the compressor to operate at stage 4 with a frequency of 75 Hz. If the OAT is between 80° F. and 90° F., the controller 450 may command the compressor to operate at stage 3 with a frequency of 60 Hz. If the OAT is between 70° F. and 80° F., the controller 450 may command the compressor to operate at stage 2 with a frequency of 45 Hz. If the OAT is less than 70° F., the controller may command the compressor to operate at stage 1 with a frequency of 35 Hz.

After a time threshold (for example only, 20 minutes), compressor staging may be based on a slope of the RAT. The RAT is an effective indicator of the temperature in the space and may be a more accurate representation than the SAT or the space temperature. In the non-retrofitted system 10, the SAT sensor 438 is placed in the climate-control system ductwork for the supplied air. Thus, the SAT sensor 438 measures the temperature of the air supplied to a space to be cooled. The space temperature sensor(s) 442 are placed in one or more locations in the space to be cooled and measure the temperature only at that location. Therefore, the readings from the space temperature sensor(s) 442 may vary greatly from location to location due to electrical load, number of people, insulation, etc. Thus, the RAT sensor 454, which measures the temperature of the air in the climate-control system ductwork for the return air may provide a more accurate temperature measurement for the space to be cooled.

For example, the compressor staging may be based on the RAT and a run table (FIG. 8B), as described below. For example only, if a change in the RAT is neutral, the controller 450 may increase the compressor stage by 1, if a change in the RAT is positive, the controller 450 may increase the compressor stage by 2, and if a change in the RAT is negative, the controller 450 may decrease the compression stage by 2. The controller 450 may then set the operating frequency for the compressor based on the new stage in the run table (FIG. 8B). Additional details are provided below in the discussion of FIGS. 7, 8A, 8B, and 13-21.

If equipped, the VFD blower speed (for VFD ID blower 446) may be set according to the compressor staging. For example, the VFD blower speed may be commanded based on the compressor staging in the run table (for example, FIG. 8B). If an indoor relative humidity (ID RH) is within a predetermined range (for example, between 40% and 50% humidity), the VFD blower speed may be set to a fan speed in column A corresponding to the commanded compression stage. If the ID RH is greater than a first threshold (for example only, 50% humidity), the VFD blower speed may be set to a fan speed in column B corresponding to the commanded compression stage. If the ID RH is less than a second threshold (for example only, 40% humidity), the VFD blower speed may be set to a fan speed in column C corresponding to the commanded compression stage. The VFD blower speed may be increased to increase an evaporator temperature and increase a humidity of the conditioned space. The VFD blower speed may be decreased to decrease an evaporator temperature and enhance dehumidification. Additional details are provided in the discussion of FIGS. 7, 8A, 8B, and 13-21 below.

Figure 4A:
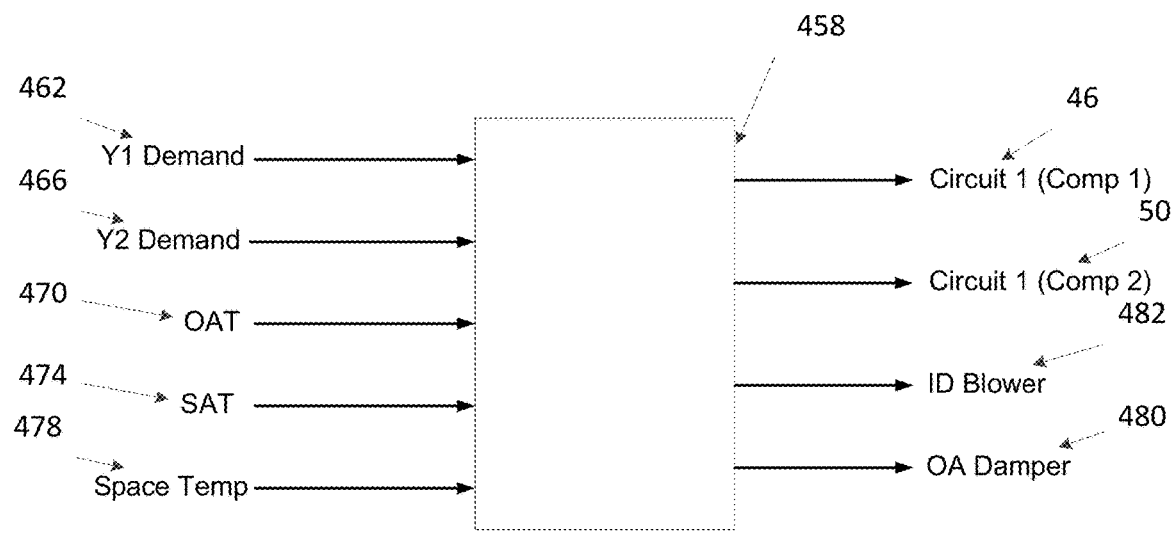

Now referring to FIG. 4A, a controller 458 for controlling compressors 46 and 50 in system 38 is illustrated. Controller 458 may be a single controller for controlling both compressors 46, 50 or may be multiple controllers, where each compressor 46, 50 is controlled by a different controller. Controller 458 may receive inputs from a cooling demand Y1 462, a cooling demand Y2 466, an outdoor air temperature (OAT) sensor 470, a supply air temperature (SAT) sensor 474, and a space temperature sensor 478.

As previously stated, the compressor staging may be based on the SAT input from the SAT sensor 474. Thus, the compressor staging only takes into account the indoor load and ignores OAT. The space temperature sensor 478 may be used as a backup sensor for the SAT sensor 474 and may provide an offset for the compressor staging.

An outside air damper (OA damper) 480 may open and close to control a percent of outside air present in the system. The more the OA damper 480 opens, the greater the percent of outdoor air in the system.

The compressors 46, 50 may run at 60 Hz fixed line power. An ID blower 482 may be a fixed-speed blower and may be controlled based on OAT. In some embodiments, the ID blower 482 may include a VFD unit, providing multiple stages of operation for the ID blower 482.

The OAT is utilized for heating and/or cooling lockouts and economizer operation, and the cooling demand is provided from a thermostat. The cooling demand Y1 462 is received from a thermostat and comes as a binary signal to the controller 458 which then energizes the compressor 46 and the ID blower 482. If the thermostat is a two stage thermostat, controller 458 receives the cooling demand Y2 466 from the thermostat. If the thermostat is not a two stage thermostat, the controller 458 receives the cooling demand Y2 466 based on SAT. The controller 458 then energizes the compressor 50 based on the cooling demand Y2.

Figure 4B:
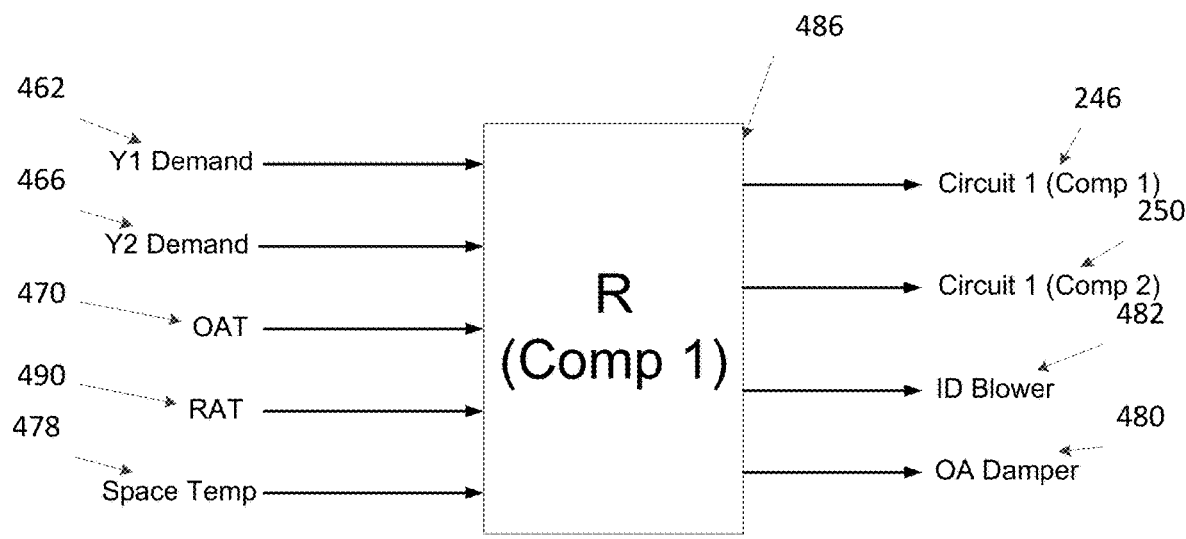

Now referring to FIG. 4B, the retrofitted system 238 from FIG. 2B is illustrated. In the retrofitted system 238, a controller 486 controls the VFD retrofitted compressor 246 and the non-retrofitted compressor 250. Controller 486 may be a single controller for controlling both compressors 246 and 250 or may be multiple controllers, where each compressor 246, 250 is controlled by a different controller. As illustrated in FIG. 4B, controller 486 may receive inputs from the cooling demand Y1 demand 462, the cooling demand Y2 466, the OAT sensor 470, a return air temperature (RAT) sensor 490, and the space temperature sensor 478.

When the compressor 246 is retrofitted with the VFD unit to add multiple compression stages and create system 238, the RAT sensor 490 may be added to the system 238 and may be placed generally in the climate-control system ductwork for the return air. The ID blower 482 may be the same ID blower 482 from the non-retrofitted system, or, in some embodiments, if the ID blower 482 was a fixed-speed blower, the ID blower 482 may also be retrofitted with a VFD unit, providing multiple fan speeds. Thus, the ID blower 482 may be a two-speed or multi speed blower. The OA damper 480 may be the same OA damper 480 from the non-retrofitted system 38.

Both compressors may be staged at startup based on the cooling demand Y1 462, the cooling demand Y2 466, and the OAT from the OAT sensor 470. The cooling demand Y1 462 is provided as a binary signal to the controller 486 which then energizes the compressor 246 and the ID blower 482 relay. The compressor 250 is energized based on the slope of the RAT (as described below).

At startup, for example with reference to FIG. 9A, the cooling demands 462, 466 may come from a thermostat or an external device and may be a signal to turn the compressors 246, 250 on. The controller 486 may look to a startup table (FIG. 9A, for example) to command a compression stage and frequency for the compressors 246, 250. If the OAT is greater than 90° F., the controller 486 may command the compressor 250 to the 5th compression stage at 60 Hz. If the OAT is between 80° F. and 90° F., the controller 486 may command the compressor 246 to operate at stage 4 with a frequency of 75 Hz. If the OAT is between 75° F. and 80° F., the controller 486 may command the compressor 246 to operate at stage 3 with a frequency of 60 Hz. If the OAT is between 70° F. and 75° F., the controller 486 may command the compressor 246 to operate at stage 2 with a frequency of 45 Hz. If the OAT is less than 70° F., the controller 486 may command the compressor 246 to operate at stage 1 with a frequency of 35 Hz.

After a time threshold (for example only, 20 minutes) from startup, compressor staging may be based on a slope of the RAT. As previously described, the RAT is an effective indicator of the temperature in the space. For example, the compressor staging may be based on the RAT and a run table (FIG. 9B), as described below. For example only, if a change in the RAT is neutral, the controller 486 may increase the compressor stage by 1, if a change in the RAT is positive, the controller 486 may increase the compressor stage by 2, and if a change in the RAT is negative, the controller 486 may decrease the compression stage by 2. The controller 486 may then set the operating frequency for the compressor based on the new stage in the run table (FIG. 9B). Additional details are provided below in the discussion of FIGS. 7, 9A, 9B, and 13-21.

If equipped, the VFD blower speed may be set according to the compressor staging. For example, the VFD blower speed may be commanded based on the compressor staging in the run table (for example, FIG. 9B). If an indoor relative humidity (ID RH) is within a predetermined range (for example, between 40% and 50% humidity), the VFD blower speed may be set to a fan speed in column A corresponding to the commanded compression stage. If the ID RH is greater than a first threshold (for example only, 50% humidity), the VFD blower speed may be set to a fan speed in column B corresponding to the commanded compression stage. If the ID RH is less than a second threshold (for example only, 40% humidity), the VFD blower speed may be set to a fan speed in column C corresponding to the commanded compression stage. The VFD blower speed may be increased to increase an evaporator temperature and increase a humidity of the conditioned space. The VFD blower speed may be decreased to decrease an evaporator temperature and limit dehumidification. Additional details are provided in the discussion of FIGS. 7, 8A, 8B, and 13-21 below.

Figure 4C:
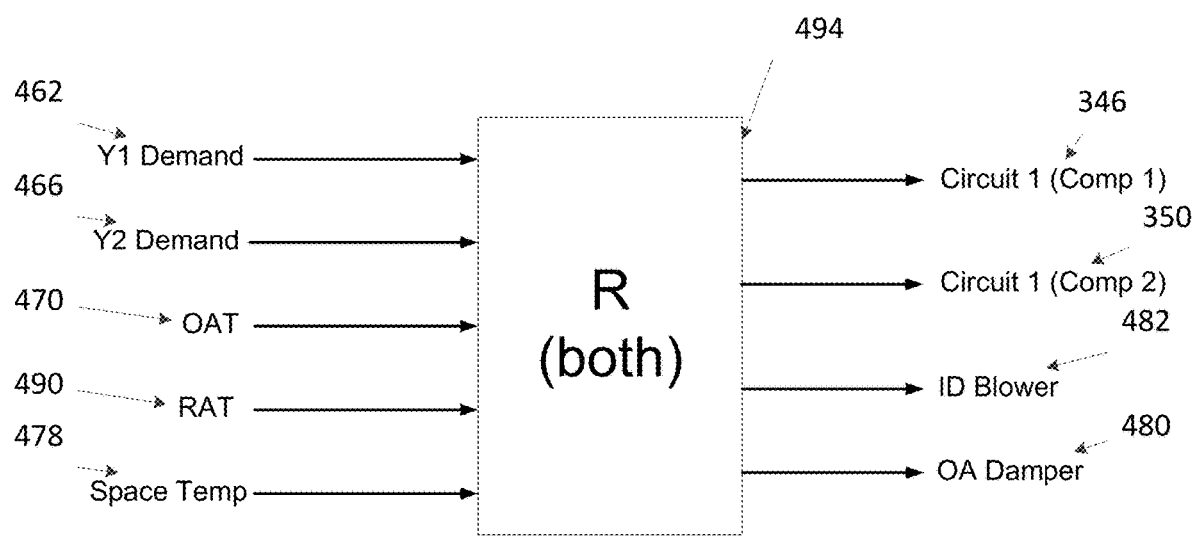

Now referring to FIG. 4C, the retrofitted system 338 from FIG. 2D is illustrated. In the retrofitted system 338, a controller 494 controls the VFD retrofitted compressors 346, 350. Controller 494 may be a single controller for controlling both compressors 346, 350 or may be multiple controllers, where each compressor 346, 350 is controlled by a different controller. As illustrated in FIG. 4C, controller 494 may receive inputs from the cooling demand Y1 demand 462, the cooling demand Y2 466, the OAT sensor 470, the return air temperature (RAT) sensor 490, and the space temperature sensor 478. As in the example of FIG. 4B, the ID blower 482 may be a two-speed blower or multi-speed blower.

Both compressors may be staged at startup based on the cooling demand Y1 462, the cooling demand Y2 466, and the OAT from the OAT sensor 470. The cooling demand Y1 462 is provided as a binary signal to the controller 486 which then energizes the compressor 346 and the ID blower 482 relay. The compressor 350 is energized based on the slope of the RAT (as described below).

For example, with reference to FIG. 10A, the cooling demand 462, 466 may come from a thermostat or an external device and may be a signal to turn the compressor(s) 346, 350 on. The controller 494 may look to a startup table (FIG. 10A, for example) to command a compression stage and frequency for the compressors 346, 350. If the OAT is greater than 90° F., the controller 494 may command the compressor 350 to operate at stage 5 with a frequency of 60 Hz. If the OAT is between 80° F. and 90° F., the controller 494 may command the compressor 346 to operate at stage 4 with a frequency of 75 Hz. If the OAT is between 75° F. and 80° F., the controller 494 may command the compressor 346 to operate at stage 3 with a frequency of 60 Hz. If the OAT is between 70° F. and 75° F., the controller 494 may command the compressor 346 to operate at stage 2 with a frequency of 45 Hz. If the OAT is less than 70° F., the controller 494 may command the compressor 346 to operate at stage 1 with a frequency of 35 Hz.

After a time threshold (for example only, 20 minutes), compressor staging may be based on a slope of the RAT. As previously described, the RAT is an effective indicator of the temperature in the space. For example, the compressor staging may be based on the RAT and a run table (FIG. 10B), as described below. For example only, if a change in the RAT is neutral, the controller 494 may increase the compressor stage by 1, if a change in the RAT is positive, the controller 494 may increase the compressor stage by 2, and if a change in the RAT is negative, the controller 494 may decrease the compression stage by 2. The controller 494 may then set the operating frequency for the compressor based on the new stage in the run table (FIG. 10B). Additional details are provided below in the discussion of FIGS. 7, 10A, 10B, and 13-21.

If equipped, the VFD blower speed may be set according to the compressor staging. For example, the VFD blower speed may be commanded based on the compressor staging in the run table (for example, FIG. 10B). If an indoor relative humidity (ID RH) is within a predetermined range (for example, between 40% and 50% humidity), the VFD blower speed may be set to a fan speed in column A corresponding to the commanded compression stage. If the ID RH is greater than a first threshold (for example only, 50% humidity), the VFD blower speed may be set to a fan speed in column B corresponding to the commanded compression stage. If the ID RH is less than a second threshold (for example only, 40% humidity), the VFD blower speed may be set to a fan speed in column C corresponding to the commanded compression stage. The VFD blower speed may be increased to increase an evaporator temperature and increase a humidity of the conditioned space. The VFD blower speed may be decreased to decrease an evaporator temperature and limit dehumidification. Additional details are provided in the discussion of FIGS. 7, 10A, 10B, and 13-21 below.

Figure 5A:
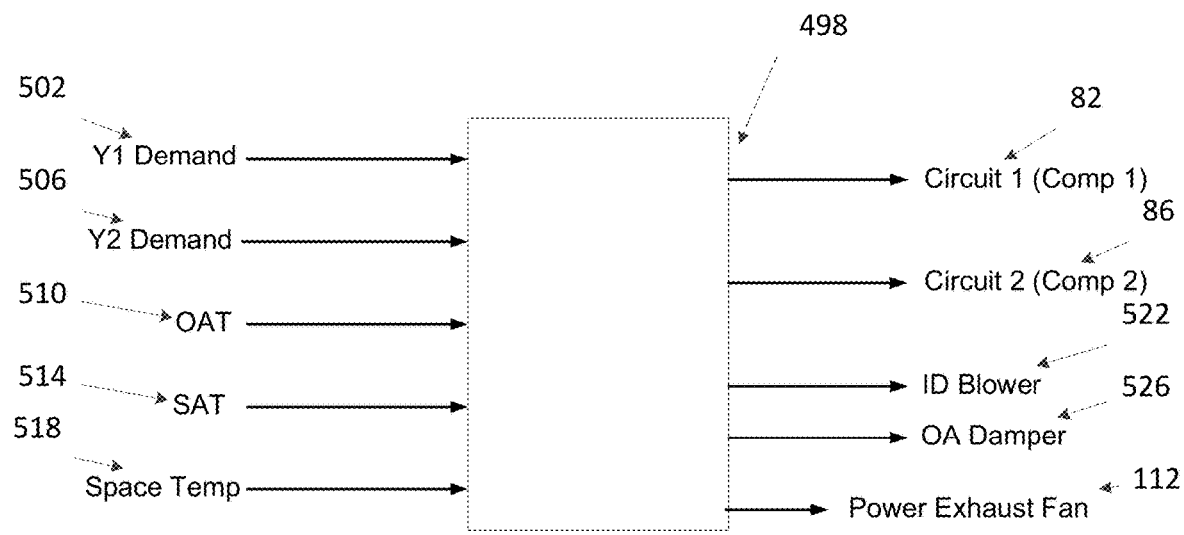

Now referring to FIG. 5A, a controller 498 for controlling compressors 82 and 86 in system 70 (FIG. 1C) is illustrated. Controller 498 may be a single controller for controlling both compressors 82 and 86 or may be multiple controllers, where each compressor 82, 86 is controlled by a different controller. Controller 498 may receive inputs from a cooling demand Y1 502, a cooling demand Y2 506, an outdoor air temperature (OAT) sensor 510, a supply air temperature (SAT) sensor 514, and a space temperature sensor 518.

As previously stated, the compressor staging may be based on the SAT input from the SAT sensor 514. Thus, the compressor staging only takes into account the indoor load. The space temperature sensor 518 may be used as a backup sensor for the SAT sensor 514 and may provide an offset for the compressor staging.

The compressors 82, 86 may run at 60 Hz fixed line power. An ID blower 522 may be a fixed-speed blower and may be controlled based on OAT. In some embodiments, the ID blower 522 may include a VFD unit, providing multiple stages of operation for the ID blower 522.

The OAT is utilized for heating and/or cooling lockouts and economizer operation, and the cooling demand is provided from a thermostat. The cooling demand Y1 502 is received from a thermostat and comes as a binary signal to the controller 498 which then energizes the compressor 82 and the ID blower 522. If the thermostat is a two stage thermostat, controller 498 receives the cooling demand Y2 506 from the thermostat. If the thermostat is not a two stage thermostat, the controller 494 receives the cooling demand Y2 506 based on SAT. The controller 498 then energizes the compressor 86 based on the cooling demand Y2 506.

An outdoor ambient damper (OA damper) 526 may control the percent of outside air present in the system. The more the OA damper 526 opens, the greater the percent of outdoor air in the system. When the OA damper 526 is more than a predetermined percentage open (for example, greater than 30% open), the power exhaust fan 112 may be switched on to prevent pressurization of the conditioned space (the power exhaust fan 112 may be a field retrofit and may or may not be present on all units).

Figure 5B:
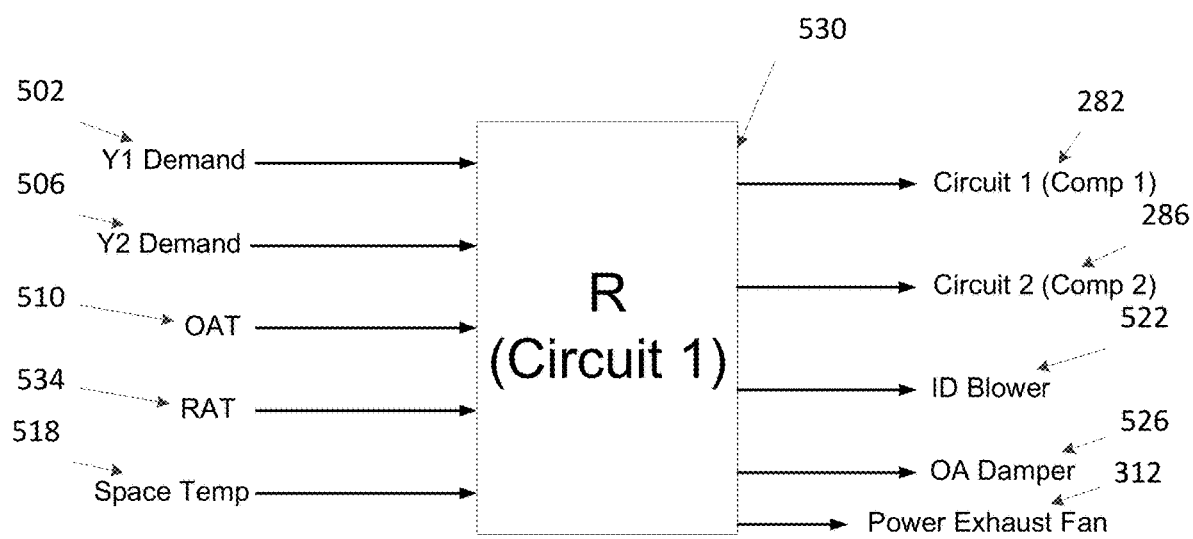

Now referring to FIG. 5B, an example of the retrofitted system 270 illustrated in FIG. 2C is provided. In the retrofitted system 270, a controller 530 controls the VFD retrofitted compressor 282 and the non-retrofitted compressor 286. Controller 530 may be a single controller for controlling both compressors 282 and 286 or may be multiple controllers, where each compressor 282, 286 is controlled by a different controller. As illustrated in FIG. 5B, controller 530 may receive inputs from the cooling demand Y1 502, the cooling demand Y2 506, the OAT sensor 510, a return air temperature (RAT) sensor 534, and the space temperature sensor 518.

When the compressor 282 is retrofitted with the VFD unit to add multiple compression stages and create system 270, the RAT sensor 534 may be added to the system 270 and may be placed generally in the climate-control system ductwork for the return air. The ID blower 522 may be the same ID blower 522 from the non-retrofitted system, or, in some embodiments, if the ID blower 522 was a fixed-speed blower, the ID blower 522 may also be retrofitted with a VFD unit, providing multiple fan speeds. Thus, the ID blower 522 may be a two-speed or multi-speed blower.

Both compressors 282, 286 may be staged at startup based on the cooling demand Y1 502, the cooling demand Y2 506, and the OAT from the OAT sensor 510. The cooling demand Y1 502 is provided as a binary signal to the controller 530 which then energizes the compressor 282 and the ID blower 522 relay. The compressor 286 is energized based on the slope of the RAT (as described below) from the RAT sensor 534.

For example, with reference to FIG. 11A, the cooling demand 502, 506 may come from a thermostat or an external device and may be a signal to turn the compressor 282, 286 on. The controller 530 may look to a startup table (FIG. 11A, for example) to command a compression stage and frequency for the compressors 282, 286. If the OAT is greater than 95° F., the controller 530 may command the compressors 282 and 286 to operate at stage 9, each at a frequency of 60 Hz. If the OAT is between 90° F. and 95° F., the controller 530 may command the compressors 282, 286 to operate at stage 8 with a frequency of 45 Hz and 60 Hz, respectively. If the OAT is between 85° F. and 90° F., the controller 530 may command the compressors 282, 286 to operate at stage 7 with a frequency of 35 Hz and 60 Hz, respectively. If the OAT is between 80° F. and 85° F., the controller 530 may command the compressors 282, 286 to operate at stage 6, each at a frequency of 45 Hz. If the OAT is between 75° F. and 80° F., the controller 530 may command the compressors 282, 286 to operate at stage 5 with a frequency of 35 Hz and 45 Hz, respectively. If the OAT is between 70° F. and 75° F., the controller 530 may command the compressors 282, 286 to operate at stage 4, each with a frequency of 35 Hz. If the OAT is between 65° F. and 70° F., the controller 530 may command the compressors 282, 286 to operate at stage 3 with a frequency of 60 Hz and 0 Hz, respectively. If the OAT is between 60° F. and 65° F., the controller 530 may command the compressors 282, 286 to operate at stage 2 with a frequency of 45 Hz and 0 Hz, respectively. If the OAT is less than 60° F., the controller 530 may command the compressors 282, 286 to operate at stage 1 with a frequency of 35 Hz and 0 Hz, respectively.

After a time threshold (for example only, 20 minutes), compressor staging may be based on a slope of the RAT from the RAT sensor 534. As previously described, the RAT is an effective indicator of the temperature in the space. For example, the compressor staging may be based on the RAT and a run table (FIG. 11B), as described below. For example only, if a change in the RAT is neutral, the controller 530 may increase the compressor stage by 1, if a change in the RAT is positive, the controller 530 may increase the compressor stage by 2, and if a change in the RAT is negative, the controller 530 may decrease the compression stage by 2. The controller 530 may then set the operating frequency for the compressors based on the new stage in the run table (FIG. 11B). Additional details are provided below in the discussion of FIGS. 7, 11A, 11B, and 13-21.

If equipped, the VFD blower speed may be set according to the compressor staging. For example, the VFD blower speed may be commanded based on the compressor staging in the run table (for example, FIG. 11B). If an indoor relative humidity (ID RH) is within a predetermined range (for example, between 40% and 50% humidity), the VFD blower speed may be set to a fan speed in column A corresponding to the commanded compression stage. If the ID RH is greater than a first threshold (for example only, 50% humidity), the VFD blower speed may be set to a fan speed in column B corresponding to the commanded compression stage. If the ID RH is less than a second threshold (for example only, 40% humidity), the VFD blower speed may be set to a fan speed in column C corresponding to the commanded compression stage. The VFD blower speed may be increased to increase an evaporator temperature and increase a humidity of the conditioned space. The VFD blower speed may be decreased to decrease an evaporator temperature and limit dehumidification. Additional details are provided in the discussion of FIGS. 7, 11A, 11B, and 13-21 below.

The OA damper 526 may control the percent of outside air present in the system. The more the OA damper opens, the greater the percent of outdoor air in the system. When the OA damper 526 is more than a predetermined percentage open (for example, greater than 30% open), the power exhaust fan 312 may be switched on to prevent pressurization of the conditioned space (the power exhaust fan 312 may be a field retrofit and may or may not be present on all units).

Figure 5C:
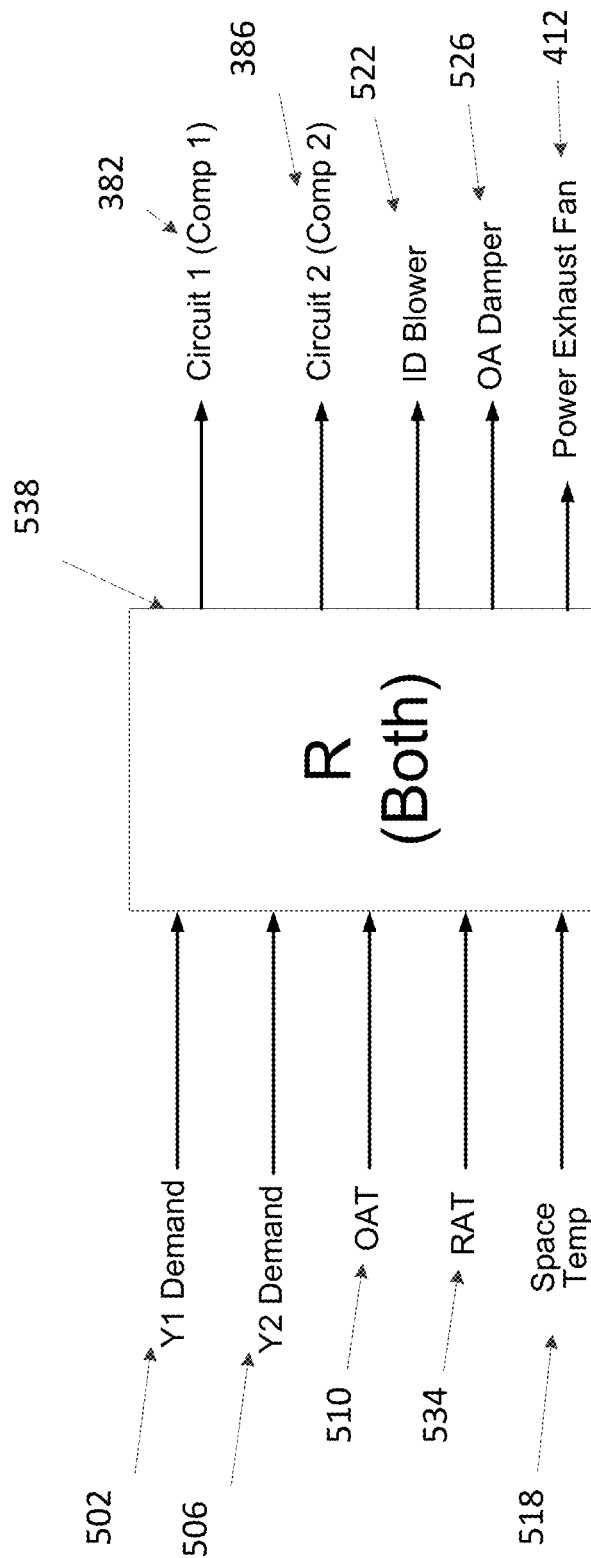
Figure 6:
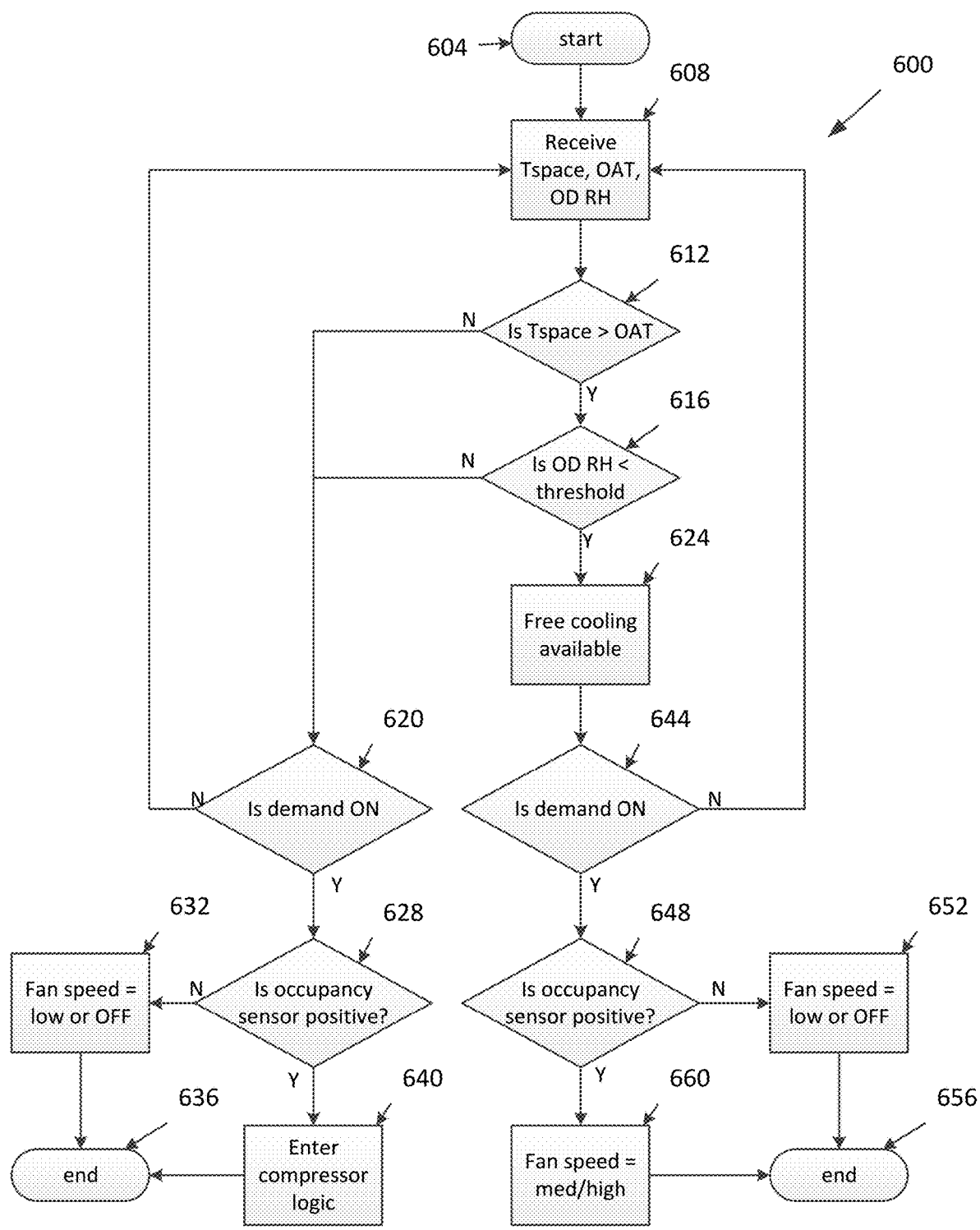
FIG. 6 is a flow diagram for a method of free cooling according to the present disclosure.

Now referring to FIG. 5C, an example of the retrofitted system 370 illustrated in FIG. 2E is provided. In the retrofitted system 370, a controller 538 controls the VFD retrofitted controllers 382 and 386. Controller 538 may be a single controller for controlling both compressors 382 and 386 or may be multiple controllers, where each compressor 382, 386 is controlled by a different controller. As illustrated in FIG. 5C, controller 538 may receive inputs from the cooling demand Y1 502, the cooling demand Y2 506, the OAT sensor 510, the return air temperature (RAT) sensor 534, and the space temperature sensor 518. As in the example of FIG. 5B, the ID blower 522 may be a two-speed blower or multi-speed blower.

Both compressors 382, 386 may be staged at startup based on the cooling demand Y1 502, the cooling demand Y2 506, and the OAT from the OAT sensor 510. The cooling demand Y1 502 is provided as a binary signal to the controller 538 which energizes the compressor 382 and the ID blower 522 relay. The compressor 386 is energized based on the slope of the RAT (as described below).

For example, with reference to FIG. 12A, the cooling demand 502, 506 may come from a thermostat or an external device and may be a signal to turn the compressor 382, 386 on. The controller 530 may look to a startup table (FIG. 12A, for example) to command a compression stage and frequency for the compressors 382, 386. If the OAT is greater than 95° F., the controller 538 may command the compressors 382 and 386 to operate at stage 9, each at a frequency of 60 Hz. If the OAT is between 90° F. and 95° F., the controller 538 may command the compressors 382, 386 to operate at stage 8 with a frequency of 45 Hz and 60 Hz, respectively. If the OAT is between 85° F. and 90° F., the controller 538 may command the compressors 382, 386 to operate at stage 7 with a frequency of 35 Hz and 60 Hz, respectively. If the OAT is between 80° F. and 85° F., the controller 538 may command the compressors 382, 386 to operate at stage 6, each at a frequency of 45 Hz. If the OAT is between 75° F. and 80° F., the controller 538 may command the compressors 382, 386 to operate at stage 5 with a frequency of 35 Hz and 45 Hz, respectively. If the OAT is between 70° F. and 75° F., the controller 538 may command the compressors 382, 386 to operate at stage 4, each with a frequency of 35 Hz. If the OAT is between 65° F. and 70° F., the controller 538 may command the compressors 382, 386 to operate at stage 3 with a frequency of 60 Hz and 0 Hz, respectively. If the OAT is between 60° F. and 65° F., the controller 538 may command the compressors 382, 386 to operate at stage 2 with a frequency of 45 Hz and 0 Hz, respectively. If the OAT is less than 60° F., the controller 538 may command the compressors 382, 386 to operate at stage 1 with a frequency of 35 Hz and 0 Hz, respectively.

After a time threshold (for example only, 20 minutes), compressor staging may be based on a slope of the RAT from the RAT sensor 534. As previously described, the RAT is an effective indicator of the temperature in the space or the thermal load in the conditioned space. For example, the compressor staging may be based on the RAT and a run table (FIG. 12B), as described below. For example only, if a change in the RAT is neutral, the controller 538 may increase the compressor stage by 1, if a change in the RAT is positive, the controller 538 may increase the compressor stage by 2, and if a change in the RAT is negative, the controller 538 may decrease the compression stage by 2. The controller 538 may then set the operating frequency for the compressor based on the new stage in the run table (FIG. 12B). Additional details are provided below in the discussion of FIGS. 7, 12A, 12B, and 13-21.

If equipped, the VFD blower speed may be set according to the compressor staging. For example, the VFD blower speed may be commanded based on the compressor staging in the run table (for example, FIG. 12B). If an indoor relative humidity (ID RH) is within a predetermined range (for example, between 40% and 50% humidity), the VFD blower speed may be set to a fan speed in column A corresponding to the commanded compression stage. If the ID RH is greater than a first threshold (for example only, 50% humidity), the VFD blower speed may be set to a fan speed in column B corresponding to the commanded compression stage. If the ID RH is less than a second threshold (for example only, 40% humidity), the VFD blower speed may be set to a fan speed in column C corresponding to the commanded compression stage. The VFD blower speed may be increased to increase an evaporator temperature and increase a humidity of the conditioned space. The VFD blower speed may be decreased to decrease an evaporator temperature and limit dehumidification. Additional details are provided in the discussion of FIGS. 7, 12A, 12B, and 13-21 below.

The OA damper 526 may control the percent of outside air present in the system. The more the OA damper opens, the greater the percent of outdoor air in the system. When the OA damper 526 is more than a predetermined percentage open (for example, greater than 30% open), the power exhaust fan 412 may be switched on to prevent pressurization of the conditioned space (the power exhaust fan 412 may be a field retrofit and may or may not be present on all units).

Now referring to FIGS. 6-21, methods for controlling compressors are illustrated. The method of control is designed to minimize use of the second circuit or second compressor and therefore maximize efficiency. Further, the method maximizes utilization of the economizer mode (previously explained) based on one or a combination of sensors (for example only, outdoor relative humidity, OAT, occupancy sensor, space temperature, RAT, and SAT). When the cooling demand comes ON, the controller selects compressor staging based on an OAT startup table (for example, FIGS. 8A, 9A, 10A, 11A, 12A). When the demand remains ON and a system run time is greater than a threshold (for example, 20 minutes), the controller selects compressor staging based on a run table (for example, FIGS. 8B, 9B, 10B, 11B, 12B). In some embodiments, the compressor and indoor fan may be utilized for humidity control in the space. In these embodiments, one or a combination of sensors (for example only, outdoor relative humidity, OAT, occupancy sensor, space temperature, RAT, and SAT) may be referenced to determine settings for the compressor and indoor fan. In some embodiments, humidity control may cover both humidification and dehumidification in the conditioned space.

Thus, the method combines the indoor load and the outdoor load to determine compressor staging. The slope and absolute value of RAT is used as a primary control parameter which may be augmented by space or return air relative humidity. Further, the indoor fan blower may be utilized for both humidification and dehumidification.

The methods may employ free cooling (or economizer mode) for efficiency. Now referring to FIG. 6, a method 600 for free cooling is illustrated. One or a combination of sensors (for example only, space temperature, RAT, SAT, OAT, indoor relative humidity, outdoor relative humidity, return air humidity, occupancy sensor, and compressor demand signal) may be utilized in determining when to operate in economizer mode and in which fan settings to operate. The method 600 starts at 604. At 608, the controller receives the space temperature, the OAT, and outdoor relative humidity (OD RH) from respective sensors. At 612, the controller determines whether the space temperature is greater than the OAT. If true, the controller determines whether the outdoor relative humidity is greater than a threshold (for example, 40%) at 616. If false at 612, the controller determines whether the demand for cooling is ON at 620.

If the OD RH is greater than the threshold at 616, the free cooling or economizer mode becomes available at 624. In some embodiments, the enthalpy relationship between RAT and OAT may be leveraged to determine whether free cooling is available.

If the OD RH is not greater than the threshold at 616, the controller determines whether the demand for cooling is ON at 620. If the demand for cooling is not ON, the controller returns to 608. If the demand for cooling is ON at 620, the controller determines whether the occupancy sensor is positive, indicating that the space is occupied, at 628. The occupancy can be programmed through a time of day setting, a CO2 sensor in the return air duct of the system, light sensors in the space, or any other sensors or methods for determining occupancy of the space.

If the occupancy sensor is not positive at 628 (indicating that the space is unoccupied), the controller sets the fan speed to low or OFF at 632. Thus, when the demand for cooling is ON, free cooling is unavailable, and the space is unoccupied, the fan speed is set to low or OFF. The method 600 then ends at 636.

If the occupancy sensor is positive at 628, the controller enters the compressor logic (described with reference to FIGS. 7-21) at 640. Thus, when the demand for cooling is ON, free cooling is unavailable, and the space is occupied, the controller enters the compressor logic. The method 600 then ends at 636.

If free cooling became available at 624, the controller determines whether the demand for cooling is ON at 644. If the demand for cooling is not ON, the controller returns to 608. If the demand for cooling is ON at 644, the controller determines whether the occupancy sensor is positive, indicating that the space is occupied, at 648. The occupancy can be programmed through a time of day setting, a CO2 sensor in the return air duct of the system, light sensors in the space, or any other sensors or methods for determining occupancy of the space.

If the occupancy sensor is not positive at 648 (indicating that the space is unoccupied), the controller sets the fan speed to low or off at 652. Thus, when the demand for cooling is ON, free cooling is available, and the space is unoccupied, the fan speed is set to low or off. The method 600 then ends at 656.

If the occupancy sensor is positive at 648, the controller sets the fan speed to medium/high at 660. Thus, when the demand for cooling is ON, free cooling is available, and the space is occupied, the fan speed is set to medium/high. The method 600 then ends at 656.

Figure 7:
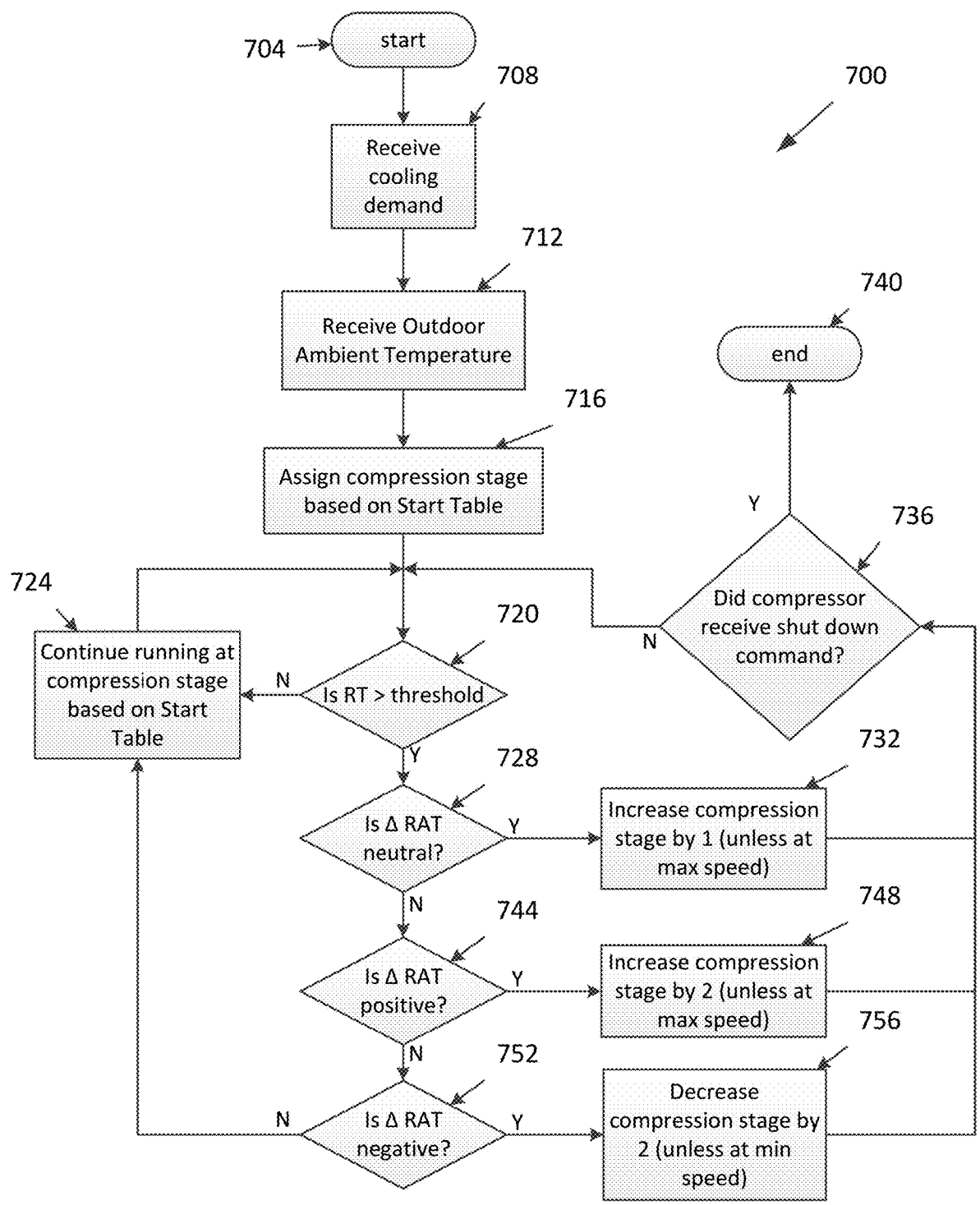
FIG. 7 is a flow diagram for an example method of controlling a climate-control system according to the present disclosure.

Now referring to FIG. 7, a method 700 for controlling the compressors is illustrated. Method 700 begins at 704. At 708, the controller receives a cooling demand. The cooling demand may be provided based on a space sensor, thermostat, or any other trigger.

At 712, the controller receives an OAT. The OAT may be provided from an OAT sensor. The controller determines the compression stage based on the OAT at 716. In some embodiments, the controller may set the compression stage from a startup table (for example, FIGS. 8A, 9A, 10A, 11A, 12A). For example, with reference to FIGS. 2A, 3B, and 8A, if the controller receives an OAT greater than 90° F., the controller will run in compression stage 4, setting the compressor 218 to run at a frequency of 75 Hz. If the controller receives an OAT within the range of 80-90° F., the controller will run in compression stage 3, setting the compressor 218 to run at a frequency of 60 Hz. If the controller receives an OAT within the range of 70-80° F., the controller will run in compression stage 2, setting the compressor 218 to run at a frequency of 45 Hz. If the controller receives an OAT less than 70° F., the controller will run in compression stage 1, setting the compressor 218 to run at a frequency of 35 Hz.

At 720, the controller determines whether a run time of the compressor exceeds a predetermined threshold (for example only, 20 minutes). The run time threshold may be an optimal cycling time for the compressor. If the compressor cycles on and off in a run time less than 20 minutes, the cycling may be considered too frequent, whereas, if the compressor remains running for more than 20 minutes, additional power or fan cooling may be necessary to meet the cooling demand. If the run time does not exceed the threshold at 720, the controller may continue running the current compression stage based on the start table at 724 and return to 720.

If the run time exceeds the threshold at 720, the controller determines whether the slope of RAT (i.e., $\Delta$RAT) is neutral at 728. The $\Delta$RAT is the change in return air temp (RAT) over the run time. For example, if the RAT when the cooling demand was received (at 708) was 85° F. and the RAT after 20 minutes run time is 70° F. The $\Delta$RAT is −15° F. A neutral $\Delta$RAT is equal to approximately 0° F. For example, the neutral ΔRAT may be equal to 0° F. plus or minus 0.5° F. Thus, in the example here, the ΔRAT is not neutral.

If the ΔRAT is neutral at 728, the controller increases the compression stage by 1 unless the compressor is operating at maximum speed (i.e., at compression stage 4 in FIG. 8A, compression stage 5 in FIGS. 9A and 10A, compression stage 9 in FIGS. 11A and 12A). Thus, in the example above relating to FIGS. 2A, 3B, and 8A, if the compressor was running at stage 3 (a startup OAT within the range of 80-90° F.), the controller would change the compression stage to stage 4. If the compressor was running at stage 2 (a startup OAT within the range of 70-80° F.), the controller would change the compression stage to stage 3. If the compressor was running at stage 1 (a startup OAT less than 70° F.), the controller would change the compression stage to stage 2.

At 736, the controller determines whether the compressor receives a shutdown command (i.e., the cooling command is met). The shutdown command may come from a sensor or thermostat. If true at 736, the method 700 ends at 740. If false at 736, the method 700 returns to 720.

If the ΔRAT is not neutral at 728 (for example, as in the example discussed above where ΔRAT is −15° F.), the controller determines whether ΔRAT is positive at 744. A positive ΔRAT is any number greater than 0° F. (i.e., greater than neutral). For example, if the RAT when the cooling demand was received (at 708) was 85° F. and the RAT after 20 minutes run time is 90° F. The ΔRAT is 5° F.

When ΔRAT is positive, the controller increases the compression stage by 2 (unless at the maximum compressor speed) at 748. Thus, in the example above relating to FIGS. 2A, 3B, and 8A, if the compressor was running at stage 3 (a startup OAT within the range of 80-90° F.), the controller would change the compression stage to stage 4. If the compressor was running at stage 2 (a startup OAT within the range of 70-80° F.), the controller would change the compression stage to stage 4. If the compressor was running at stage 1 (a startup OAT less than 70° F.), the controller would change the compression stage to stage 3.

At 736, the controller determines whether the compressor receives a shutdown command (i.e., the cooling command is met). The shutdown command may come from a sensor or thermostat. If true at 736, the method 700 ends at 740. If false at 736, the method 700 returns to 720.

If the ΔRAT is not positive at 744, the controller determines whether ΔRAT is negative at 752. A negative ΔRAT is any number less than 0° F. (i.e., less than neutral). As in the example above, if the RAT when the cooling demand was received (at 708) was 85° F. and the RAT after 20 minutes run time is 70° F., the ΔRAT is −15° F.

If false at 752, the method 700 returns to 724. When ΔRAT is negative at 752, the controller decreases the compression stage by 2 (unless at the minimum compressor speed) at 756. Thus, in the example above relating to FIGS. 2A, 3B, and 8A, if the compressor was running at stage 4 (a startup OAT greater than 90° F.), the controller would change the compression stage to stage 2. If the compressor was running at stage 3 (a startup OAT within the range of 80-90° F.), the controller would change the compression stage to stage 1. If the compressor was running at stage 2 (a startup OAT within the range of 70-80° F.), the controller would change the compression stage to stage 1.

At 736, the controller determines whether the compressor receives a shutdown command (i.e., the cooling command is met). The shutdown command may come from a sensor or thermostat. If false at 736, the method 700 returns to 720. If true at 736, the method 700 ends at 740.

Example startup tables and run tables for the various embodiments are illustrated at FIGS. 8A-12B. While example frequency values and/or fan speeds are provided for each compression stage, it is understood that the values and/or speeds are examples only and could vary based on user preference, location, environment, unit, or any other factor. Thus, it is understood that the frequency values and/or fan speeds may be any reasonable value and/or speed setting for each compression stage.

FIG. 8A is an example startup table for the embodiment in FIGS. 2A and 3B. As previously stated, the compressor 218 is staged at startup based on the OAT. For example, if the OAT is greater than 90° F., the compressor 218 runs in stage 4 at a frequency of 75 Hz. If the OAT is within the range of 80° F. to 90° F., the compressor 218 operates in stage 3 at a frequency of 60 Hz. If the OAT is within the range of 70° F. to 80° F., the compressor 218 operates in stage 2 at 45 Hz. If the OAT is less than 70° F., the compressor 218 operates in stage 1 at 35 Hz.

FIG. 8B is an example run table for the embodiment in FIGS. 2A and 3B. As previously stated and as described in more detail with reference to FIGS. 13-21, the compressor 218 is staged based on ΔRAT, space temperature, and space set temperature, and the fan speed is set based on compression stage and indoor relative humidity (ID RH). An ideal level of humidity may be within the range of 40% to 50% humidity. While 40% to 50% humidity is provided as an example ideal range, it is understood that the range may vary based on user preference, location, environment, unit, or any other factor. Thus, the range of 40% to 50% humidity is merely an example and could be any range such as 40% to 60%, 50% to 60%, 30%-60%, or any other range.

If the humidity is greater than the ideal range (for example, 40% to 50%), the fan speed is decreased to decrease the sensible heat ratio (SHR). By decreasing the fan speed, the evaporator temperature is also decreased. If the humidity is less than the ideal range, the fan speed is increased to increase the SHR in attempt to limit the ability of the unit to dehumidify the space. By increasing the fan speed, the evaporator temperature is also increased, limiting the dehumidification.

For example, at compression stage 4, the compressor 218 is run at a frequency of 75 Hz. If the ID RH is within the range of 40% to 50%, the fan speed is set to high. If the ID RH is greater than 50%, the fan speed is set to medium. If the ID RH is less than 40%, the fan speed is set to high.

At compression stage 3, the compressor 218 is run at a frequency of 60 Hz. If the ID RH is within the range of 40% to 50%, the fan speed is set to medium. If the ID RH is greater than 50%, the fan speed is set to low or medium-low. If the ID RH is less than 40%, the fan speed is set to high.

At compression stage 2, the compressor 218 is run at a frequency of 45 Hz. If the ID RH is within the range of 40% to 50%, the fan speed is set to low or medium-low. If the ID RH is greater than 50%, the fan speed is set to low. If the ID RH is less than 40%, the fan speed is set to medium.

At compression stage 1, the compressor 218 is run at a frequency of 30 Hz. If the ID RH is within the range of 40% to 50%, the fan speed is set to low. If the ID RH is greater than 50%, the fan speed is set to low. If the ID RH is less than 40%, the fan speed is set to medium.

FIG. 9A is an example startup table for the embodiment in FIGS. 2B and 4B. As previously stated, the compressors 246, 250 are staged at startup based on the OAT. For example, if the OAT is greater than 90° F., the compressors 246, 250 are programmed to stage 5, with both compressors operating at a frequency of 60 Hz. If the OAT is within the range of 80° F. to 90° F., the compressors 246, 250 are programmed to stage 4, where compressor 246 operates at a frequency of 75 Hz. If the OAT is within the range of 75° F. to 80° F., the compressors 246, 250 are programmed to stage 3, where compressor 246 operates at 60 Hz. If the OAT is within the range of 70° F. to 75° F., the compressors 246, 250 are programmed to stage 2, where compressor 246 operates at 45 Hz. If the OAT is less than 70° F., the compressors 246, 250 are programmed to stage 1, where the compressor 246 operates at 35 Hz.

FIG. 9B is an example run table for the embodiment in FIGS. 2B and 4B. As previously stated and as described in more detail with reference to FIGS. 13-21, the compressors 246, 250 are staged based on ΔRAT, space temperature, and space set temperature, and the fan speed is set based on compression stage and indoor relative humidity (ID RH). As previously stated, by increasing the fan speed, the evaporator temperature is increased, limiting dehumidification. By decreasing the fan speed, the evaporator temperature is decreased, permitting dehumidification.

For example, at compression stage 5, the compressors 246, 250 are run at a frequency of 60 Hz. If the ID RH is within the range of 40% to 50%, the fan speed is set to high. If the ID RH is greater than 50%, the fan speed is set to medium or medium-high. If the ID RH is less than 40%, the fan speed is set to high.

At compression stage 4, the compressor 246 is run at a frequency of 75 Hz. If the ID RH is within the range of 40% to 50%, the fan speed is set to medium or medium-high. If the ID RH is greater than 50%, the fan speed is set to medium. If the ID RH is less than 40%, the fan speed is set to high.

At compression stage 3, the compressor 246 is run at a frequency of 60 Hz. If the ID RH is within the range of 40% to 50%, the fan speed is set to medium. If the ID RH is greater than 50%, the fan speed is set to low or medium-low. If the ID RH is less than 40%, the fan speed is set to high.

At compression stage 2, the compressor 246 is run at a frequency of 45 Hz. If the ID RH is within the range of 40% to 50%, the fan speed is set to low or medium-low. If the ID RH is greater than 50%, the fan speed is set to low. If the ID RH is less than 40%, the fan speed is set to medium.

At compression stage 1, the compressor 246 is run at a frequency of 30 Hz. If the ID RH is within the range of 40% to 50%, the fan speed is set to low. If the ID RH is greater than 50%, the fan speed is set to low. If the ID RH is less than 40%, the fan speed is set to medium.

FIG. 10A is an example startup table for the embodiment in FIGS. 2C and 5B. As previously stated, the compressors 282, 286 are staged at startup based on the OAT. For example, if the OAT is greater than 90° F., the compressors 282, 286 are programmed to stage 5, with both compressors operating at a frequency of 60 Hz. If the OAT is within the range of 80° F. to 90° F., the compressors 282, 286 are programmed to stage 4, where compressor 282 operates at a frequency of 75 Hz. If the OAT is within the range of 75° F. to 80° F., the compressors 282, 286 are programmed to stage 3, where compressor 282 operates at 60 Hz. If the OAT is within the range of 70° F. to 75° F., the compressors 282, 286 are programmed to stage 2, where compressor 282 operates at 45 Hz. If the OAT is less than 70° F., the compressors 282, 286 are programmed to stage 1, where the compressor 282 operates at 35 Hz.

FIG. 10B is an example run table for the embodiment in FIGS. 2C and 5B. As previously stated and as described in more detail with reference to FIGS. 13-21, the compressors 282, 286 are staged based on ΔRAT, space temperature, and space set temperature, and the fan speed is set based on compression stage and indoor relative humidity (ID RH). As previously stated, by increasing the fan speed, the evaporator temperature is increased, limiting dehumidification. By decreasing the fan speed, the evaporator temperature is decreased, permitting dehumidification.

For example, at compression stage 5, the compressors 282, 286 are run at a frequency of 60 Hz. If the ID RH is within the range of 40% to 50%, the fan speed is set to high. If the ID RH is greater than 50%, the fan speed is set to medium or medium-high. If the ID RH is less than 40%, the fan speed is set to high.

At compression stage 4, the compressor 282 is run at a frequency of 75 Hz. If the ID RH is within the range of 40% to 50%, the fan speed is set to medium or medium-high. If the ID RH is greater than 50%, the fan speed is set to medium. If the ID RH is less than 40%, the fan speed is set to high.

At compression stage 3, the compressor 282 is run at a frequency of 60 Hz. If the ID RH is within the range of 40% to 50%, the fan speed is set to medium. If the ID RH is greater than 50%, the fan speed is set to low or medium-low. If the ID RH is less than 40%, the fan speed is set to high.

At compression stage 2, the compressor 282 is run at a frequency of 45 Hz. If the ID RH is within the range of 40% to 50%, the fan speed is set to low or medium-low. If the ID RH is greater than 50%, the fan speed is set to low. If the ID RH is less than 40%, the fan speed is set to medium.

At compression stage 1, the compressor 282 is run at a frequency of 30 Hz. If the ID RH is within the range of 40% to 50%, the fan speed is set to low. If the ID RH is greater than 50%, the fan speed is set to low. If the ID RH is less than 40%, the fan speed is set to medium.

FIG. 11A is an example startup table for the embodiment in FIGS. 2D and 4C. As previously stated, the compressors 346, 350 are staged at startup based on the OAT. For example, if the OAT is greater than 95° F., the compressors 346, 350 are programmed to stage 9, with both compressors 346, 350 operating at a frequency of 60 Hz. If the OAT is within the range of 90° F. to 95° F., the compressors 346, 350 are programmed to stage 8, where compressor 346 operates at a frequency of 45 Hz and compressor 350 operates at a frequency of 60 Hz. If the OAT is within the range of 85° F. to 90° F., the compressors 346, 350 are programmed to stage 7, where compressor 346 operates at 35 Hz and compressor 350 operates at 60 Hz. If the OAT is within the range of 80° F. to 85° F., the compressors 346, 350 are programmed to stage 6, where both compressors 346, 350 operate at 45 Hz. If the OAT is within the range of 75° F. to 80° F., the compressors 346, 350 are programmed to stage 5, where compressor 346 operates at a frequency of 35 Hz and compressor 350 operates at a frequency of 45 Hz. If the OAT is within the range of 70° F. to 75° F., the compressors 346, 350 are programmed to stage 4, where both compressors 346, 350 operate at a frequency of 35 Hz. If the OAT is within the range of 65° F. to 70° F., the compressors 346, 350 are programmed to stage 3, where compressor 346 operates at 60 Hz. If the OAT is within the range of 60° F. to 65° F., the compressors 346, 350 are programmed to stage 2, where compressor 346 operates at 45 Hz. If the OAT is less than 60° F., the compressors 346, 350 are programmed to stage 1, where the compressor 346 operates at 35 Hz.

FIG. 11B is an example run table for the embodiment in FIGS. 2D and 4C. As previously stated and as described in more detail with reference to FIGS. 13-21, the compressors 346, 350 are staged based on ΔRAT, space temperature, and space set temperature, and the fan speed is set based on compression stage and indoor relative humidity (ID RH). As previously stated, by increasing the fan speed, the evaporator temperature is increased, limiting dehumidification. By decreasing the fan speed, the evaporator temperature is decreased, permitting dehumidification.

For example, at compression stage 9, the compressors 346, 350 are both run at a frequency of 60 Hz. If the ID RH is within the range of 40% to 50%, the fan speed is set to high. If the ID RH is greater than 50%, the fan speed is set to high. If the ID RH is less than 40%, the fan speed is set to high.

At compression stage 8, the compressor 346 is run at a frequency of 45 Hz and the compressor 350 is run at a frequency of 60 Hz. If the ID RH is within the range of 40% to 50%, the fan speed is set to high. If the ID RH is greater than 50%, the fan speed is set to medium. If the ID RH is less than 40%, the fan speed is set to high.

At compression stage 7, the compressor 346 is run at a frequency of 35 Hz and the compressor 350 is run at a frequency of 60 Hz. If the ID RH is within the range of 40% to 50%, the fan speed is set to high. If the ID RH is greater than 50%, the fan speed is set to medium. If the ID RH is less than 40%, the fan speed is set to high.

At compression stage 6, the compressor 346 is run at a frequency of 45 Hz and the compressor 350 is run at a frequency of 45 Hz. If the ID RH is within the range of 40% to 50%, the fan speed is set to medium. If the ID RH is greater than 50%, the fan speed is set to medium. If the ID RH is less than 40%, the fan speed is set to high.

At compression stage 5, the compressor 346 is run at a frequency of 35 Hz and the compressor 350 is run at a frequency of 45 Hz. If the ID RH is within the range of 40% to 50%, the fan speed is set to medium. If the ID RH is greater than 50%, the fan speed is set to medium. If the ID RH is less than 40%, the fan speed is set to high.

At compression stage 4, the compressor 346 is run at a frequency of 35 Hz and the compressor 350 is run at a frequency of 35 Hz. If the ID RH is within the range of 40% to 50%, the fan speed is set to medium. If the ID RH is greater than 50%, the fan speed is set to low. If the ID RH is less than 40%, the fan speed is set to medium.

At compression stage 3, the compressor 346 is run at a frequency of 60 Hz. If the ID RH is within the range of 40% to 50%, the fan speed is set to low. If the ID RH is greater than 50%, the fan speed is set to low. If the ID RH is less than 40%, the fan speed is set to medium.

At compression stage 2, the compressor 346 is run at a frequency of 45 Hz. If the ID RH is within the range of 40% to 50%, the fan speed is set to low. If the ID RH is greater than 50%, the fan speed is set to low. If the ID RH is less than 40%, the fan speed is set to medium.

At compression stage 1, the compressor 346 is run at a frequency of 35 Hz. If the ID RH is within the range of 40% to 50%, the fan speed is set to low. If the ID RH is greater than 50%, the fan speed is set to low. If the ID RH is less than 40%, the fan speed is set to medium.

FIG. 12A is an example startup table for the embodiment in FIGS. 2E and 5C. As previously stated, the compressors 382, 386 are staged at startup based on the OAT. For example, if the OAT is greater than 95° F., the compressors 382, 386 are programmed to stage 9, with both compressors 382, 386 operating at a frequency of 60 Hz. If the OAT is within the range of 90° F. to 95° F., the compressors 382, 386 are programmed to stage 8, where compressor 382 operates at a frequency of 45 Hz and compressor 386 operates at a frequency of 60 Hz. If the OAT is within the range of 85° F. to 90° F., the compressors 382, 386 are programmed to stage 7, where compressor 382 operates at 35 Hz and compressor 386 operates at 60 Hz. If the OAT is within the range of 80° F. to 85° F., the compressors 382, 386 are programmed to stage 6, where both compressors 382, 386 operate at 45 Hz. If the OAT is within the range of 75° F. to 80° F., the compressors 382, 386 are programmed to stage 5, where compressor 382 operates at a frequency of 35 Hz and compressor 386 operates at a frequency of 45 Hz. If the OAT is within the range of 70° F. to 75° F., the compressors 382, 386 are programmed to stage 4, where both compressors 382, 386 operate at a frequency of 35 Hz. If the OAT is within the range of 65° F. to 70° F., the compressors 382, 386 are programmed to stage 3, where compressor 382 operates at 60 Hz. If the OAT is within the range of 60° F. to 65° F., the compressors 382, 386 are programmed to stage 2, where compressor 382 operates at 45 Hz. If the OAT is less than 60° F., the compressors 382, 386 are programmed to stage 1, where the compressor 382 operates at 35 Hz.

FIG. 12B is an example run table for the embodiment in FIGS. 2E and 5C. As previously stated and as described in more detail with reference to FIGS. 13-21, the compressors 382, 386 are staged based on ΔRAT, space temperature, and space set temperature, and the fan speed is set based on compression stage and indoor relative humidity (ID RH). As previously stated, by increasing the fan speed, the evaporator temperature is increased, limiting dehumidification. By decreasing the fan speed, the evaporator temperature is decreased, permitting dehumidification.

For example, at compression stage 9, the compressors 382, 386 are both run at a frequency of 60 Hz. If the ID RH is within the range of 40% to 50%, the fan speed is set to high. If the ID RH is greater than 50%, the fan speed is set to high. If the ID RH is less than 40%, the fan speed is set to high.

At compression stage 8, the compressor 382 is run at a frequency of 45 Hz and the compressor 386 is run at a frequency of 60 Hz. If the ID RH is within the range of 40% to 50%, the fan speed is set to high. If the ID RH is greater than 50%, the fan speed is set to medium. If the ID RH is less than 40%, the fan speed is set to high.

At compression stage 7, the compressor 382 is run at a frequency of 35 Hz and the compressor 386 is run at a frequency of 60 Hz. If the ID RH is within the range of 40% to 50%, the fan speed is set to high. If the ID RH is greater than 50%, the fan speed is set to medium. If the ID RH is less than 40%, the fan speed is set to high.

At compression stage 6, the compressor 382 is run at a frequency of 45 Hz and the compressor 386 is run at a frequency of 45 Hz. If the ID RH is within the range of 40% to 50%, the fan speed is set to medium. If the ID RH is greater than 50%, the fan speed is set to medium. If the ID RH is less than 40%, the fan speed is set to high.

At compression stage 5, the compressor 382 is run at a frequency of 35 Hz and the compressor 386 is run at a frequency of 45 Hz. If the ID RH is within the range of 40% to 50%, the fan speed is set to medium. If the ID RH is greater than 50%, the fan speed is set to medium. If the ID RH is less than 40%, the fan speed is set to high.

At compression stage 4, the compressor 382 is run at a frequency of 35 Hz and the compressor 386 is run at a frequency of 35 Hz. If the ID RH is within the range of 40% to 50%, the fan speed is set to medium. If the ID RH is greater than 50%, the fan speed is set to low. If the ID RH is less than 40%, the fan speed is set to medium.

At compression stage 3, the compressor 382 is run at a frequency of 60 Hz. If the ID RH is within the range of 40% to 50%, the fan speed is set to low. If the ID RH is greater than 50%, the fan speed is set to low. If the ID RH is less than 40%, the fan speed is set to medium.

At compression stage 2, the compressor 382 is run at a frequency of 45 Hz. If the ID RH is within the range of 40% to 50%, the fan speed is set to low. If the ID RH is greater than 50%, the fan speed is set to low. If the ID RH is less than 40%, the fan speed is set to medium.

At compression stage 1, the compressor 382 is run at a frequency of 35 Hz. If the ID RH is within the range of 40% to 50%, the fan speed is set to low. If the ID RH is greater than 50%, the fan speed is set to low. If the ID RH is less than 40%, the fan speed is set to medium.

Figure 13:
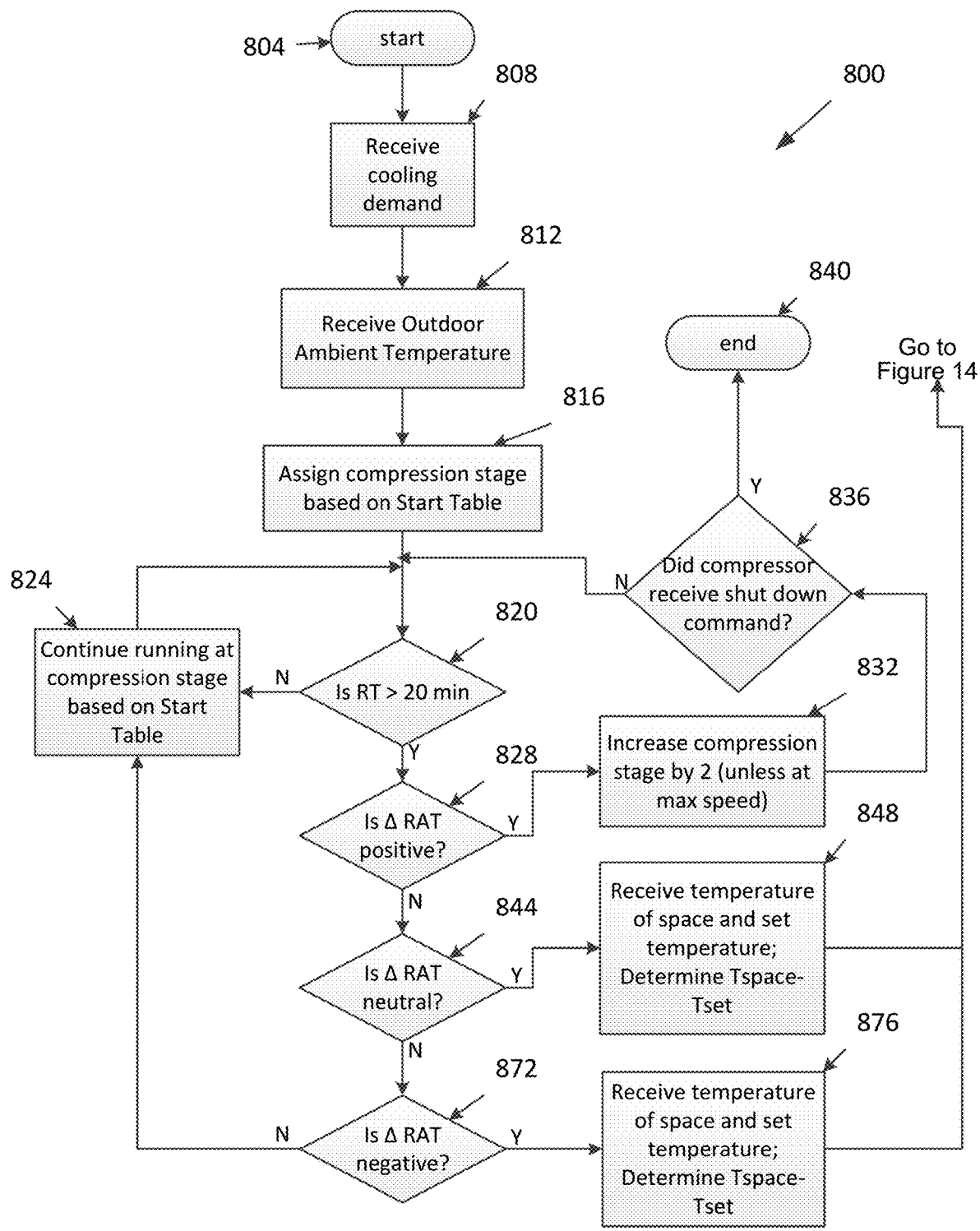
FIGS. 13-14 are flow diagrams for another example method of controlling a climate-control system according to the present disclosure.
Figure 14:
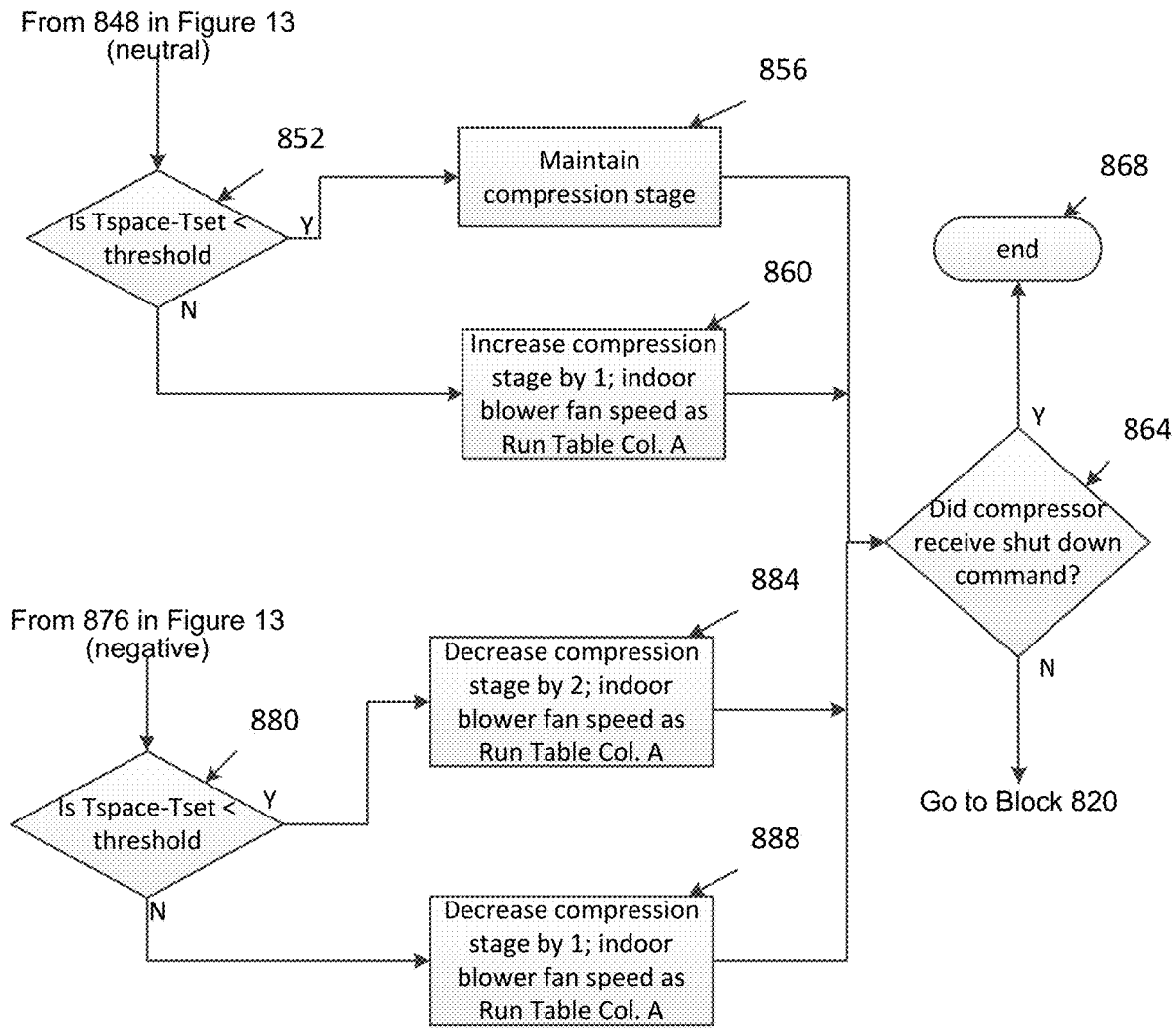

Now referring to FIGS. 13 and 14, a method 800 for operating the compressors is illustrated. Method 800 may utilize data from one or a combination of sensors (for example only, space temperature, RAT, OAT, OD RH, and occupancy sensors may be required). If the space temperature is not available or missing, an absolute value of the RAT value may be utilized. If the space setpoint temperature is not available or missing, the controller may utilize the RAT value at which the compressor(s) shut down in the previous stage or the average of the previous stages.

Method 800 begins at 804 (FIG. 13). At 808, the controller receives a cooling demand. The cooling demand may be provided based on a space sensor, thermostat, or any other trigger.

At 812, the controller receives an OAT. The OAT may be provided from an OAT sensor. The controller determines the compression stage based on the OAT at 816. In some embodiments, the controller may set the compression stage from a startup table (for example, FIGS. 8A, 9A, 10A, 11A, 12A). For example, with reference to FIGS. 2A, 3B, and 8A, if the controller 450 receives an OAT 434 greater than 90° F., the controller 450 will run in compression stage 4, setting the compressor 218 to run at a frequency of 75 Hz. If the controller 450 receives an OAT 434 within the range of 80-90° F., the controller 450 will run in compression stage 3, setting the compressor 218 to run at a frequency of 60 Hz. If the controller 450 receives an OAT 434 within the range of 70-80° F., the controller 450 will run in compression stage 2, setting the compressor 218 to run at a frequency of 45 Hz. If the controller 450 receives an OAT less than 70° F., the controller 450 will run in compression stage 1, setting the compressor 218 to run at a frequency of 35 Hz.

At 820, the controller determines whether a run time of the compressor exceeds a predetermined threshold (for example only, 20 minutes). The run time threshold may be an optimal cycling time for the compressor. If the compressor cycles on and off in a run time less than 20 minutes, the cycling may be considered too frequent, whereas, if the compressor remains running for more than 20 minutes, additional power or fan cooling may be necessary to meet the cooling demand. If the run time does not exceed the threshold at 820, the controller may continue running the current compression stage based on the start table at 824 and return to 820.

If the run time exceeds the threshold at 820, the controller determines whether ΔRAT is positive at 828. The ΔRAT is the change in return air temperature (RAT) over the run time. For example, if the RAT when the cooling demand was received (at 808) was 85° F. and the RAT after 20 minutes run time is 70° F. The ΔRAT is −15° F. A positive ΔRAT is any number greater than 0° F. Thus, in the example here, the ΔRAT is not positive. A positive ΔRAT would occur where, for example, the RAT when the cooling demand was received (at 808) was 85° F. and the RAT after 20 minutes run time is 90° F. Here the ΔRAT is 5° F.

If the ΔRAT is positive at 828, the controller increases the compression stage by 2 unless the compressor is operating at maximum speed (i.e., at compression stage 4 in FIG. 8A, compression stage 5 in FIGS. 9A and 10A, compression stage 9 in FIGS. 11A and 12A) at 832. Thus, in the example above relating to FIGS. 2A, 3B, and 8A, if the compressor 218 was running at stage 3 (a startup OAT within the range of 80-90° F.), the controller 450 would change the compression stage to stage 4. If the compressor 218 was running at stage 2 (a startup OAT within the range of 70-80° F.), the controller 450 would change the compression stage to stage 4. If the compressor 218 was running at stage 1 (a startup OAT less than 70° F.), the controller 450 would change the compression stage to stage 3.

At 836, the controller determines whether the compressor receives a shutdown command (i.e., the cooling command is met). The shutdown command may come from a sensor or thermostat. If true at 836, the method 800 ends at 840. If false at 836, the method 800 returns to 820.

If the ΔRAT is not positive at 828 (for example, as in the example discussed above where ΔRAT is −15° F.), the controller determines whether ΔRAT is neutral at 844. The ΔRAT is neutral if the change in return air temperature (RAT) over the run time is equal to 0 (i.e., the return air temperature has not changed).

If the ΔRAT is neutral at 844, the controller receives the space temperature and the space setpoint temperature at 848 and determines the difference. The difference is equal to the space temperature less the space setpoint temperature. At 852 (FIG. 14), the controller determines whether the difference is less than a predetermined threshold. For example only, the predetermined threshold may be 2° F. If true at 852, the controller maintains the compression stage at 856. Thus, in the example above relating to FIGS. 2A, 3B, and 8A, if the compressor was running at stage 4 (a startup OAT greater than 90° F.), the controller would maintain the compression stage at stage 4. If the compressor was running at stage 3 (a startup OAT within the range of 80-90° F.), the controller would maintain the compression stage at stage 3. If the compressor was running at stage 2 (a startup OAT within the range of 70-80° F.), the controller would maintain the compression stage at stage 2. If the compressor was running at stage 1 (a startup OAT less than 70° F.), the controller would maintain the compression stage at stage 1.

If false at 852, the controller increases the compression stage by 1 unless the compressor is operating at maximum speed (i.e., at compression stage 4 in FIG. 8A, compression stage 5 in FIGS. 9A and 10A, compression stage 9 in FIGS. 11A and 12A) at 860. Thus, in the example above relating to FIGS. 2A, 3B, and 8A, if the compressor was running at stage 3 (a startup OAT within the range of 80-90° F.), the controller would change the compression stage to stage 4. If the compressor was running at stage 2 (a startup OAT within the range of 70-80° F.), the controller would change the compression stage to stage 3. If the compressor was running at stage 1 (a startup OAT less than 70° F.), the controller would change the compression stage to stage 2.

Additionally, at 860, the controller sets the indoor blower fan speed as provided in Column A of the run table. Thus, in the example above relating to FIGS. 2A, 3B, and 8A, if the new compressor stage is stage 4, the controller would set the fan speed to high. If the new compressor stage is stage 3, the controller would set the fan speed to medium. If the new compressor stage is stage 2, the controller would set the fan speed to low or medium-low.

After the controller either maintains the compression stage at 856 or increases the compression stage at 860, the controller determines whether the compressor received a shutdown command at 864. The shutdown command may come from a sensor or thermostat. If true at 864, the method 800 ends at 868. If false at 864, the method 800 returns to 820.

If the ΔRAT is not neutral at 844, the controller determines whether the ΔRAT is negative at 872. A negative ΔRAT is any number less than 0° F. (i.e., less than neutral). As in the example above, if the RAT when the cooling demand was received (at 808) was 85° F. and the RAT after 20 minutes run time is 70° F., the ΔRAT is −15° F.

If false at 872, the method 800 returns to 824. When ΔRAT is negative at 872, the controller receives the space temperature and the space setpoint temperature at 876 and determines the difference. The difference is equal to the space temperature less the space setpoint temperature. At 880 (FIG. 14), the controller determines whether the difference is less than a predetermined threshold. For example only, the predetermined threshold may be 2° F. If true at 880, the controller decreases the compression stage by 2 (unless at the minimum compressor speed) at 884. Thus, in the example above relating to FIGS. 2A, 3B, and 8A, if the compressor 218 was running at stage 4 (a startup OAT greater than 90° F.), the controller 450 would change the compression stage to stage 2. If the compressor 218 was running at stage 3 (a startup OAT within the range of 80-90° F.), the controller 450 would change the compression stage to stage 1. If the compressor 218 was running at stage 2 (a startup OAT within the range of 70-80° F.), the controller 450 would change the compression stage to stage 1.

Additionally, at 884, the controller sets the indoor blower fan speed as provided in Column A of the run table. Thus, in the example above relating to FIGS. 2A, 3B, and 8A, if the new compressor stage is stage 3, the controller 450 would set the fan speed to medium. If the new compressor stage is stage 2, the controller 450 would set the fan speed to low or medium-low. If the new compressor stage is stage 1, the controller 450 would set the fan speed to low.

If false at 880, the controller decreases the compression stage by 1 (unless at the minimum compressor speed) at 888. Thus, in the example above relating to FIGS. 2A, 3B, and 8A, if the compressor 218 was running at stage 4 (a startup OAT greater than 90° F.), the controller 450 would change the compression stage to stage 3. If the compressor 218 was running at stage 3 (a startup OAT within the range of 80-90° F.), the controller 450 would change the compression stage to stage 2. If the compressor 218 was running at stage 2 (a startup OAT within the range of 70-80° F.), the controller 450 would change the compression stage to stage 1.

Additionally, at 888, the controller sets the indoor blower fan speed as provided in Column A of the run table. Thus, in the example above relating to FIGS. 2A, 3B, and 8A, if the new compressor stage is stage 3, the controller 450 would set the fan speed to medium. If the new compressor stage is stage 2, the controller 450 would set the fan speed to low or medium-low. If the new compressor stage is stage 1, the controller 450 would set the fan speed to low.

After the controller decreases the compression stage at 884 or 888, the controller determines whether the compressor received a shutdown command at 864. The shutdown command may come from a sensor or thermostat. If false at 864, the method 800 returns to 820. If true at 864, the method 800 ends at 868.

Now referring to FIGS. 15-18, another method 900 for controlling compressors is illustrated. Method 900 may utilize data from one or a combination of sensors (for example only, space temperature, RAT, OAT, OD RH, ID RH, return air RH, and occupancy sensors may be required). If the space temperature is not available or missing, an absolute value of the RAT value may be utilized. If the space setpoint temperature is not available or missing, the controller may utilize the RAT value at which the compressor(s) shut down in the previous stage or the average of the previous stages.

Figure 15:
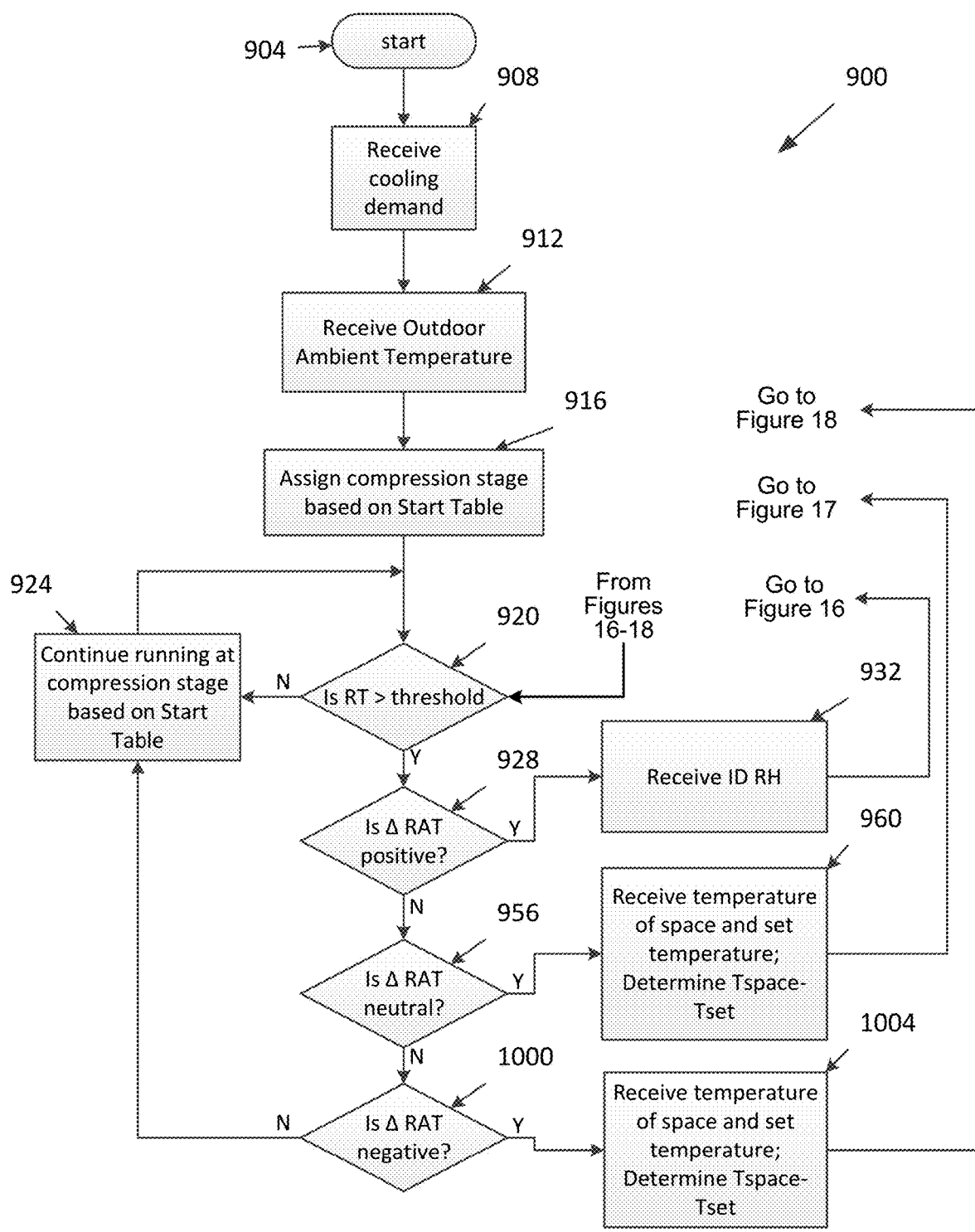
FIGS. 15-18 are flow diagrams for yet another example method of controlling a climate-control system according to the present disclosure.

Method 900 starts at 904 (FIG. 15). At 904, the controller receives a cooling demand. The cooling demand may be provided based on a space sensor, thermostat, a programmed schedule, or any other trigger.

At 912, the controller receives an OAT. The OAT may be provided from an OAT sensor. The controller determines the compression stage based on the OAT at 916. In some embodiments, the controller may set the compression stage from a startup table (for example, FIGS. 8A, 9A, 10A, 11A, 12A). For example, with reference to FIGS. 2A, 3B, and 8A, if the controller 450 receives an OAT 434 greater than 90° F., the controller 450 will run in compression stage 4, setting the compressor 218 to run at a frequency of 75 Hz. If the controller 450 receives an OAT 434 within the range of 80-90° F., the controller 450 will run in compression stage 3, setting the compressor 218 to run at a frequency of 60 Hz. If the controller 450 receives an OAT 434 within the range of 70-80° F., the controller 450 will run in compression stage 2, setting the compressor 218 to run at a frequency of 45 Hz. If the controller 450 receives an OAT less than 70° F., the controller 450 will run in compression stage 1, setting the compressor 218 to run at a frequency of 35 Hz.

At 920, the controller determines whether a run time of the compressor exceeds a predetermined threshold (for example only, 20 minutes). The run time threshold may be an optimal cycling time for the compressor. If the compressor cycles on and off in a run time less than 20 minutes, the cycling may be considered too frequent, whereas, if the compressor remains running for more than 20 minutes, additional power or fan cooling may be necessary to meet the cooling demand. If the run time does not exceed the threshold at 920, the controller may continue running the current compression stage based on the start table at 924 and return to 920.

If the run time exceeds the threshold at 920, the controller determines whether ΔRAT is positive at 928. The ΔRAT is the change in return air temperature (RAT) over the run time. For example, if the RAT when the cooling demand was received (at 908) was 85° F. and the RAT after 20 minutes run time is 70° F. The ΔRAT is −15° F. A positive ΔRAT is any number greater than 0° F. Thus, in the example here, the ΔRAT is not positive. A positive ΔRAT would occur where, for example, the RAT when the cooling demand was received (at 908) was 85° F. and the RAT after 20 minutes run time is 90° F. Here the ΔRAT is 5° F.

If the ΔRAT is positive at 928, the controller receives the indoor relative humidity (ID RH) at 932. Method 900 then moves to 936 in FIG. 16. At 936, the controller determines whether the ID RH is less than a threshold. For example, the threshold may be 50. The threshold may be set to an ideal or desired relative humidity for the space, and may be set differently for user preference, location, environment, or any other factor. For example, the threshold may be set within the range of 40% to 60%, or, more specifically, set within the range of 40% to 50%.

If the ID RH is less than the threshold at 936, the controller increases the compression stage by 2 stages at 940 unless the compressor is operating at maximum speed (i.e., at compression stage 4 in FIG. 8A, compression stage 5 in FIGS. 9A and 10A, compression stage 9 in FIGS. 11A and 12A). Thus, in the example relating to FIGS. 2A, 3B, and 8A, if the compressor 218 was running at stage 3 (a startup OAT within the range of 80-90° F.), the controller 450 would change the compression stage to stage 4. If the compressor 218 was running at stage 2 (a startup OAT within the range of 70-80° F.), the controller 450 would change the compression stage to stage 4. If the compressor 218 was running at stage 1 (a startup OAT less than 70° F.), the controller 450 would change the compression stage to stage 3.

Additionally at 940, the controller sets the indoor blower fan speed to column A of the run table. Thus, in the example above relating to FIGS. 2A, 3B, and 8A, if the new compressor stage is stage 4, the controller would set the fan speed to high. If the new compressor stage is stage 3, the controller would set the fan speed to medium. If the new compressor stage is stage 2, the controller would set the fan speed to low or medium-low.

If the ID RH is not less than the threshold at 936, the controller increases the compression stage by 2 stages at 944 unless the compressor is operating at maximum speed (i.e., at compression stage 4 in FIG. 8A, compression stage 5 in FIGS. 9A and 10A, compression stage 9 in FIGS. 11A and 12A). Thus, in the example relating to FIGS. 2A, 3B, and 8A, if the compressor 218 was running at stage 3 (a startup OAT within the range of 80-90° F.), the controller 450 would change the compression stage to stage 4. If the compressor 218 was running at stage 2 (a startup OAT within the range of 70-80° F.), the controller 450 would change the compression stage to stage 4. If the compressor 218 was running at stage 1 (a startup OAT less than 70° F.), the controller 450 would change the compression stage to stage 3.

Additionally at 944, the controller sets the indoor blower fan speed to column B of the run table. Thus, in the example above relating to FIGS. 2A, 3B, and 8A, if the new compressor stage is stage 4, the controller would set the fan speed to medium. If the new compressor stage is stage 3, the controller would set the fan speed to low or medium-low. If the new compressor stage is stage 2, the controller would set the fan speed to low.

After the compression stage is increased at either 940 or 944, the controller determines whether the compressor received a shutdown command at 948. The shutdown command may come from a sensor, thermostat, programmed setting, or any other trigger. If true, the method 900 ends at 952. If false at 948, method 900 returns to 920.

If the ΔRAT is not positive at 928, the controller determines whether the ΔRAT is neutral at 956. The ΔRAT is neutral if the change in return air temperature (RAT) over the run time is equal to 0 (i.e., the return air temperature has not changed).

If the ΔRAT is neutral at 956, the controller receives the space temperature and the space setpoint temperature at 960 and determines the difference. The difference is equal to the space temperature less the space setpoint temperature. At 964 (FIG. 17), the controller determines whether the difference is less than a predetermined threshold. For example only, the predetermined threshold may be 2° F.

If the difference is less than the predetermined threshold at 964, the controller receives the indoor relative humidity (ID RH) and determines whether the ID RH is less than a threshold at 968. For example, the threshold may be 50. The threshold may be set to an ideal or desired relative humidity for the space, and may be set differently for user preference, location, environment, or any other factor. For example, the threshold may be set within the range of 40% to 60%, or, more specifically, set within the range of 40% to 50%.

If the ID RH is less than the threshold at 968, the controller maintains the compression stage at 972. Thus, in the example relating to FIGS. 2A, 3B, and 8A, if the compressor was running at stage 4 (a startup OAT greater than 90° F.), the controller would maintain the compression stage at stage 4. If the compressor was running at stage 3 (a startup OAT within the range of 80-90° F.), the controller would maintain the compression stage at stage 3. If the compressor was running at stage 2 (a startup OAT within the range of 70-80° F.), the controller would maintain the compression stage at stage 2. If the compressor was running at stage 1 (a startup OAT less than 70° F.), the controller would maintain the compression stage at stage 1.

If the ID RH is not less than the threshold at 968, the controller increases the compression stage by 1 at 976 unless the compressor is operating at maximum speed (i.e., at compression stage 4 in FIG. 8A, compression stage 5 in FIGS. 9A and 10A, compression stage 9 in FIGS. 11A and 12A). Thus, in the example relating to FIGS. 2A, 3B, and 8A, if the compressor was running at stage 3 (a startup OAT within the range of 80-90° F.), the controller would change the compression stage to stage 4. If the compressor was running at stage 2 (a startup OAT within the range of 70-80° F.), the controller would change the compression stage to stage 3. If the compressor was running at stage 1 (a startup OAT less than 70° F.), the controller would change the compression stage to stage 2.

Additionally, at 976, the controller sets the indoor blower fan speed according to column B of the run table. Thus, in the example above relating to FIGS. 2A, 3B, and 8A, if the new compressor stage is stage 4, the controller would set the fan speed to medium. If the new compressor stage is stage 3, the controller would set the fan speed to low or medium-low. If the new compressor stage is stage 2, the controller would set the fan speed to low.

After the compression stage is maintained at 972 or increased at 976, the controller determines whether the compressor received a shutdown command at 980. The shutdown command may come from a sensor, a thermostat, a programmed schedule, or any other trigger. If true at 980, the method 900 ends at 984. If false at 980, the method 900 returns to 920.

If the difference is not less than the threshold at 964, the controller receives the indoor relative humidity (ID RH) and determines whether the ID RH is less than a threshold at 988. For example, the threshold may be 50. The threshold may be set to an ideal or desired relative humidity for the space, and may be set differently for user preference, location, environment, or any other factor. For example, the threshold may be set within the range of 40% to 60%, or, more specifically, set within the range of 40% to 50%.

If the ID RH is less than the threshold at 988, the controller increases the compression stage by 1 at 992 unless the compressor is operating at maximum speed (i.e., at compression stage 4 in FIG. 8A, compression stage 5 in FIGS. 9A and 10A, compression stage 9 in FIGS. 11A and 12A). Thus, in the example relating to FIGS. 2A, 3B, and 8A, if the compressor was running at stage 3 (a startup OAT within the range of 80-90° F.), the controller would change the compression stage to stage 4. If the compressor was running at stage 2 (a startup OAT within the range of 70-80° F.), the controller would change the compression stage to stage 3. If the compressor was running at stage 1 (a startup OAT less than 70° F.), the controller would change the compression stage to stage 2.

Additionally, at 992, the controller sets the indoor blower fan speed according to column A of the run table. Thus, in the example above relating to FIGS. 2A, 3B, and 8A, if the new compressor stage is stage 4, the controller would set the fan speed to high. If the new compressor stage is stage 3, the controller would set the fan speed to medium. If the new compressor stage is stage 2, the controller would set the fan speed to low or medium-low.

If the ID RH is not less than the threshold at 988, the controller increases the compression stage by 1 at 996 unless the compressor is operating at maximum speed (i.e., at compression stage 4 in FIG. 8A, compression stage 5 in FIGS. 9A and 10A, compression stage 9 in FIGS. 11A and 12A). Additionally, the controller sets the indoor blower fan speed according to column B of the run table. Thus, in the example relating to FIGS. 2A, 3B, and 8A, if the compressor was running at stage 3 (a startup OAT within the range of 80-90° F.), the controller would change the compression stage to stage 4 and set the fan speed to medium. If the compressor was running at stage 2 (a startup OAT within the range of 70-80° F.), the controller would change the compression stage to stage 3 and set the fan speed to low or medium-low. If the compressor was running at stage 1 (a startup OAT less than 70° F.), the controller would change the compression stage to stage 2 and set the fan speed to low.

After increasing the compression stage in either 992 or 996, the controller determines whether the compressor received a shutdown command at 980. The shutdown command may come from a sensor, a thermostat, a programmed schedule, or any other trigger. If true at 980, the method 900 ends at 984. If false at 980, the method 900 returns to 920.

If the Δ RAT was not neutral at 956, the controller determines whether the Δ RAT is negative at 1000. A negative ΔRAT is any number less than 0° F. (i.e., less than neutral). As in the example above, if the RAT when the cooling demand was received (at 908) was 85° F. and the RAT after 20 minutes run time is 70° F., the ΔRAT is −15° F.

If the ΔRAT is not negative at 1000, the method 900 returns to 924. If the ΔRAT is negative at 1000, the controller receives the space temperature and the space setpoint temperature at 1004 and determines the difference. The difference is equal to the space temperature less the space setpoint temperature. At 1008 (FIG. 18), the controller determines whether the difference is less than a predetermined threshold. For example only, the predetermined threshold may be 2° F.

If the difference is less than the threshold at 1008, the controller determines whether the indoor relative humidity (ID RH) is less than a threshold at 1012. For example, the threshold may be 50. The threshold may be set to an ideal or desired relative humidity for the space, and may be set differently for user preference, location, environment, or any other factor. For example, the threshold may be set within the range of 40% to 60%, or, more specifically, set within the range of 40% to 50%.

If the ID RH is less than the threshold at 1012, the controller decreases the compression stage by 2 at 1016 (unless at the minimum compressor speed). Additionally, the controller sets the indoor blower fan speed according to column A of the run table. Thus, in the example above relating to FIGS. 2A, 3B, and 8A, if the compressor 218 was running at stage 4 (a startup OAT greater than 90° F.), the controller 450 would change the compression stage to stage 2 and set the fan speed to low or medium-low. If the compressor 218 was running at stage 3 (a startup OAT within the range of 80-90° F.), the controller 450 would change the compression stage to stage 1 and set the fan speed to low. If the compressor 218 was running at stage 2 (a startup OAT within the range of 70-80° F.), the controller 450 would change the compression stage to stage 1 and set the fan speed to low.

If the ID RH is not less than the threshold at 1012, the controller decreases the compression stage by 1 at 1020 (unless at the minimum compressor speed). Additionally, the controller sets the indoor blower fan speed according to column B of the run table. Thus, in the example above relating to FIGS. 2A, 3B, and 8A, if the compressor 218 was running at stage 4 (a startup OAT greater than 90° F.), the controller 450 would change the compression stage to stage 3 and set the fan speed to low or medium-low. If the compressor 218 was running at stage 3 (a startup OAT within the range of 80-90° F.), the controller 450 would change the compression stage to stage 2 and set the fan speed to low. If the compressor 218 was running at stage 2 (a startup OAT within the range of 70-80° F.), the controller 450 would change the compression stage to stage 1 and set the fan speed to low.

After the decreasing the compression stage at 1016 or 1020, the controller determines whether the compressor received a shutdown command at 1024. The shutdown command may come from a sensor, thermostat, or any other trigger. If false at 1024, the method 900 returns to 920. If true at 1024, the method 900 ends at 1028.

If the difference is not less than the threshold at 1008, the controller determines whether the ID RH is less than a threshold at 1032. For example, the threshold may be 50. The threshold may be set to an ideal or desired relative humidity for the space, and may be set differently for user preference, location, environment, or any other factor. For example, the threshold may be set within the range of 40% to 60%, or, more specifically, set within the range of 40% to 50%.

If the ID RH is less than the threshold at 1032, the compressor decreases the compression stage by 1 at 1036 (unless at the minimum compressor speed). Additionally, the controller sets the indoor blower fan speed according to column A of the run table. Thus, in the example relating to FIGS. 2A, 3B, and 8A, if the compressor 218 was running at stage 4 (a startup OAT greater than 90° F.), the controller 450 would change the compression stage to stage 3 and set the fan speed to medium. If the compressor 218 was running at stage 3 (a startup OAT within the range of 80-90° F.), the controller 450 would change the compression stage to stage 2 and set the fan speed to low or medium-low. If the compressor 218 was running at stage 2 (a startup OAT within the range of 70-80° F.), the controller 450 would change the compression stage to stage 1 and set the fan speed to low.

If the ID RH is not less than the threshold at 1032, the controller increases the compression stage by 1 at 1040 unless the compressor is operating at maximum speed (i.e., at compression stage 4 in FIG. 8A, compression stage 5 in FIGS. 9A and 10A, compression stage 9 in FIGS. 11A and 12A). Additionally, the controller sets the indoor blower fan speed according to column B of the run table. Thus, in the example above relating to FIGS. 2A, 3B, and 8A, if the compressor was running at stage 3 (a startup OAT within the range of 80-90° F.), the controller would change the compression stage to stage 4 and set the fan speed to medium. If the compressor was running at stage 2 (a startup OAT within the range of 70-80° F.), the controller would change the compression stage to stage 3 and set the fan speed to low or medium-low. If the compressor was running at stage 1 (a startup OAT less than 70° F.), the controller would change the compression stage to stage 2 and set the fan speed to low.

After the compression stage is decreased at 1036 or increased at 1040, the controller determines whether the compressor received a shutdown command at 1024. The shutdown command may come from a sensor, thermostat, or any other trigger. If false at 1024, the method 900 returns to 920. If true at 1024, the method 900 ends at 1028.

Figure 16:
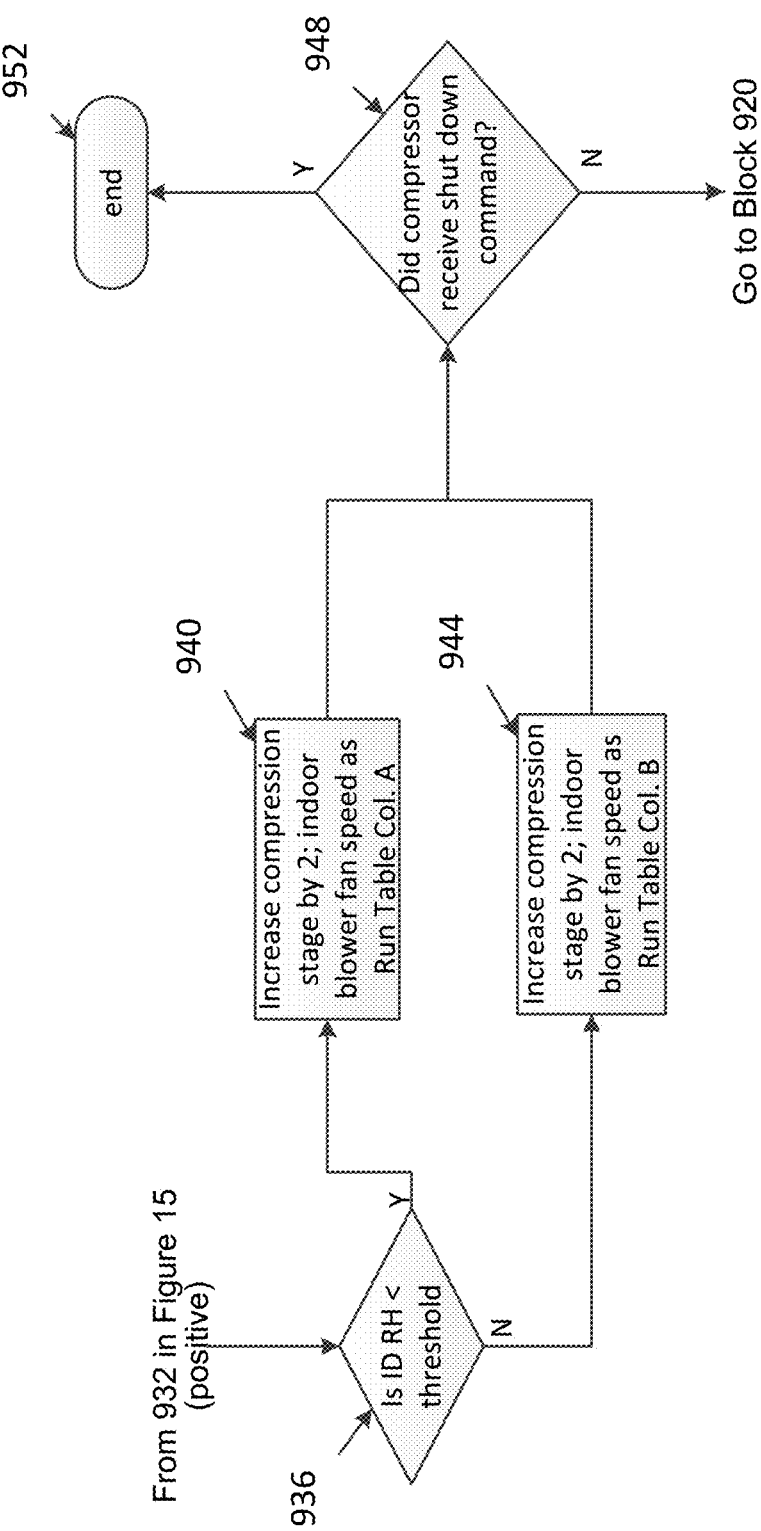
Figure 17:
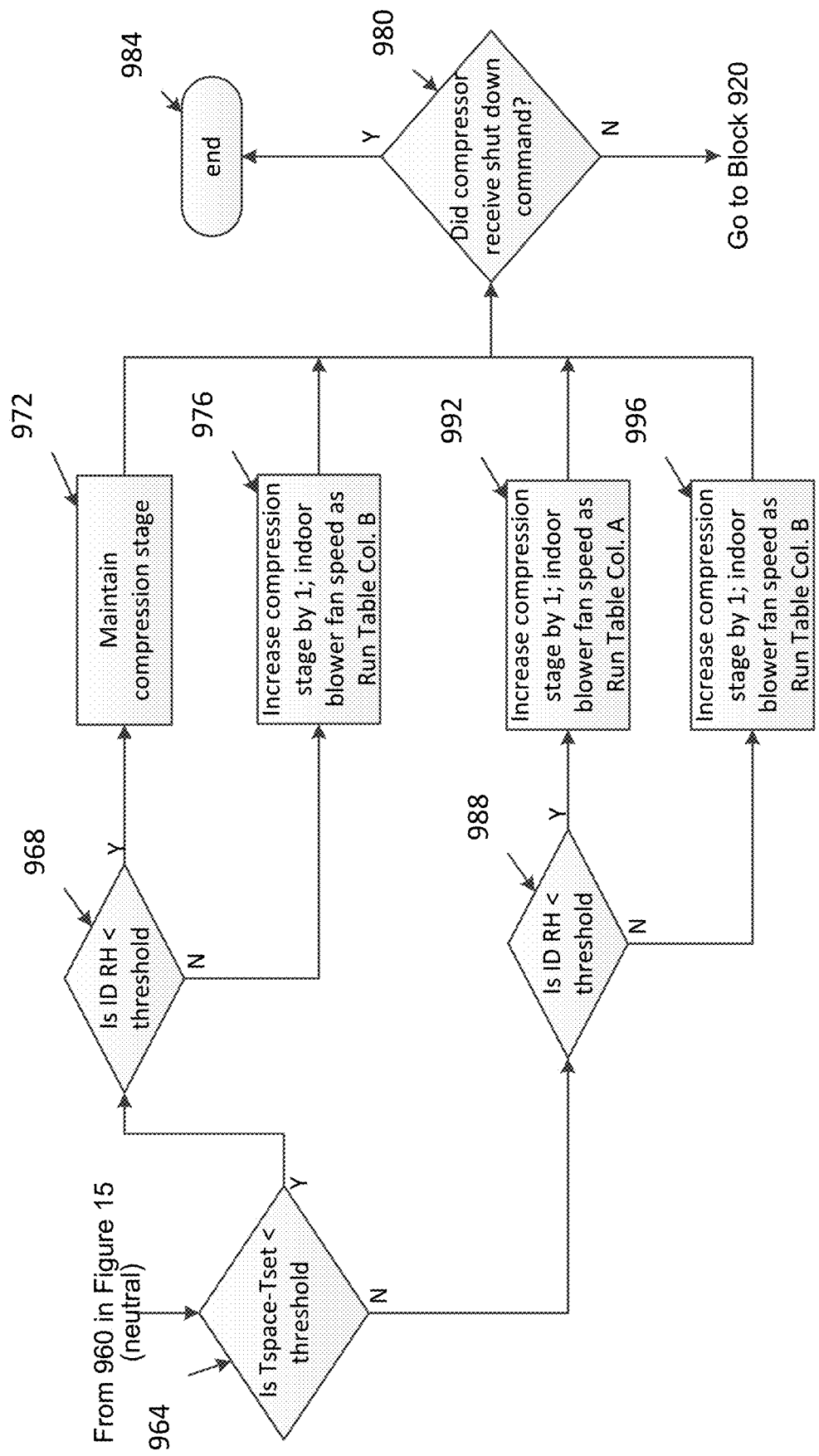
Figure 18:
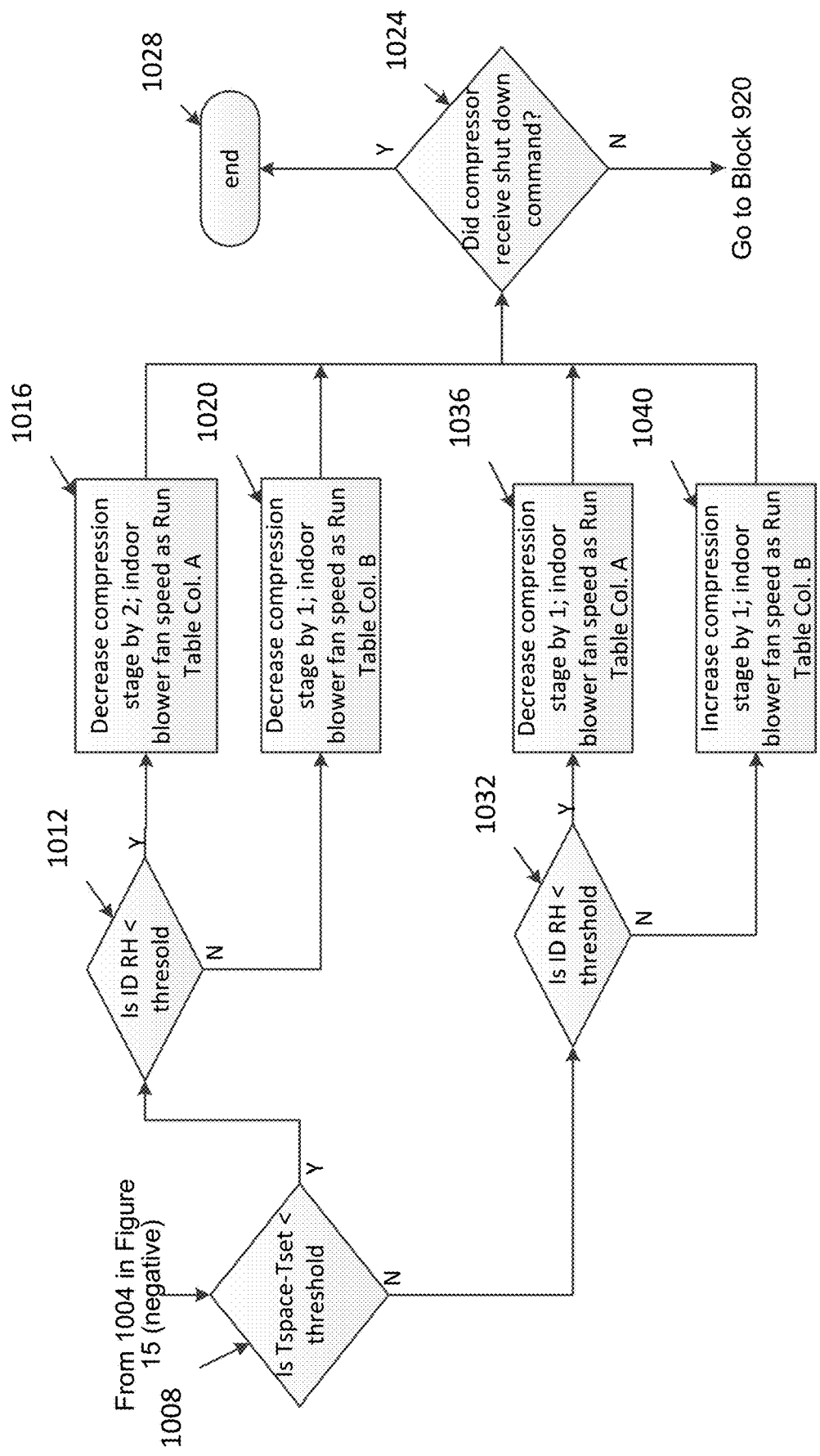
Figure 19:
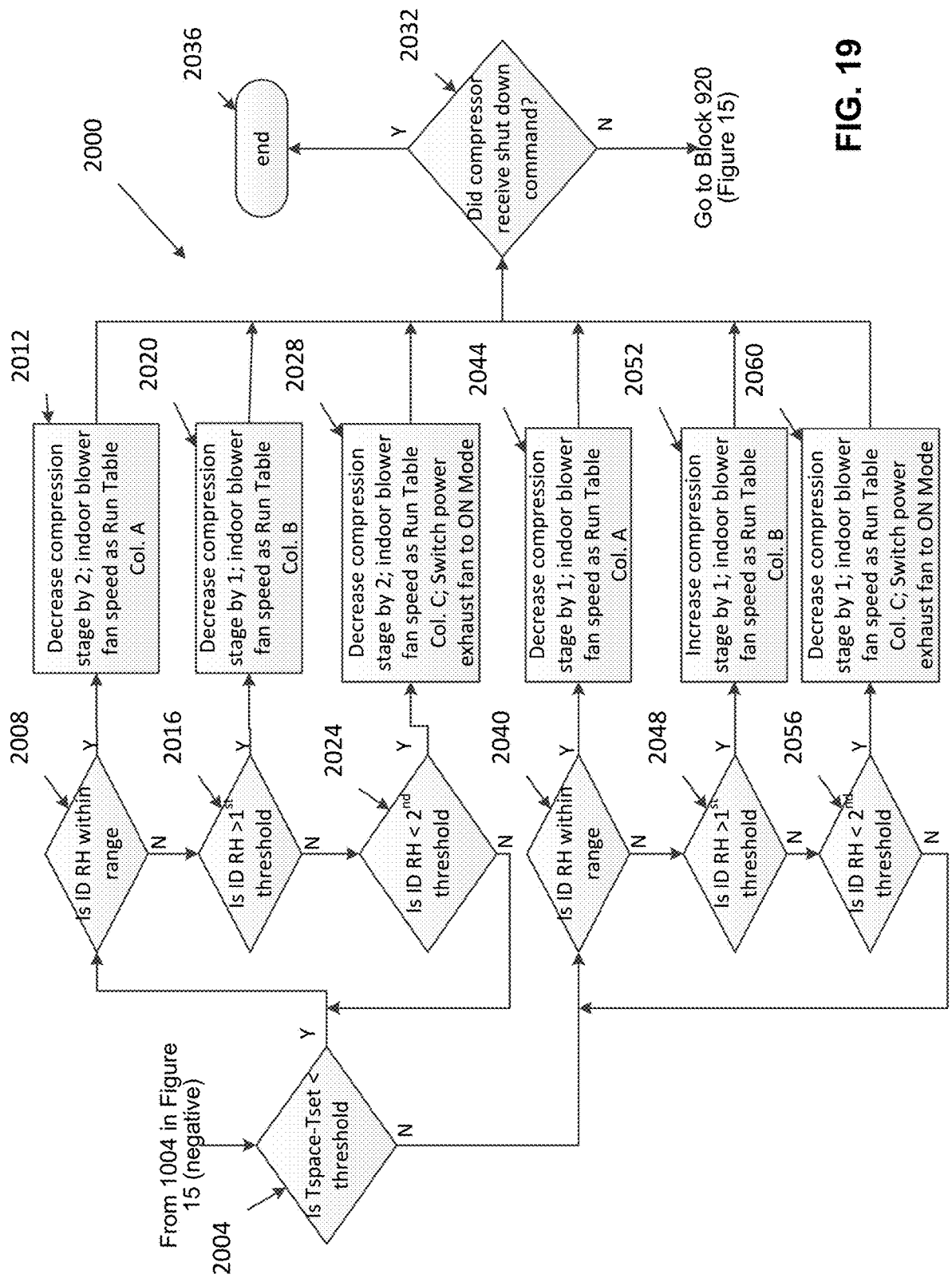
FIGS. 19-21 are flow diagrams for yet another example method of controlling a climate-control system according to the present disclosure.
Figure 20:
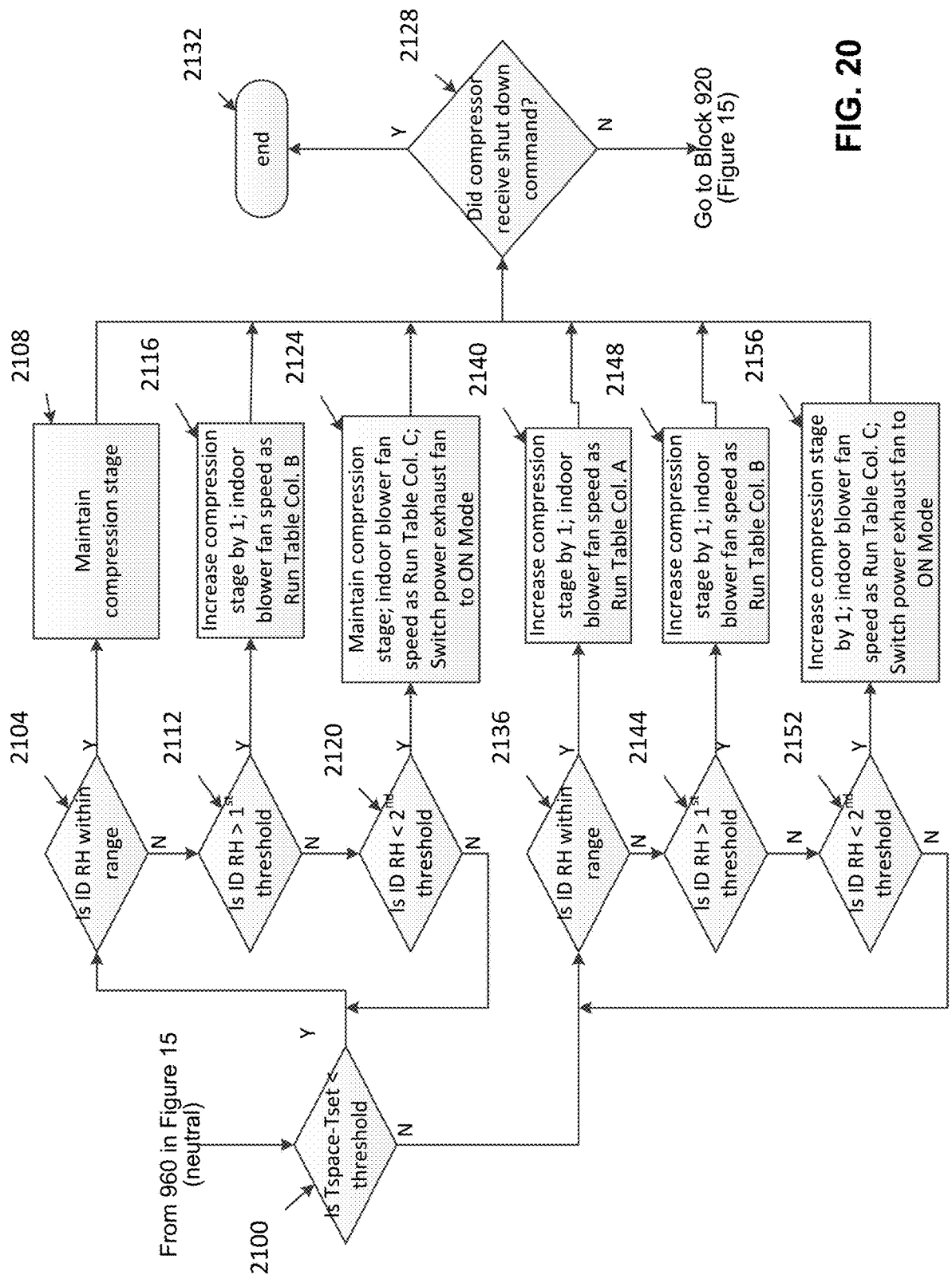
Figure 21:
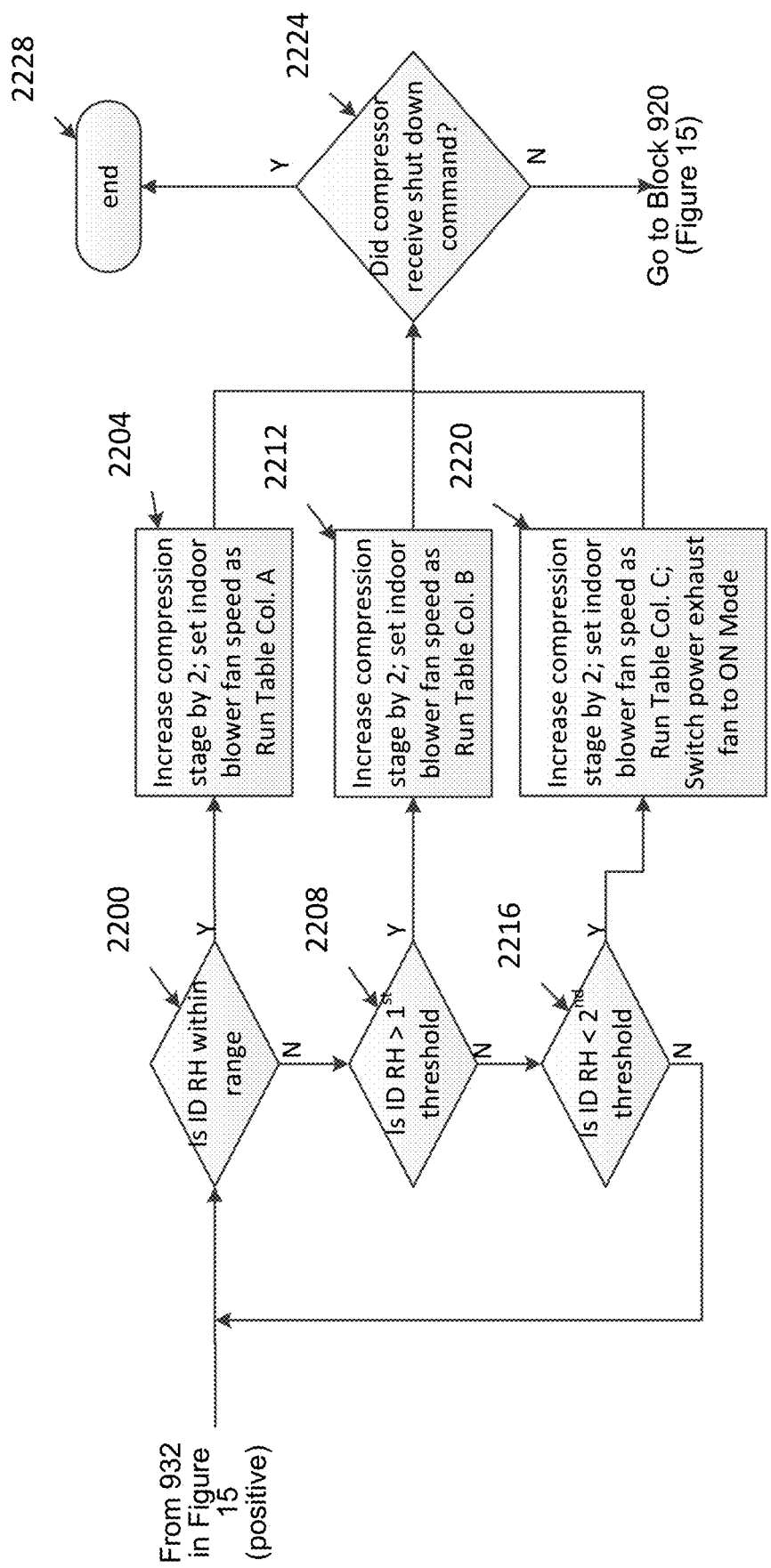

Now referring to FIGS. 19-21, an alternative embodiment 2000 for the embodiments of FIGS. 16-18 are illustrated. FIG. 19 is an alternative method 2000 to the method 900 illustrated in FIG. 18. In method 2000, after the controller receives the space temperature and setpoint temperature and determines the difference in 1004 (FIG. 15), the controller determines whether the difference is less than a threshold at 2004. For example only, the threshold may be 2° F.

If the difference is less than the threshold at 2004, the controller receives an ID RH and determines whether the ID RH is within a predetermined range. The predetermined range may be an ideal or desired humidity range and may be determined based on user preference, unit, environment, location, etc. For example only, the predetermined range may be between 40% and 50% humidity.

If the ID RH is within the predetermined range at 2008, the controller may decrease the compression stage by 2 at 2012 (unless at the minimum compressor speed). Additionally, the controller sets the indoor blower fan speed according to column A of the run table. Thus, in the example above relating to FIGS. 2A, 3B, and 8A, if the compressor 218 was running at stage 4 (a startup OAT greater than 90° F.), the controller 450 would change the compression stage to stage 2 and set the fan speed to low or medium-low. If the compressor 218 was running at stage 3 (a startup OAT within the range of 80-90° F.), the controller 450 would change the compression stage to stage 1 and set the fan speed to low. If the compressor 218 was running at stage 2 (a startup OAT within the range of 70-80° F.), the controller 450 would change the compression stage to stage 1 and set the fan speed to low.

If the ID RH is not within the predetermined range at 2008, the controller may determine whether the ID RH is greater than a first threshold at 2016. The first threshold may be the upper limit of the range in 2008 (i.e., the upper limit of the desired humidity). For example, the first threshold may be 50% humidity.

If the ID RH is greater than the first threshold in 2016, the controller may decrease the compression stage by 1 in 2020 (unless at the minimum compressor speed). Additionally, the controller sets the indoor blower fan speed according to column B of the run table. Thus, in the example above relating to FIGS. 2A, 3B, and 8A, if the compressor 218 was running at stage 4 (a startup OAT greater than 90° F.), the controller 450 would change the compression stage to stage 3 and set the fan speed to low or medium-low. If the compressor 218 was running at stage 3 (a startup OAT within the range of 80-90° F.), the controller 450 would change the compression stage to stage 2 and set the fan speed to low. If the compressor 218 was running at stage 2 (a startup OAT within the range of 70-80° F.), the controller 450 would change the compression stage to stage 1 and set the fan speed to low.

If the ID RH is not greater than the first threshold in 2016, the controller may determine whether the ID RH is less than a second threshold at 2024. The second threshold may be the lower limit of the predetermined range in 2008 (i.e., the lower limit of the desired humidity). For example, the second threshold may be 40% humidity.

If the ID RH is not less than the second threshold at 2024, method 2000 returns to 2008. If the ID RH is less than the second threshold at 2024, the controller may decrease the compression stage by 2 (unless at the minimum compressor speed) at 2028. Additionally, the controller switches the power exhaust fan to ON mode and sets the indoor blower fan speed according to column C of the run table. Thus, in the example above relating to FIGS. 2A, 3B, and 8A, if the compressor 218 was running at stage 4 (a startup OAT greater than 90° F.), the controller 450 would change the compression stage to stage 2 and set the fan speed to medium. If the compressor 218 was running at stage 3 (a startup OAT within the range of 80-90° F.), the controller 450 would change the compression stage to stage 1 and set the fan speed to medium. If the compressor 218 was running at stage 2 (a startup OAT within the range of 70-80° F.), the controller 450 would change the compression stage to stage 1 and set the fan speed to medium.

After decreasing the compression stage in 2012, 2020, or 2028, the compressor determines whether a shutdown command has been received at 2032. The shutdown command may be provided as a signal from a thermostat, a sensor, or any other trigger. If a shutdown command was not received at 2032, method 2000 returns to 920 (FIG. 15). If a shutdown command was received at 2032, method 2000 ends at 2036.

If the difference is not less than a threshold at 2004, the controller receives an ID RH and determines whether the ID RH is within a predetermined range at 2040. The predetermined range may be an ideal or desired humidity range and may be determined based on user preference, unit, environment, location, etc. For example only, the predetermined range may be between 40% and 50% humidity.

If the ID RH is within the predetermined range at 2040, the controller decreases the compression stage by 1 at 2044 (unless at the minimum compressor speed). Additionally, the controller sets the indoor blower fan speed according to column A of the run table. Thus, in the example relating to FIGS. 2A, 3B, and 8A, if the compressor 218 was running at stage 4 (a startup OAT greater than 90° F.), the controller 450 would change the compression stage to stage 3 and set the fan speed to medium. If the compressor 218 was running at stage 3 (a startup OAT within the range of 80-90° F.), the controller 450 would change the compression stage to stage 2 and set the fan speed to low or medium-low. If the compressor 218 was running at stage 2 (a startup OAT within the range of 70-80° F.), the controller 450 would change the compression stage to stage 1 and set the fan speed to low.

If the ID RH is not within the predetermined range at 2040, the controller determines whether the ID RH is greater than a first threshold at 2048. The first threshold may be the upper limit of the range in 2040 (i.e., the upper limit of the desired humidity). For example, the first threshold may be 50% humidity.

If the ID RH is greater than the first threshold at 2048, the controller may increase the compression stage by 1 at 2052 unless the compressor is operating at maximum speed (i.e., at compression stage 4 in FIG. 8A, compression stage 5 in FIGS. 9A and 10A, compression stage 9 in FIGS. 11A and 12A). Additionally, the controller sets the indoor blower fan speed according to column B of the run table. Thus, in the example relating to FIGS. 2A, 3B, and 8A, if the compressor was running at stage 3 (a startup OAT within the range of 80-90° F.), the controller would change the compression stage to stage 4 and set the fan speed to medium. If the compressor was running at stage 2 (a startup OAT within the range of 70-80° F.), the controller would change the compression stage to stage 3 and set the fan speed to low or medium-low. If the compressor was running at stage 1 (a startup OAT less than 70° F.), the controller would change the compression stage to stage 2 and set the fan speed to low.

If the ID RH is not greater than the first threshold at 2048, the controller may determine whether the ID RH is less than a second threshold at 2056. The second threshold may be the lower limit of the predetermined range in 2040 (i.e., the lower limit of the desired humidity). For example, the second threshold may be 40% humidity.

If the ID RH is not less than the second threshold at 2056, the method 2000 returns to 2040. If the ID RH is less than the second threshold at 2056, the controller decreases the compression stage by 1 at 2060 (unless at the minimum compressor speed). Additionally, the controller switches the power exhaust fan to ON mode and sets the indoor blower fan speed according to column C of the run table. Thus, in the example relating to FIGS. 2A, 3B, and 8A, if the compressor 218 was running at stage 4 (a startup OAT greater than 90° F.), the controller 450 would change the compression stage to stage 3 and set the fan speed to high. If the compressor 218 was running at stage 3 (a startup OAT within the range of 80-90° F.), the controller 450 would change the compression stage to stage 2 and set the fan speed to medium. If the compressor 218 was running at stage 2 (a startup OAT within the range of 70-80° F.), the controller 450 would change the compression stage to stage 1 and set the fan speed to medium.

After increasing or decreasing the compression stage in 2044, 2052, or 2060, the controller determines whether a shutdown command has been received at 2032. The shutdown command may be provided as a signal from a thermostat, a sensor, or any other trigger. If a shutdown command was not received at 2032, method 2000 returns to 920 (FIG. 15). If a shutdown command was received at 2032, method 2000 ends at 2036.

Now referring to FIG. 20, an alternative method 2000 to the method 900 in FIG. 17 is illustrated. In method 2000, after the controller receives the space temperature and setpoint temperature and determines the difference in 960 (FIG. 15), the controller determines whether the difference is less than a threshold at 2100. For example only, the threshold may be 2° F.

If the difference is less than the threshold at 2100, the controller determines whether an ID RH is within a predetermined range at 2104. The predetermined range may be an ideal or desired humidity range and may be determined based on user preference, unit, environment, location, etc. For example only, the predetermined range may be between 40% and 50% humidity.

If the ID RH is within the predetermined range at 2104, the controller maintains the compression stage at 2108. Thus, in the example relating to FIGS. 2A, 3B, and 8A, if the compressor 218 was running at stage 4 (a startup OAT greater than 90° F.), the controller 450 would maintain the compression stage at stage 4. If the compressor 218 was running at stage 3 (a startup OAT within the range of 80-90° F.), the controller 450 would maintain the compression stage at stage 3. If the compressor 218 was running at stage 2 (a startup OAT within the range of 70-80° F.), the controller 450 would maintain the compression stage at stage 2. If the compressor 218 was running at stage 1 (a startup OAT less than 70° F.), the controller 450 would maintain the compression stage at stage 1.

If the ID RH is not within the predetermined range at 2104, the controller may determine whether the ID RH is greater than a first threshold at 2112. The first threshold may be the upper limit of the range in 2104 (i.e., the upper limit of the desired humidity). For example, the first threshold may be 50% humidity.

If the ID RH is greater than the first threshold at 2112, the controller may increase the compression stage by 1 at 2116 (unless at the maximum compressor speed). Additionally, the controller sets the indoor blower fan speed according to column B of the run table. Thus, in the example relating to FIGS. 2A, 3B, and 8A, if the compressor 218 was running at stage 3 (a startup OAT within the range of 80-90° F.), the controller 450 would change the compression stage to stage 4 and set the fan speed to medium. If the compressor 218 was running at stage 2 (a startup OAT within the range of 70-80° F.), the controller 450 would change the compression stage to stage 3 and set the fan speed to low or medium-low. If the compressor 218 was running at stage 1 (a startup OAT less than 70° F.), the controller 450 would change the compression stage to stage 2 and set the fan speed to low.

If the ID RH is not greater than the first threshold at 2112, the controller determines whether the ID RH is less than a second threshold at 2120. The second threshold may be the lower limit of the predetermined range in 2104 (i.e., the lower limit of the desired humidity). For example, the second threshold may be 40% humidity.

If the ID RH is not less than the second threshold at 2120, the method 2000 returns to 2104. If the ID RH is less than the second threshold at 2129, the controller may maintain the compression stage, switch the power exhaust fan to ON mode, and set the indoor blower fan speed according to column C of the run table at 2124. Thus, in the example relating to FIGS. 2A, 3B, and 8A, if the compressor 218 was running at stage 4 (a startup OAT greater than 90° F.), the controller 450 would maintain the compression stage at stage 4 and set the fan speed to high. If the compressor 218 was running at stage 3 (a startup OAT within the range of 80-90° F.), the controller 450 would maintain the compression stage at stage 3 and set the fan speed to high. If the compressor 218 was running at stage 2 (a startup OAT within the range of 70-80° F.), the controller 450 would maintain the compression stage at stage 2 and set the fan speed to medium. If the compressor 218 was running at stage 1 (a startup OAT less than 70° F.), the controller 450 would maintain the compression stage at stage 1 and set the fan speed to medium.

After the compression stage is maintained or increased at 2108, 2116, or 2124, the controller may determine whether a shutdown command has been received at 2128. The shutdown command may be provided as a signal from a thermostat, a sensor, or any other trigger. If a shutdown command was not received at 2128, method 2000 returns to 920 (FIG. 15). If a shutdown command was received at 2128, method 2000 ends at 2132.

If the difference is not less than a threshold at 2100, the controller determines whether an ID RH is within a predetermined range at 2136. The predetermined range may be an ideal or desired humidity range and may be determined based on user preference, unit, environment, location, etc. For example only, the predetermined range may be between 40% and 50% humidity.

If the ID RH is within the predetermined range at 2136, the controller may increase the compression stage by 1 at 2140 (unless at the maximum compressor speed). Additionally, the controller sets the indoor blower fan speed according to column A of the run table. Thus, in the example relating to FIGS. 2A, 3B, and 8A, if the compressor 218 was running at stage 3 (a startup OAT within the range of 80-90° F.), the controller 450 would change the compression stage to stage 4 and set the indoor blower fan speed to high. If the compressor 218 was running at stage 2 (a startup OAT within the range of 70-80° F.), the controller 450 would change the compression stage to stage 3 and set the indoor blower fan speed to medium. If the compressor 218 was running at stage 1 (a startup OAT less than 70° F.), the controller 450 would change the compression stage to stage 2 and set the indoor blower fan speed to low or medium-low.

If the ID RH is not within the predetermined range at 2136, the compressor determines whether the ID RH is greater than a first threshold at 2144. The first threshold may be the upper limit of the range in 2136 (i.e., the upper limit of the desired humidity). For example, the first threshold may be 50% humidity.

If the ID RH is greater than the first threshold at 2144, the controller may increase the compression stage by 1 at 2148 (unless at the maximum compressor speed). Additionally, the controller sets the indoor blower fan speed according to column B of the run table. Thus, in the example relating to FIGS. 2A, 3B, and 8A, if the compressor 218 was running at stage 3 (a startup OAT within the range of 80-90° F.), the controller 450 would change the compression stage to stage 4 and set the indoor blower fan speed to medium. If the compressor 218 was running at stage 2 (a startup OAT within the range of 70-80° F.), the controller 450 would change the compression stage to stage 3 and set the indoor blower fan speed to low or medium-low. If the compressor 218 was running at stage 1 (a startup OAT less than 70° F.), the controller 450 would change the compression stage to stage 2 and set the indoor blower fan speed to low.

If the ID RH is not greater than the first threshold at 2144, the controller determines whether the ID RH is less than a second threshold at 2152. The second threshold may be the lower limit of the predetermined range in 2136 (i.e., the lower limit of the desired humidity). For example, the second threshold may be 40% humidity.

If the ID RH is not less than the second threshold at 2152, the method 2000 returns to 2136. If the ID RH is less than the second threshold at 2152, the controller may increase the compression stage by 1, switch the power exhaust fan to ON mode, and set the indoor blower fan speed according to column C of the run table at 2156. Thus, in the example relating to FIGS. 2A, 3B, and 8A, if the compressor 218 was running at stage 3 (a startup OAT within the range of 80-90° F.), the controller 450 would change the compression stage to stage 4 and set the indoor blower fan speed to high. If the compressor 218 was running at stage 2 (a startup OAT within the range of 70-80° F.), the controller 450 would change the compression stage to stage 3 and set the indoor blower fan speed to high. If the compressor 218 was running at stage 1 (a startup OAT less than 70° F.), the controller 450 would change the compression stage to stage 2 and set the indoor blower fan speed to medium.

After the compression stage is increased at 2140, 2148, or 2156, the controller may determine whether a shutdown command has been received at 2128. The shutdown command may be provided as a signal from a thermostat, a sensor, or any other trigger. If a shutdown command was not received at 2128, method 2000 returns to 920 (FIG. 15). If a shutdown command was received at 2128, method 2000 ends at 2132.

Now referring to FIG. 21, an alternative method 2000 to the method 900 in FIG. 16 is illustrated. In method 2000, after the controller receives the indoor relative humidity (ID RH) in 932 (FIG. 15), the controller determines whether the ID RH is within a predetermined range at 2200. The predetermined range may be an ideal or desired humidity range and may be determined based on user preference, unit, environment, location, etc. For example only, the predetermined range may be between 40% and 50% humidity.

If the ID RH is within the predetermined range at 2200, the controller may increase the compression stage by 2 at 2204 (unless at the maximum compressor speed). Additionally, the controller sets the indoor blower fan speed according to column A of the run table. Thus, in the example relating to FIGS. 2A, 3B, and 8A, if the compressor 218 was running at stage 3 (a startup OAT within the range of 80-90° F.), the controller 450 would change the compression stage to stage 4 and set the indoor blower fan speed to high. If the compressor 218 was running at stage 2 (a startup OAT within the range of 70-80° F.), the controller 450 would change the compression stage to stage 4 and set the indoor blower fan speed to high. If the compressor 218 was running at stage 1 (a startup OAT less than 70° F.), the controller 450 would change the compression stage to stage 3 and set the indoor blower fan speed to medium.

If the ID RH is not within the predetermined range at 2200, the controller may determine whether the ID RH is greater than a first threshold at 2208. The first threshold may be the upper limit of the range in 2200 (i.e., the upper limit of the desired humidity). For example, the first threshold may be 50% humidity.

If the ID RH is greater than the first threshold at 2208, the controller may increase the compression stage by 2 at 2212 (unless at the maximum compressor speed). Additionally, the controller sets the indoor blower fan speed according to column B of the run table. Thus, in the example relating to FIGS. 2A, 3B, and 8A, if the compressor 218 was running at stage 3 (a startup OAT within the range of 80-90° F.), the controller 450 would change the compression stage to stage 4 and set the indoor blower fan speed to medium. If the compressor 218 was running at stage 2 (a startup OAT within the range of 70-80° F.), the controller 450 would change the compression stage to stage 4 and set the indoor blower fan speed to medium. If the compressor 218 was running at stage 1 (a startup OAT less than 70° F.), the controller 450 would change the compression stage to stage 3 and set the indoor blower fan speed to low or medium-low.

If the ID RH is not greater than the first threshold at 2208, the controller may determine whether the ID RH is less than a second threshold at 2216. The second threshold may be the lower limit of the predetermined range in 2200 (i.e., the lower limit of the desired humidity). For example, the second threshold may be 40% humidity.

If the ID RH is not less than the second threshold at 2216, the method 2000 returns to 2200. If the ID RH is less than the second threshold at 2216, the controller increases the compression stage by 2, sets the indoor blower fan speed according to column C of the run table, and switches the power exhaust fan to ON mode at 2220. Thus, in the example relating to FIGS. 2A, 3B, and 8A, if the compressor 218 was running at stage 3 (a startup OAT within the range of 80-90° F.), the controller 450 would change the compression stage to stage 4 and set the indoor blower fan speed to high. If the compressor 218 was running at stage 2 (a startup OAT within the range of 70-80° F.), the controller 450 would change the compression stage to stage 4 and set the indoor blower fan speed to high. If the compressor 218 was running at stage 1 (a startup OAT less than 70° F.), the controller 450 would change the compression stage to stage 3 and set the indoor blower fan speed to high.

After the compression stage is increased at 2204, 2212, or 2220, the controller may determine whether a shutdown command has been received at 2224. The shutdown command may be provided as a signal from a thermostat, a sensor, or any other trigger. If a shutdown command was not received at 2224, method 2000 returns to 920 (FIG. 15). If a shutdown command was received at 2224, method 2000 ends at 2228.

Figure 22:
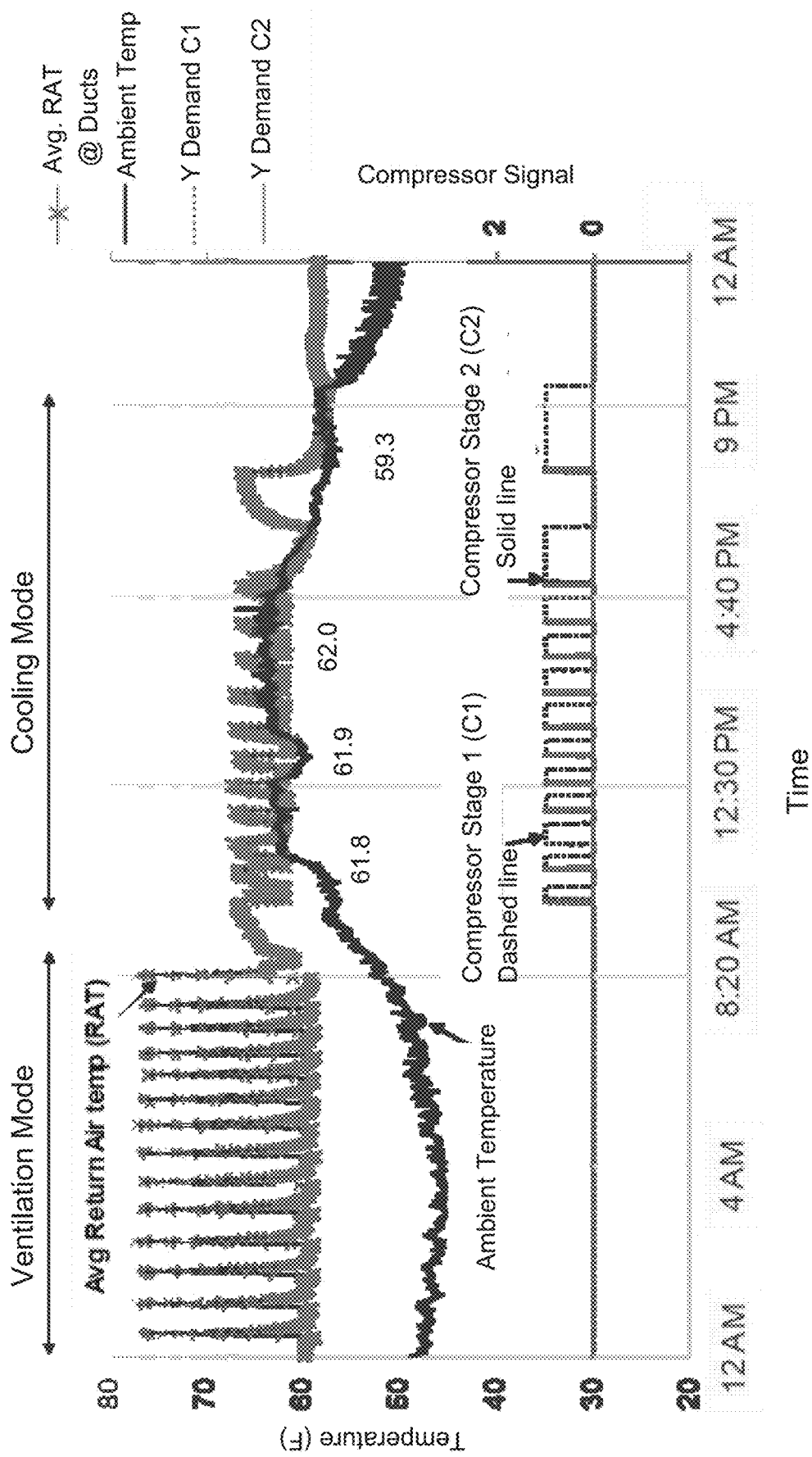
FIG. 22 is a graph of example compressor operation for the climate-control systems of FIGS. 1A-1C.
Figure 23:
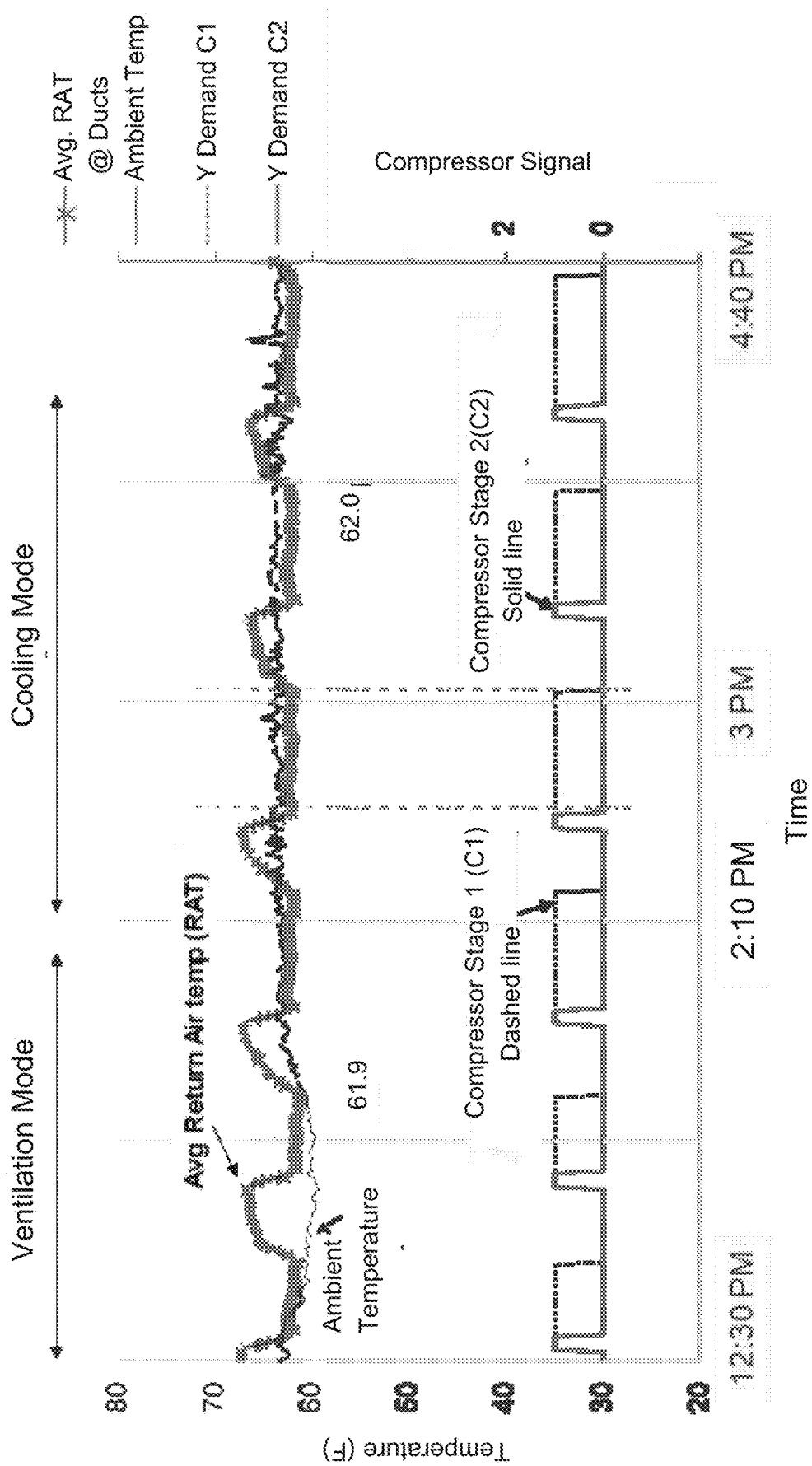
FIG. 23 is a graph of example compressor operation for the climate-control systems of FIGS. 2A-2E.

Now referring to FIGS. 22 and 23, benefits of the present disclosure are illustrated. FIG. 22 illustrates the system of FIG. 1B or 1C, for example. During cooling mode, the first compressor C1 and the second compressor C2 cycle on and off in short intervals. As illustrated, when both compressors are on, the temperature crashes, triggering compressor C2 to shut off. When only one of the compressors is on, compressor C1, the temperature increases slightly. Thus, the arrangement illustrated in FIG. 22 may lead to increased cycling and inefficiencies.

FIG. 23 illustrates the system of FIGS. 2D and 2E. As can be seen, the compressors C1 and C2 cycle on for much longer periods, with the temperature being much steadier than in FIG. 22. Additionally, when both compressors are on, the temperature does not crash, but, instead, more smoothly decreases. Thus, the present disclosure provides for less cycling, more efficient compressor control, and more comfort for the user.

In this application, including the definitions below, the term "controller" may be replaced with the term "circuit." The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller may include one or more interface circuits. In some examples, the interface circuits may include wired or wireless interfaces that are connected to a local area network (LAN), the Internet, a wide area network (WAN), or combinations thereof. The functionality of any given controller of the present disclosure may be distributed among multiple controllers that are connected via interface circuits. For example, multiple controllers may allow load balancing. In a further example, a server (also known as remote, or cloud) controller may accomplish some functionality on behalf of a client controller.

The term code, as used above, may include software, firmware, and/or microcode, and may refer to programs, routines, functions, classes, data structures, and/or objects. The term shared processor circuit encompasses a single processor circuit that executes some or all code from multiple controllers. The term group processor circuit encompasses a processor circuit that, in combination with additional processor circuits, executes some or all code from one or more controllers. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple controllers. The term group memory circuit encompasses a memory circuit that, in combination with additional memories, stores some or all code from one or more controllers.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A climate-control system comprising:
   a variable capacity compressor;
   an outdoor ambient temperature sensor indicating a temperature of outdoor ambient air;

a return air temperature sensor indicating a temperature of return air in the system; and a controller commanding a startup compressor stage based on the temperature from the outdoor ambient temperature sensor and commanding a running compressor stage based on a time-based slope of the temperature from the return air temperature sensor and the startup compressor stage.

2. The climate-control system of claim 1, where in the controller increases the startup compressor stage by one stage if the slope of the temperature from the return air temperature sensor is neutral.

3. The climate-control system of claim 1, where in the controller increases the startup compressor stage by two stages if the slope of the temperature from the return air temperature sensor is positive.

4. The climate-control system of claim 1, where in the controller decreases the startup compressor stage by two stages if the slope of the temperature from the return air temperature sensor is negative.

5. The climate-control system of claim 1, further comprising a space temperature sensor indicating a temperature of a conditioned space, wherein the controller determines a difference between the temperature of the conditioned space and a space set temperature.

6. The climate-control system of claim 5, wherein the space set temperature is provided by at least one of a thermostat and a mobile device.

7. The climate-control system of claim 5, wherein the controller maintains the startup compression stage if the slope of the temperature from the return air temperature sensor is neutral and the difference between the temperature of the conditioned space and the space set temperature is less than a predetermined threshold.

8. The climate-control system of claim 5, wherein the controller increases the startup compression stage by one stage if the slope of the temperature from the return air temperature sensor is neutral and the difference between the temperature of the conditioned space and the space set temperature is not less than a predetermined threshold.

9. The climate-control system of claim 5, wherein the controller decreases the startup compression stage by two stages if the slope of the temperature from the return air temperature sensor is negative and the difference between the temperature of the conditioned space and the space set temperature is less than a predetermined threshold.

10. The climate-control system of claim 5, wherein the controller decreases the startup compression stage by one stage if the slope of the temperature from the return air temperature sensor is negative and the difference between the temperature of the conditioned space and the space set temperature is not less than a predetermined threshold.

11. The climate-control system of claim 5, further comprising an indoor relative humidity sensor indicating an indoor relative humidity of a conditioned space.

12. The climate-control system of claim 11, wherein the controller increases the startup compression stage by two stages if the slope of the temperature from the return air temperature sensor is positive and the indoor relative humidity is less than a predetermined threshold.

13. The climate-control system of claim 11, wherein the controller increases the startup compression stage by two stages if the slope of the temperature from the return air temperature sensor is positive and the indoor relative humidity is not less than a predetermined threshold.

14. The climate-control system of claim 11, wherein the controller maintains the startup compression stage if the slope of the temperature from the return air temperature sensor is neutral, the difference between the temperature of the conditioned space and the space set temperature is less than a predetermined temperature threshold, and the indoor relative humidity is less than a predetermined humidity threshold.

15. The climate-control system of claim 11, wherein the controller increases the startup compression stage by one stage if the slope of the temperature from the return air temperature sensor is neutral, the difference between the temperature of the conditioned space and the space set temperature is less than a predetermined temperature threshold, and the indoor relative humidity is not less than a predetermined humidity threshold.

16. The climate-control system of claim 11, wherein the controller increases the startup compression stage by one stage if the slope of the temperature from the return air temperature sensor is neutral, the difference between the temperature of the conditioned space and the space set temperature is not less than a predetermined temperature threshold, and the indoor relative humidity is less than a predetermined humidity threshold.

17. The climate-control system of claim 11, wherein the controller increases the startup compression stage by one stage if the slope of the temperature from the return air temperature sensor is neutral, the difference between the temperature of the conditioned space and the space set temperature is not less than a predetermined temperature threshold, and the indoor relative humidity is not less than a predetermined humidity threshold.

18. The climate-control system of claim 11, wherein the controller decreases the startup compression stage by two stages if the slope of the temperature from the return air temperature sensor is negative, the difference between the temperature of the conditioned space and the space set temperature is less than a predetermined temperature threshold, and the indoor relative humidity is less than a predetermined humidity threshold.

19. The climate-control system of claim 11, wherein the controller decreases the startup compression stage by one stage if the slope of the temperature from the return air temperature sensor is negative, the difference between the temperature of the conditioned space and the space set temperature is less than a predetermined temperature threshold, and the indoor relative humidity is not less than a predetermined humidity threshold.

20. The climate-control system of claim 11, wherein the controller decreases the startup compression stage by one stage if the slope of the temperature from the return air temperature sensor is negative, the difference between the temperature of the conditioned space and the space set temperature is not less than a predetermined temperature threshold, and the indoor relative humidity is less than a predetermined humidity threshold.

21. The climate-control system of claim 11, wherein the controller increases the startup compression stage by one stage if the slope of the temperature from the return air temperature sensor is negative, the difference between the temperature of the conditioned space and the space set temperature is not less than a predetermined temperature threshold, and the indoor relative humidity is not less than a predetermined humidity threshold.

22. The climate-control system of claim 1, further comprising an indoor blower fan having a variable-frequency drive, wherein the controller sets a speed of the indoor blower fan according to the running compressor stage.

23. The climate-control system of claim 1, further comprising a power exhaust fan.

24. The climate-control system of claim 1, wherein the variable-capacity compressor includes a variable-frequency drive.

25. The climate-control system of claim 1, wherein the compressor system includes a plurality of compressors that are fixed capacity or variable capacity.

26. The climate-control system of claim 25, wherein the plurality of compressors includes at least one compressor having a variable-frequency drive.

27. A method of controlling a climate-control system having at least one variable-capacity compressor, an outdoor ambient air temperature sensor, and a return air temperature sensor, the method comprising:
- determining, by a controller, an outdoor ambient air temperature from the outdoor ambient air temperature sensor;
- determining, by the controller, a return air temperature from the return air temperature sensor;
- commanding, by the controller, a startup compressor stage based on the outdoor ambient air temperature; and
- commanding, by the controller, a running compressor stage based on a slope of the return air temperature and the startup compressor stage.

\* \* \* \* \*